US012508280B2

(12) United States Patent
Bruins et al.

(10) Patent No.: US 12,508,280 B2
(45) Date of Patent: Dec. 30, 2025

(54) FORMULATIONS FOR IMPROVING GUT HEALTH

(71) Applicant: DSM IP ASSETS B.V., Heerlen (NL)

(72) Inventors: Maaike Johanna Bruins, Kaiseraugst (CH); Sophie Fehlbaum, Kaiseraugst (CH); Thanh-Van Pham, Kaiseraugst (CH); Kevin Prudence, Kaiseraugst (CH); Robert Steinert, Kaiseraugst (CH); Pietro Celi, Kaiseraugst (CH); Gilberto Litta, Kaiseraugst (CH); Estefania Perez Calvo, Kaiseraugst (CH); Wilbert Sybesma, Kaiseraugst (CH)

(73) Assignee: DSM IP Assets B.V., Heerlen (NL)

( * ) Notice: Subject to any disclaimer, the term of this patent is extended or adjusted under 35 U.S.C. 154(b) by 925 days.

(21) Appl. No.: 17/271,998

(22) PCT Filed: Aug. 28, 2019

(86) PCT No.: PCT/EP2019/073012
§ 371 (c)(1),
(2) Date: Feb. 26, 2021

(87) PCT Pub. No.: WO2020/043797
PCT Pub. Date: Mar. 5, 2020

(65) Prior Publication Data
US 2022/0288103 A1    Sep. 15, 2022

(30) Foreign Application Priority Data

Aug. 29, 2018  (EP) .................................... 18191556
May 7, 2019    (EP) .................................... 19173182

(51) Int. Cl.
| | | |
|---|---|---|
| A61K 31/375 | (2006.01) | |
| A61K 31/015 | (2006.01) | |
| A61K 31/07 | (2006.01) | |
| A61K 31/122 | (2006.01) | |
| A61K 31/197 | (2006.01) | |
| A61K 31/202 | (2006.01) | |
| A61K 31/355 | (2006.01) | |
| A61K 31/4188 | (2006.01) | |
| A61K 31/4415 | (2006.01) | |
| A61K 31/455 | (2006.01) | |
| A61K 31/51 | (2006.01) | |
| A61K 31/519 | (2006.01) | |
| A61K 31/525 | (2006.01) | |
| A61K 31/593 | (2006.01) | |
| A61K 31/714 | (2006.01) | |
| A61P 1/14 | (2006.01) | |

(52) U.S. Cl.
CPC .......... *A61K 31/714* (2013.01); *A61K 31/015* (2013.01); *A61K 31/07* (2013.01); *A61K 31/122* (2013.01); *A61K 31/197* (2013.01); *A61K 31/202* (2013.01); *A61K 31/355* (2013.01); *A61K 31/375* (2013.01); *A61K 31/4188* (2013.01); *A61K 31/4415* (2013.01); *A61K 31/455* (2013.01); *A61K 31/51* (2013.01); *A61K 31/519* (2013.01); *A61K 31/525* (2013.01); *A61K 31/593* (2013.01); *A61P 1/14* (2018.01)

(58) Field of Classification Search
None
See application file for complete search history.

(56) References Cited

U.S. PATENT DOCUMENTS

| | | | |
|---|---|---|---|
| 9,433,583 B2 * | 9/2016 | Farrell | ................. A61K 9/4808 |
| 9,668,991 B1 | 6/2017 | Cahan | |
| 2004/0253320 A1 | 12/2004 | Nijhawan | |
| 2010/0247489 A1 | 9/2010 | Saur-Brosch | |
| 2018/0028490 A1 | 2/2018 | Martinod et al. | |

FOREIGN PATENT DOCUMENTS

| | | | |
|---|---|---|---|
| CN | 103458890 | 12/2013 | |
| CN | 107410709 | 12/2017 | |
| CN | 107927794 | 4/2018 | |
| CN | 108117991 | 6/2018 | |
| CN | 108185195 | 6/2018 | |
| JP | 2008-515809 | 5/2008 | |
| JP | 4694777 | 6/2011 | |
| JP | 2013-147469 | 8/2013 | |
| WO | WO 2006/041930 | 4/2006 | |
| WO | 2007/058523 | 5/2007 | |
| WO | 2009/157759 | 12/2009 | |
| WO | WO-2014070014 A1 * | 5/2014 | ........... A23L 33/135 |

(Continued)

OTHER PUBLICATIONS

Pham et al., Gut Microbes, 2021, vol. 13(1), e1875774 (20 pages). (Year: 2021).*

(Continued)

*Primary Examiner* — Traviss C Mcintosh, III
(74) *Attorney, Agent, or Firm* — Nixon & Vanderhye P.C.

(57) ABSTRACT

Various benefits to intestinal health are made by delivery of an active agent to the colon of an animal, including a human. Active ingredients include of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof. Benefits include increased concentration of at least one short-chain fatty acid its salt thereof in the intestine, increased microbiome diversity in the intestine, increased beneficial bacteria in the intestine, increased the butyrate synthesis pathway in the intestine, improved barrier function of the intestine, reduced redox potential of the gut, reduced amount of gas produced in the intestine; and stimulation of intestinal immune responses.

21 Claims, 52 Drawing Sheets

(56) References Cited

FOREIGN PATENT DOCUMENTS

WO     WO-2014070017 A1 *    5/2014   ......... H01L 21/6835
WO     WO 2016/053085        4/2016
WO     WO 2017/181102      10/2017

OTHER PUBLICATIONS

Prof. dr. G. Dijkstra, *The Effect of Ribolavin in Crohn's Desease (Rise-Up)*, US National Library of Medicine, Clinical Trials.gov Identifier NCT02538354, Apr. 3, 2020.

Wiese, Dawn M. et al, *The Effects of an Oral Supplement Enriched With Fish Oil, Prebiotics, and Antioxidants on Nutrition Status in Crohn's Disease Patients*, Nutrition in Clinical Practice, vol. 26, No. 4, Aug. 2011, 463-473.

International Search Report for PCT/EP2019/073012, mailed Dec. 6, 2019, 4 pages.

Written Opinion of the ISA for PCT/EP2019/073012, mailed Dec. 6, 2019, 5 pages.

International Preliminary Report on Patentability for PCT/EP2019/073012.

Jian e al., "Dietary Fiber and Bacterial SCFA Enhance Oral Tolerance and Protect against Food Allergy through Diverse Cellular Pathways", Cell Reports, vol. 15, No. 12, Jun. 1, 2016, pp. 2809-2824.

Luthold et al., "Gut microbiota interactions with the immunomodulatory role of vitamin D in normal individuals", Metabolism, Clinical and Experimental, vol. 69, Jan. 7, 2017, pp. 76-86.

Korean Office Action dated Feb. 3, 2025 in related Korean Application No. 10-2021-7005853.

* cited by examiner

Figure 1
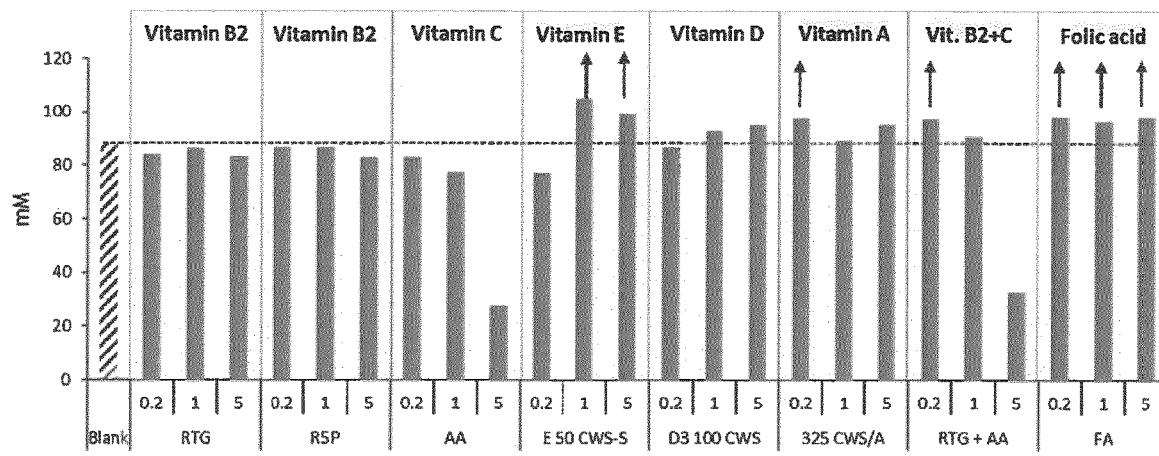
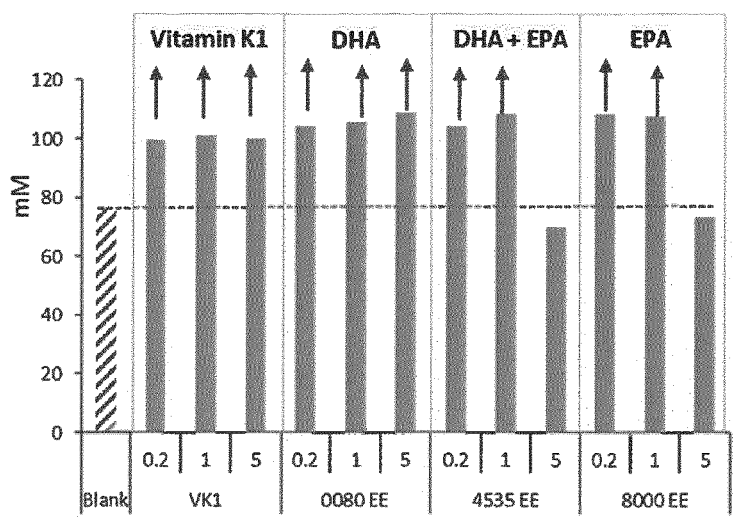

Figure 2
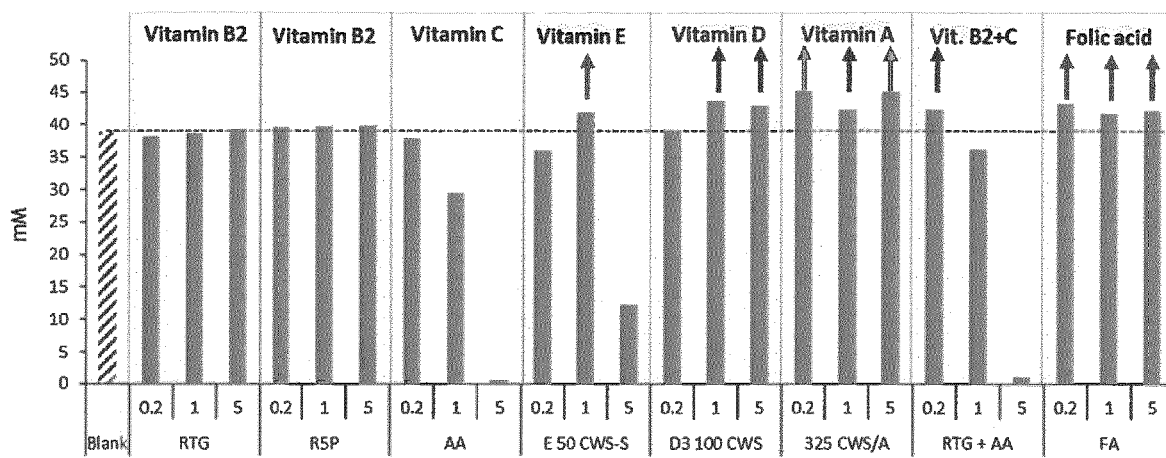
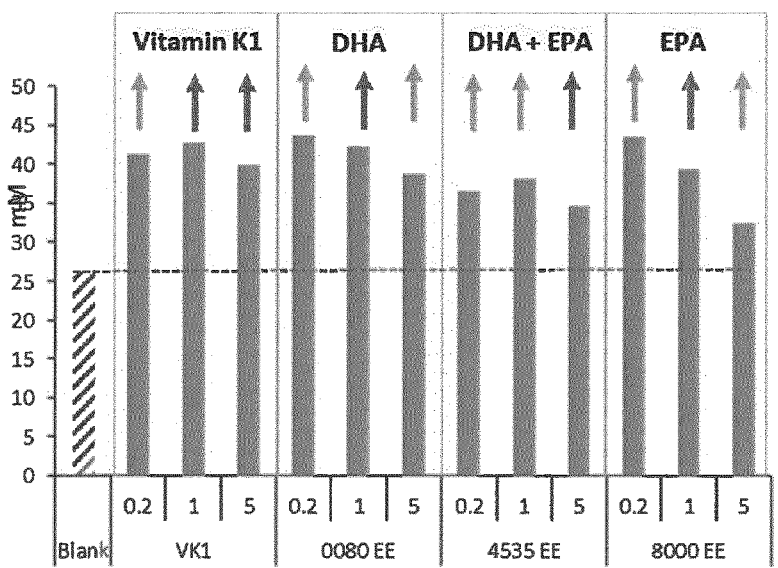

Figure 3
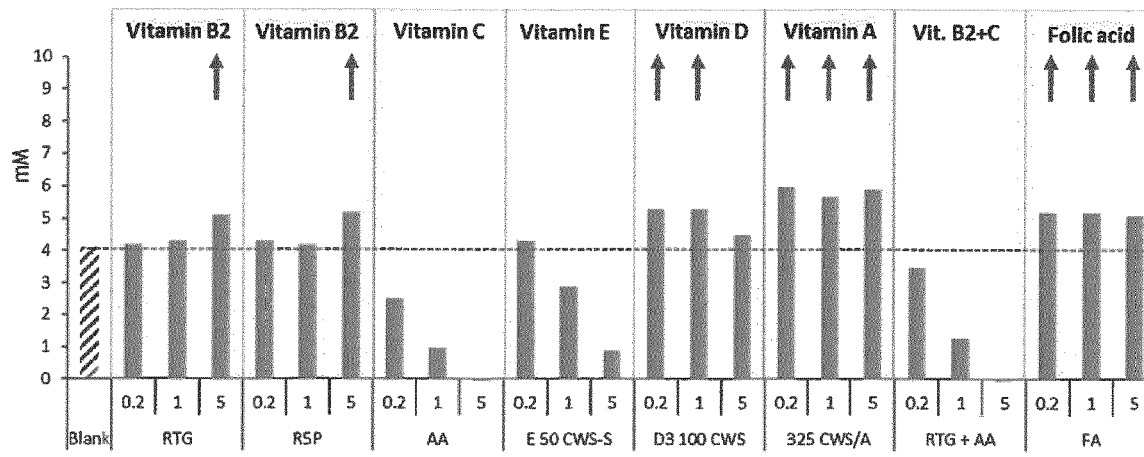
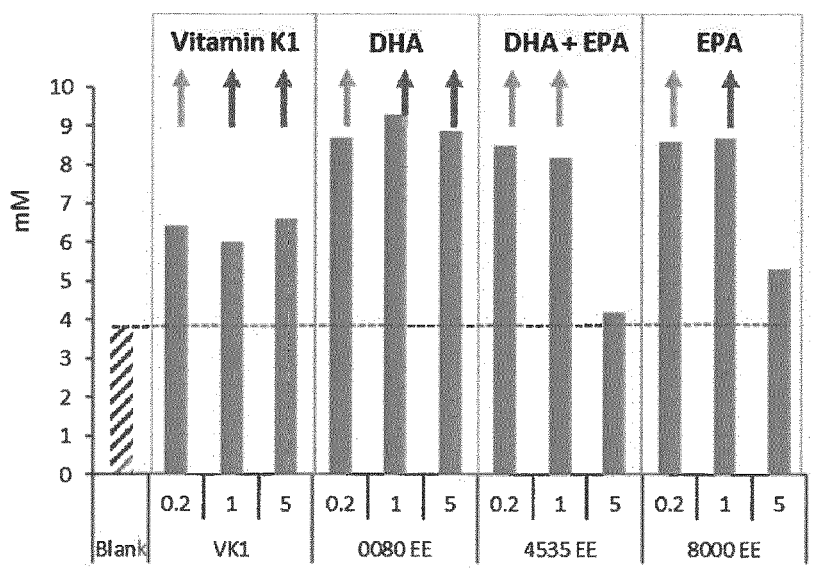

Figure 4
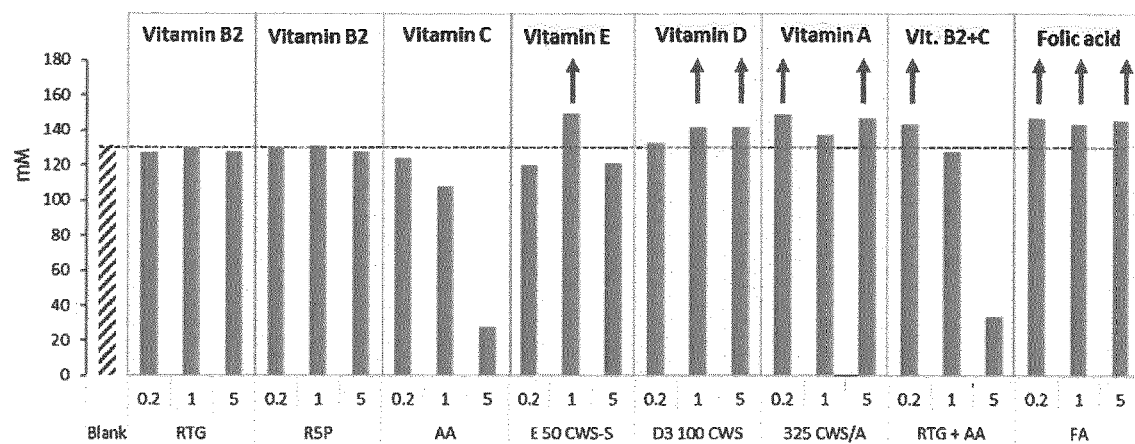
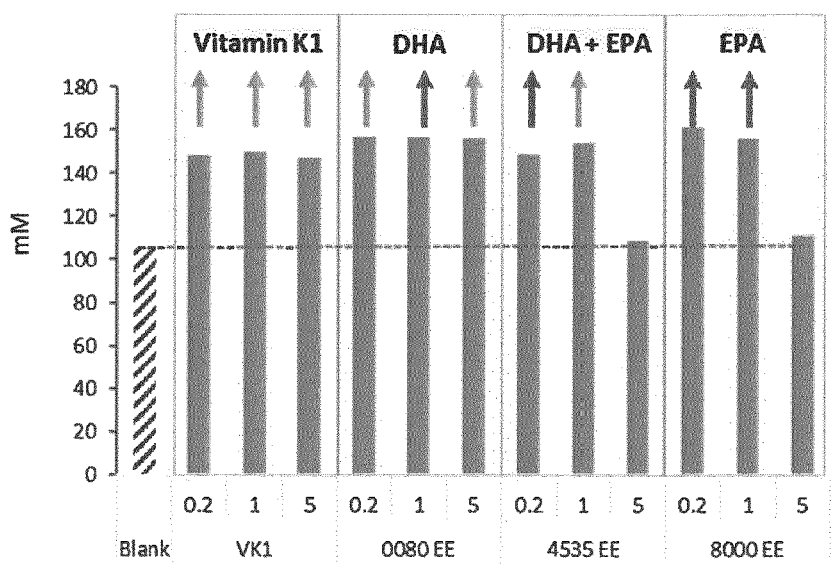

Figure 9
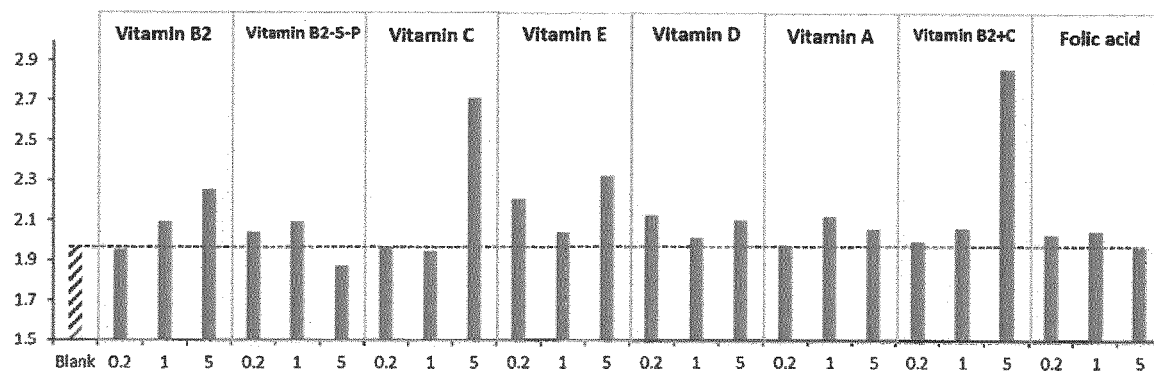
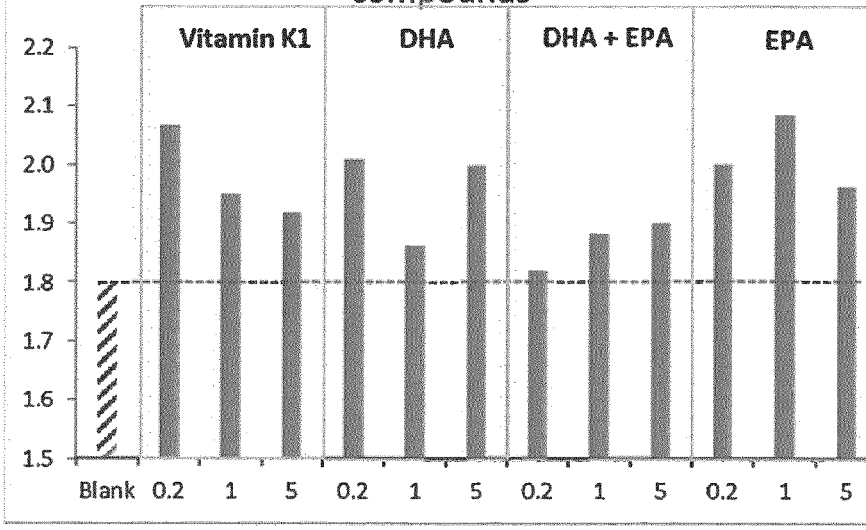

Figure 11
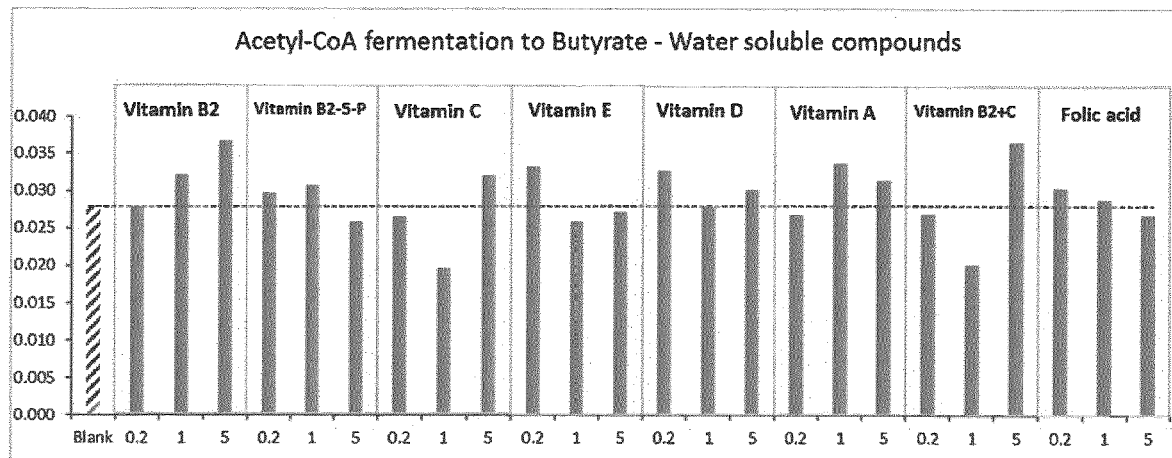
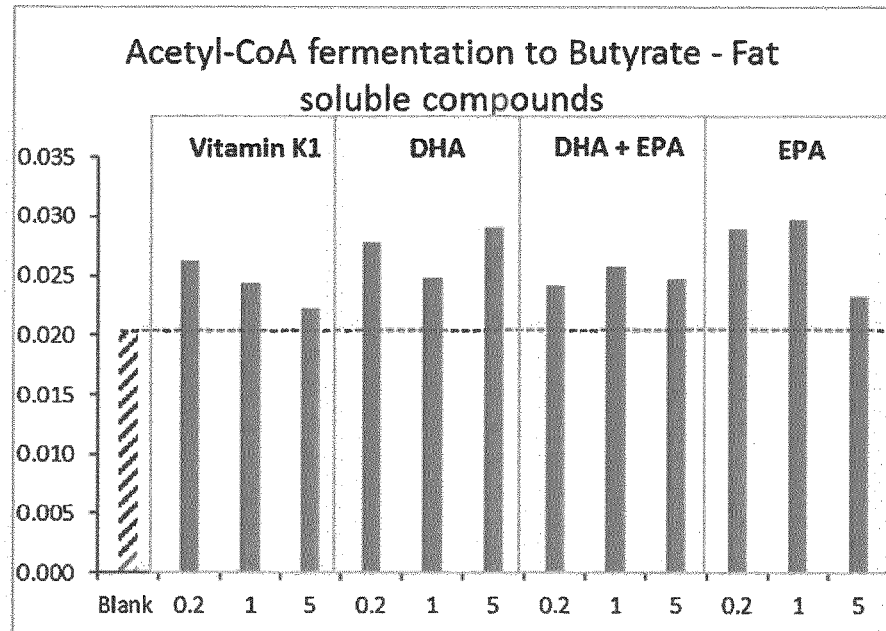

Figure 14
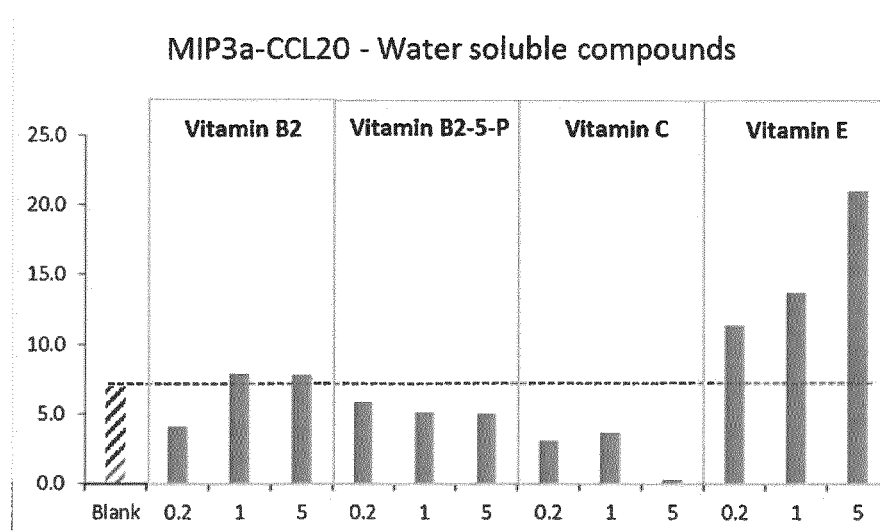
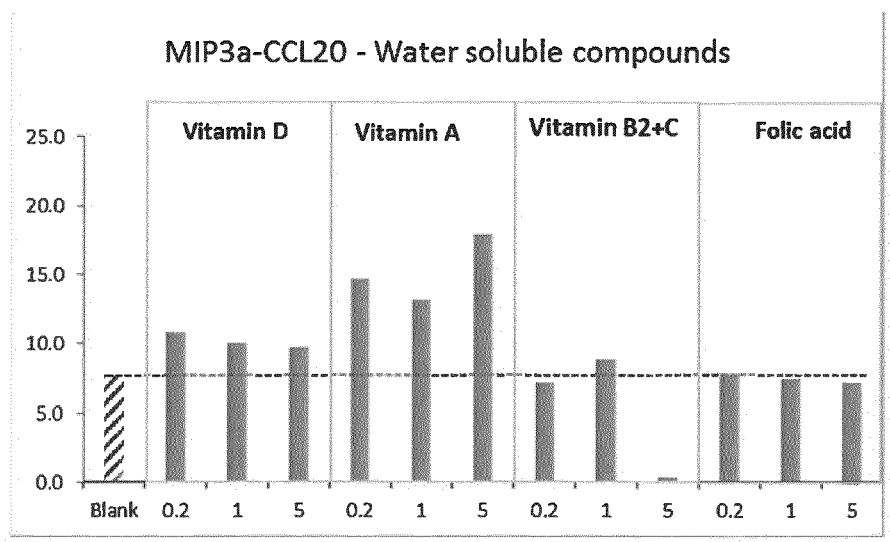
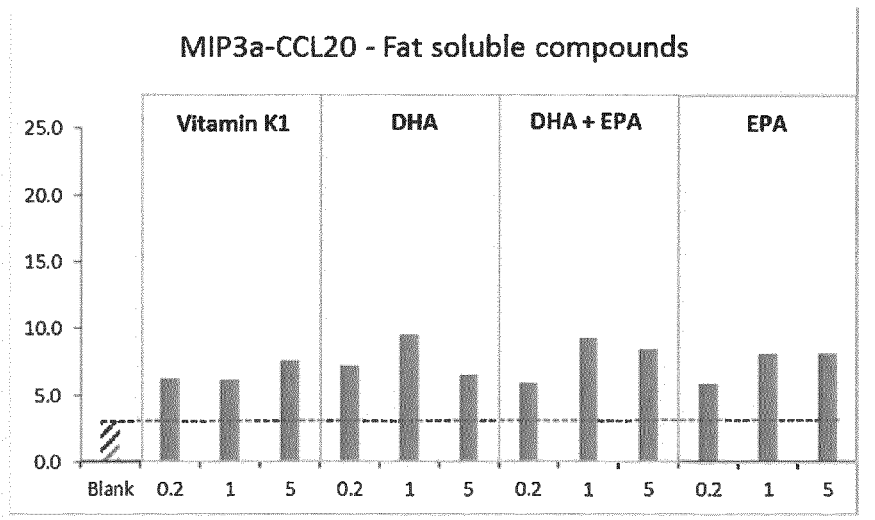

Figure 17
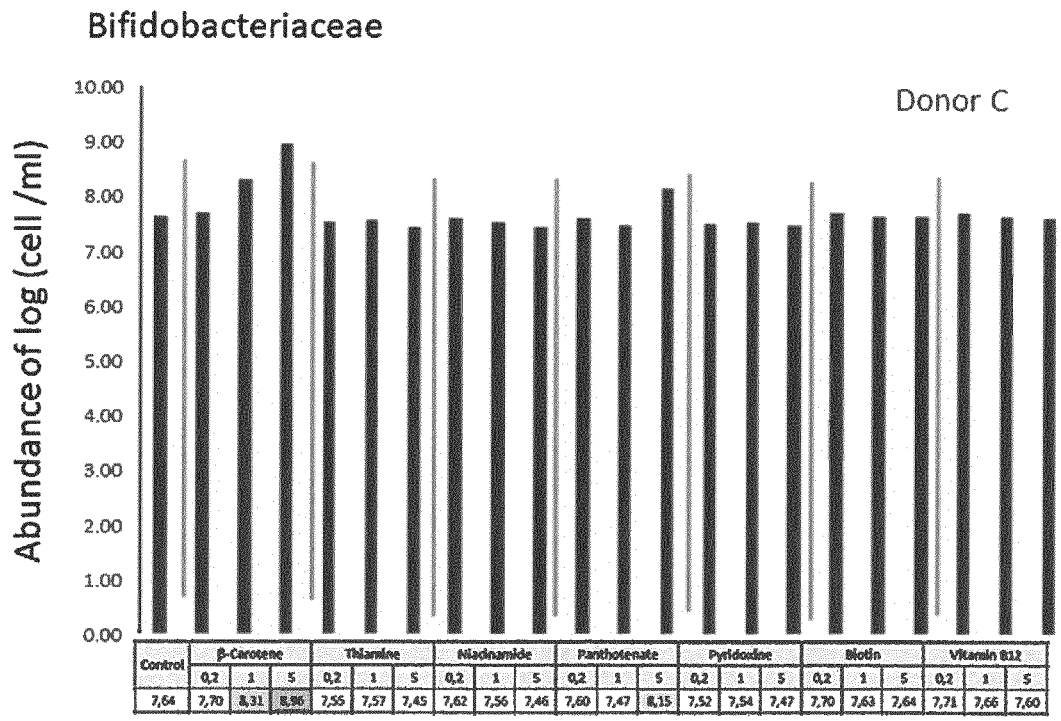
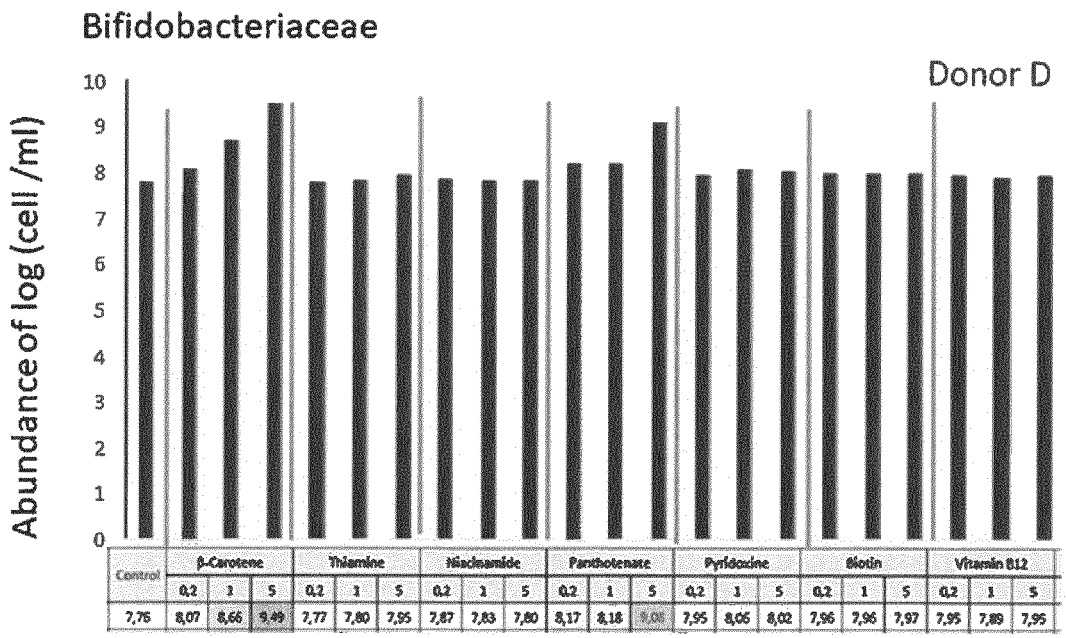

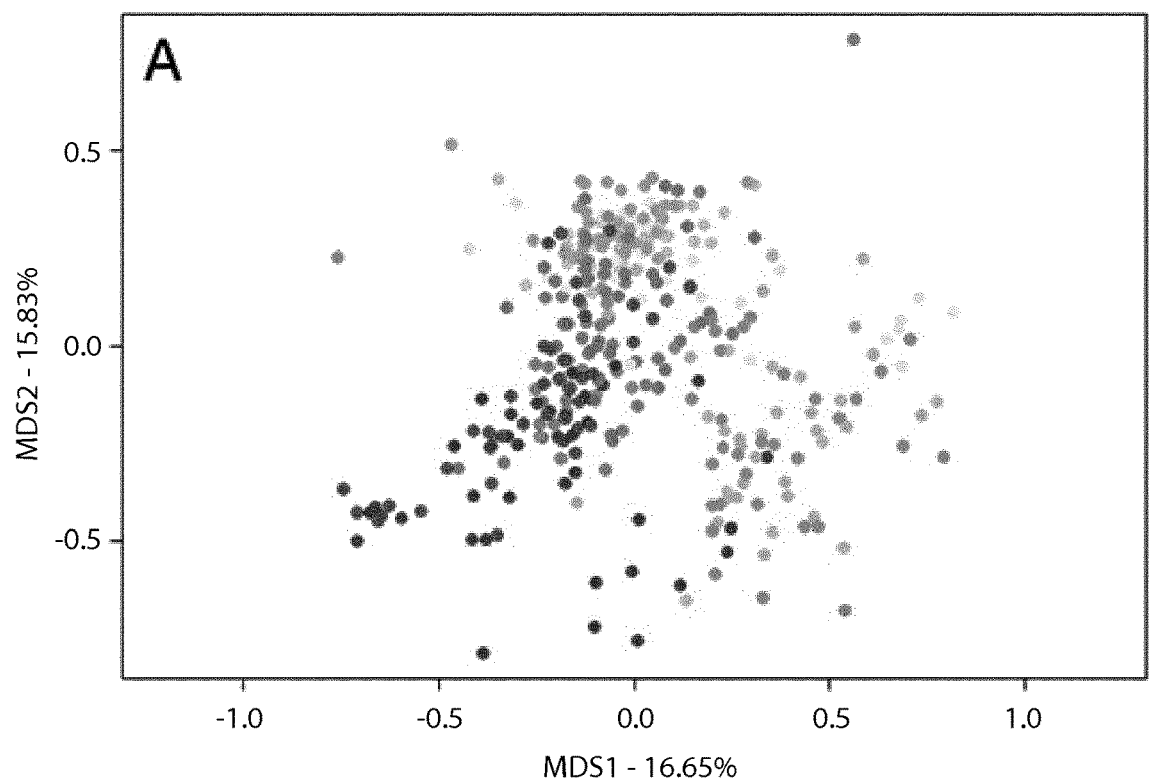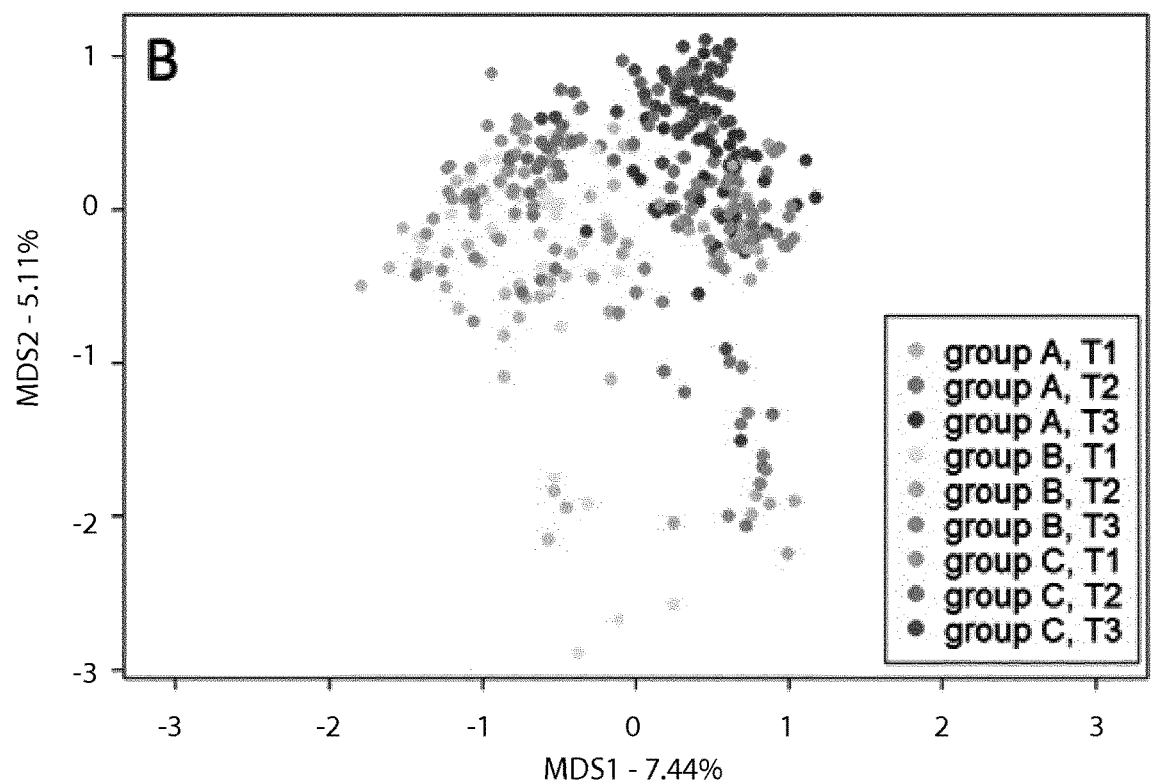
FIGURE 20

FIGURE 22 A-F

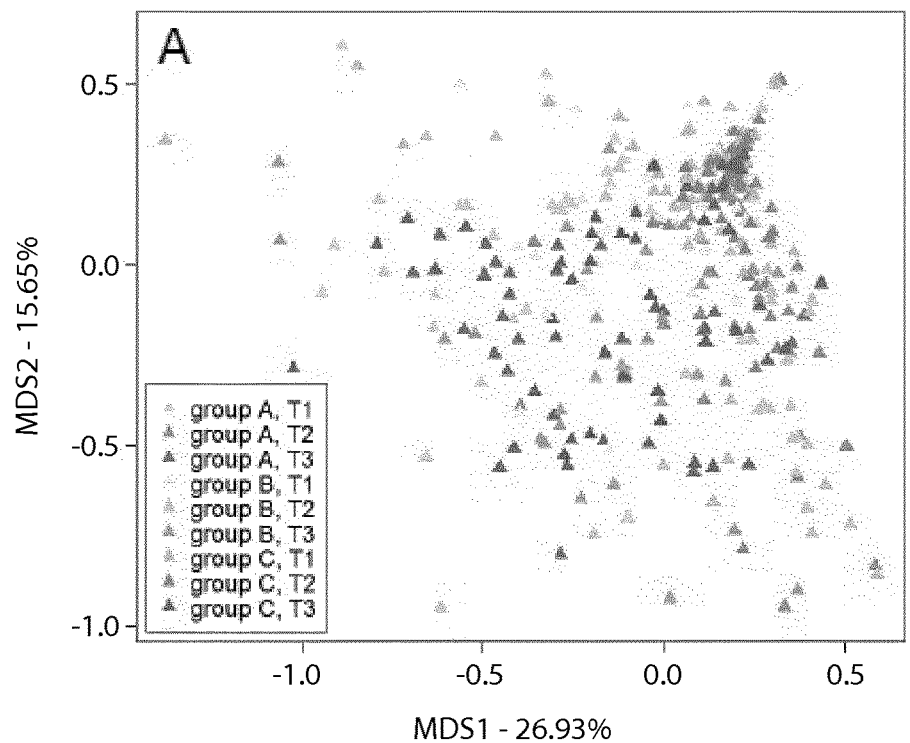
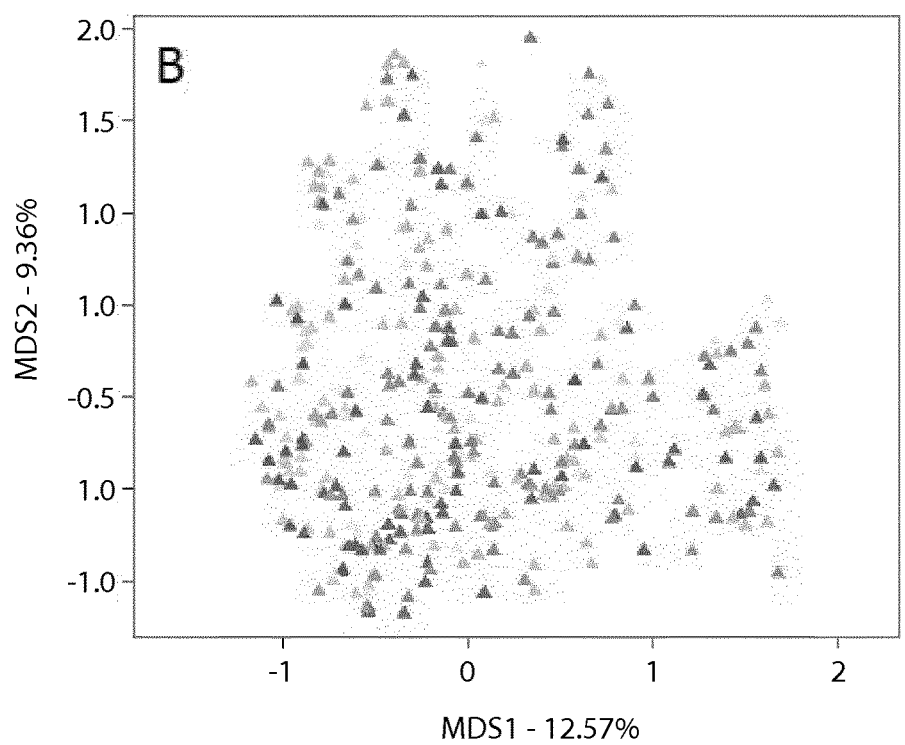
FIGURE 27

FORMULATIONS FOR IMPROVING GUT HEALTH

CROSS-REFERENCE TO RELATED APPLICATIONS

This application is the U.S. national phase of International Application No. PCT/EP2019/073012 filed 28 Aug. 2019, which designated the U.S. and claims priority to EP Patent Application No. 18191556.2 filed 29 Aug. 2018, and EP Patent Application No. 19173182.7 filed 7 May 2019, the entire contents of each of which are hereby incorporated by reference.

FIELD OF THE INVENTION

The present invention relates to formulations for improving gut health in animals and humans. In particular, the formulations of the invention can be used for increasing the concentration of short chain fatty acids (SCFAs) in the lower intestinal tract, and/or for increasing the butyrate synthesis pathway in the lower intestinal tract. The formulations of the present invention can further be used for increasing or to modulate microbiome diversity and/or abundance of beneficial bacteria such as *Bifidobacterium, Akkermansia* and *Faecalibacterium* in the lower intestinal tract. The invention further pertains to methods and compositions for improving gut barrier function and stimulating gut immune responses.

BACKGROUND

The human and animal microbiota is the collection of microbes that live on and in the human/animal body, with the largest and most diverse cluster of microorganisms inhabiting the gut. The gut microbiota has co-evolved with the host, which provides the microbes with a stable environment while the microbes provide the host with a broad range of functions such as digestion of complex dietary macronutrients, production of nutrients and vitamins, defense against pathogens, and maintenance of the immune system. Emerging data have demonstrated that an aberrant gut microbiota composition is associated with several diseases, including weakened immunity, allergies, metabolic disorders (such as type 2 diabetes mellitus), and inflammatory bowel diseases (IBD). One of the mechanisms in which microbiota affects human health and disease is its capacity to produce either harmful metabolites associated with development of disease or beneficial metabolites that protect against disease. Dietary fibers, but also proteins and peptides, which escape digestion by host enzymes in the upper gut, are metabolized by the microbiota in the cecum and colon. The major products from the microbial fermentative activity in the gut are SCFAs—in particular, acetate, propionate, and butyrate. An increasing body of evidence suggests that SCFAs in the human or animal gut have beneficial effects on host metabolic performance such as glucose metabolism, the immune system, integrity and barrier of the gastrointestinal tract and general gut health including gastrointestinal motility.

WO 2007/058523 A1 describes the use of n-3 docosapentaenoic acid for the manufacture of a nutritional of pharmaceutical composition for improving intestinal barrier integrity, improving barrier function, stimulating gut maturation and/or reducing intestinal barrier permeability.

WO 2016/053085 A1 describes compositions comprising a uridine source and butyrate producing fibers for use in the prevention or treatment of constipation, transit time dysfunction or colon length disorder.

US 2010/247489 A1 discloses the use of a delayed release composition comprising specific minerals such as tungsten for reducing gas formation in the colon. The composition may further comprise vitamins or a strain of acetogenic or butyrogenic bacteria.

Tan et al. (2016) Cell Reports, Vol. 15, No. 12, 2809-2824 investigates the beneficial roles of dietary fiber in peanut allergy using mice. Tan et al. reports that this effect involves reshaping of the gut microbiota as well as increased levels of short-chain fatty acids and activity of receptors GPR43 and GPR109a.

WO 2010/117274 A1 describes carbohydrates enhancing the production of a C5 and/or a C6 short-chain fatty acid.

WO 2017/182347 A1 describes microcapsules comprising a core containing vitamin B3, which are characterised by a coating layer system comprising two layers of shellac and a pH-modulating substance provided between the two layers of shellac.

U.S. Pat. No. 9,433,583 B2 describes a colon-targeted single dosage form comprising vitamin D and optionally further vitamins for preventing colorectal adenomatous polyps and colorectal cancer.

WO2014/070014 describes the use of riboflavin (Vitamin B2) to stimulate the population of *Faecalibacterium prausnitzii*.

SUMMARY OF THE INVENTION

The inventors of this application found that the gut microbiota produces increased amounts of SCFAs in the presence of certain micronutrients. In addition, also an increase in the butyrate synthesis pathway was observed. In further studies it was determined that the micronutrients can also increase microbiome diversity and microbe abundance in the intestine, improve the barrier function of the gut, and reduce gas generation. The invention therefore relates to the following items [1] to [67]:

[1] An active agent for use as defined in claim 1; or:
An active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for use in improving intestinal health in an animal, wherein said improving comprises or consists of:
  (i) increasing the concentration of at least one short-chain fatty acid or a salt thereof in the intestine,
  (ii) increasing microbiome diversity in the intestine,
  (iii) increasing microbial abundance in the intestine,
  (iv) promoting or increasing the butyrate synthesis pathway in the intestine,
  (v) improving the barrier function of the intestine,
  (vi) reducing the redox potential of the gut,
  (vii) reducing the amount of gas produced in the intestine, and/or
  (viii) stimulating intestinal immune responses;
wherein said use comprises administering to the animal a delayed release formulation comprising an effective dose of the active agent, wherein the release of the active agent is delayed until the intestine, preferably the large intestine.

[2] The active agent for use according to item [1], wherein said improving comprises or consists of increasing the concentration of at least one short-chain fatty acid or a salt thereof in the intestine, and wherein said at least one short-chain fatty acid is selected from the group consisting of butyric acid, acetic acid, propionic acid and combinations thereof.

[3] The active agent for use according to item [2], wherein said at least one short-chain fatty acid is butyric acid.

[4] The active agent for use according to item [2], wherein said at least one short-chain fatty acid is acetic acid.

[5] The active agent for use according to item [2], wherein said at least one short-chain fatty acid is propionic acid.

[6] The active agent for use according to any one of the preceding items, wherein said use comprises, or consists of, treating or preventing a disorder associated with low concentrations of one or more SCFAs in the lower intestinal tract.

[7] The active agent for use according to item [6], wherein said disorder associated with low concentrations of one or more SCFAs in the lower intestinal tract is an inflammatory disorder.

[8] The active agent for use according to item [7], wherein said inflammatory disorder is characterized by chronic inflammation.

[9] The active agent for use according to item [6], wherein said disorder associated with low concentrations of one or more SCFAs in the lower intestinal tract is atherogenesis.

[10] The active agent for use according to item [6], wherein said disorder associated with low concentrations of one or more SCFAs in the lower intestinal tract is a metabolic disorder.

[11] The active agent for use according to item [10], wherein said metabolic disorder is type 2 diabetes and/or obesity.

[12] The active agent for use according to item [1], wherein said improving comprises, or consists of, increasing microbiome diversity in the intestine.

[13] The active agent for use according to item [12], wherein said use comprises, or consists of, treating or preventing a disorder associated with insufficient microbiome diversity in the intestine.

[14] The active agent for use according to item [1], wherein said improving comprises, or consists of, increasing the abundance of at least one microbe selected from the group consisting of *Bifidobacterium, Akkermansia* and *Faecalibacterium* in the human intestine.

[15] The active agent for use according to item [14], wherein said use comprises, or consists of, treating or preventing a disorder associated with insufficient *Bifidobacterium, Akkermansia* or *Faecalibacterium* abundance in the human intestine such as IBD, metabolic disease including obesity and type 2 diabetes and other inflammatory conditions.

[16] The active agent for use according to item [1] wherein the improvement comprises or consists of increasing the abundance of at least one microbe selected from the group consisting of *Bacteroides*, Alistipes, and *Faecalibacterium*.

[17] The active agent for use according to item [1], wherein said improving comprises, or consists of, promoting or increasing the butyrate synthesis pathway in the intestine.

[18] The active agent for use according to item [17], wherein said use comprises, or consists of, treating or preventing a disorder associated with an insufficient butyrate synthesis in the intestine.

[19] An active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for use in the treatment or prevention of a condition associated with an impaired barrier function of the intestine of an animal, preferably a mammal, wherein said use comprises administering to the animal a delayed release formulation comprising an effective dose of the active agent, wherein the release of the active agent is delayed until the large intestine.

[20] The active agent for use according to item [19], wherein said condition associated with an impaired barrier function of the intestine of an animal is characterized by a leaky gut.

[21] The active agent for use according to item [19] or [20], wherein said condition associated with an impaired barrier function of the intestine is caused by malnutrition.

[22] The active agent for use according to item [19] or [20], wherein said condition associated with an impaired barrier function of the intestine of an animal is inflammatory bowel disease.

[23] The active agent for use according to item [22], wherein said inflammatory bowel disease is Crohn's disease.

[24] The active agent for use according to item [22], wherein said inflammatory bowel disease is Ulcerative colitis.

[25] The active agent for use according to item [19], wherein said animal is a monogastric animal.

[26] The active agent for use according to item [19], wherein said animal is poultry or swine.

[27] The active agent for use according to any one of items [1] to [26], wherein the delayed release formulation is an extended release formulation.

[28] The active agent for use according to any one of items [1] to [26], wherein the release of the active agent is delayed until the large intestine.

[29] The active agent for use according to any one of items [1] to [26], wherein the release of the active agent is delayed until the colon.

[30] The active agent for use according to any one of items [1] to [29], wherein the active agent consists of riboflavin.

[31] The active agent for use according to any one of items [1] to [29], wherein the active agent consists of vitamin A.

[32] The active agent for use according to any one of items [1] to [29], wherein the active agent consists of vitamin C.

[33] The active agent for use according to any one of items [1] to [29], wherein the active agent consists of vitamin D.

[34] The active agent for use according to any one of items [1] to [29], wherein the active agent consists of vitamin E.

[35] The active agent for use according to any one of items [1] to [29], wherein the active agent consists of vitamin K.

[36] The active agent for use according to any one of items [1] to [29], wherein the active agent consists of folic acid.

[37] The active agent for use according to any one of items [1] to [29], wherein the active agent consists of β-carotene.

[38] The active agent for use according to any one of items [1] to [29], wherein the active agent consists of vitamin B1.

[39] The active agent for use according to any one of items [1] to [29], wherein the active agent consists of niacin.

[40] The active agent for use according to any one of items [1] to [29], wherein the active agent consists of vitamin B5.

[41] The active agent for use according to any one of items [1] to [29], wherein the active agent consists of vitamin B6.

[42] The active agent for use according to any one of items [1] to [29], wherein the active agent consists of biotin.

[43] The active agent for use according to any one of items [1] to [29], wherein the active agent consists of vitamin B12.

[44] The active agent for use according to any one of items [1] to [29], wherein the active agent consists of at least one omega-3 fatty acid.

[45] The active agent for use according to item [44], wherein the active agent consists of docosahexaenoic acid (DHA), eicosapentaenoic acid (EPA), or a combination thereof.

[46] The active agent for use according to item [44], wherein the active agent consists of DHA.

[47] The active agent for use according to item [44], wherein the active agent consists of EPA.

[48] The active agent for use according to item [44], wherein the active agent consists of a combination of DHA and EPA.

[49] The active agent for use according to any one of items [1] to [29], wherein the active agent consists of a combination of riboflavin, vitamin A, vitamin C, vitamin D, vitamin E, vitamin K, folic acid, β-carotene, vitamin B1, niacin, vitamin B5, vitamin B6, biotin, vitamin B12, DHA and EPA.

[50] The active agent for use according to any one of the preceding items, wherein the active agent is administered to the animal, preferably a mammal, at a daily dose of up to 2.9 mg riboflavin per kg body weight, up to 42.9 µg vitamin A per kg body weight, up to 3.6 µg vitamin D per kg body weight, up to 28.6 mg vitamin C per kg body weight, up to 14.3 mg vitamin E per kg body weight, up to 143 µg vitamin K per kg body weight, up to 14.3 µg folic acid per kg body weight, up to 0.4 mg β-carotene, up to 1.4 mg vitamin B1, up to 21.4 mg niacin, up to 14.3 mg vitamin B5, up to 1.4 mg vitamin B6, up to 35.7 µg biotin, up to 43 µg vitamin B12, 71.4 mg omega-3 fatty acid(s) per kg body weight or combinations thereof, where preferably EPA is up to 25.7 mg per kg body weight and DHA is up to 14.3 mg per kg body weight.

[51] A delayed release formulation for delivery of an active agent to the intestine, comprising the active agent and an enteric layer or an enteric shell, wherein said active agent consists of up to 200 mg riboflavin, up to 3000 µg vitamin A, up to 2000 mg vitamin C, up to 250 µg vitamin D, up to 1000 mg vitamin E, up to 10 mg vitamin K, up to 1 mg folic acid, up to 25 mg β-carotene, up to 100 mg vitamin B1, up to 1500 mg niacin, up to 1000 mg vitamin B5, up to 100 mg vitamin B6, up to 2500 µg biotin, up to 3000 µg vitamin B12, up to 5000 mg omega-3 fatty acid(s) or combinations thereof where preferably EPA is up to 1800 mg and DHA is up to 1000 mg, and wherein the release of the active agent is delayed until the intestine.

[52] A delayed release formulation for delivery of an active agent to the intestine, comprising the active agent and an enteric layer or an enteric shell, wherein said active agent consists of 1-85 mg riboflavin, 0.2-0.4 mg vitamin A, 400-600 mg vitamin C, 5-80 µg vitamin D, 80-120 mg vitamin E, 80-140 µg vitamin K, 0.3-0.5 mg folic acid, 80-120 mg omega-3 fatty acid(s) or combinations thereof, and wherein the release of the active agent is delayed until the intestine.

[53] The delayed release formulation of item [51] or [52], wherein said active agent consists of 70-80 mg riboflavin, 0.25-0.35 mg vitamin A, 450-550 mg vitamin C, 15-25 µg vitamin D, 90-110 mg vitamin E, 100-120 µg vitamin K, 0.35-0.45 mg folic acid, 90-110 mg omega-3 fatty acid(s) or combinations thereof.

[54] The composition according to any one of items [51] to [53], wherein the release of the active agent is delayed until the colon.

[55] The non-therapeutic use of an active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for improving the condition or health of the intestine of an animal, preferably a mammal, monogastric, or poultry not suffering from any disorder or pathologic condition of the intestine.

[56] The non-therapeutic use of item [55], wherein said mammal is a healthy human.

[57] The non-therapeutic use of item [55], wherein said mammal is a healthy adult human.

[58] The non-therapeutic use of any one of items [55] to [57], wherein said improving comprises, or consists of, increasing the concentration of at least one short-chain fatty acid or a salt thereof in the intestine.

[59] The non-therapeutic use of any one of items [55] to [57], wherein said improving comprises, or consists of, increasing microbiome diversity in the intestine.

[60] The non-therapeutic use of any one of items [55] to [57], wherein said improving comprises, or consists of, increasing *Bifidobacterium, Akkermansia* and/or *Faecalibacterium* abundance in the intestine.

[61] The non-therapeutic use of any one of items [55] to [57], wherein said improving comprises, or consists of, promoting or increasing the butyrate synthesis pathway in the intestine.

[62] The non-therapeutic use of any one of items [55] to [57], wherein said improving comprises, or consists of, improving the barrier function of the intestine, wherein the active agent does not comprise an omega-3 fatty acid.

[63] The non-therapeutic use of any one of items [55] to [62], wherein said active agent does not comprise vitamin D3.

[64] The non-therapeutic use of any one of items [55] to [63], wherein said active agent does not comprise an omega-3 fatty acid.

[65] The non-therapeutic use of an active agent selected from the group consisting of riboflavin, vitamin A, vitamin D, vitamin C, vitamin E, vitamin K, folic acid, β-carotene, vitamin B1, niacin, vitamin B5, vitamin B6, biotin, vitamin B12, omega-3 fatty acids and combinations thereof, for maintaining or improving gut function in a healthy mammal.

[66] A method of improving intestinal health in an animal wherein said improving comprises or consists of
  (i) increasing the concentration of at least one short-chain fatty acid or a salt thereof in the intestine,
  (ii) increasing microbiome diversity in the intestine,
  (iii) increasing microbial abundance in the intestine,
  (iv) promoting or increasing the butyrate synthesis pathway in the intestine,
  (v) improving the barrier function of the intestine,
  (vi) reducing the redox potential of the gut, and/or
  (vii) reducing the amount of gas produced in the intestine;
  comprising administering to the animal a delayed release formulation comprising an effective dose of the active agent wherein the release of the active agent is delayed until the intestine, or feed comprising a supra physiological doses of an active agent, and is present in the intestine at an effective amount;

and wherein the active agent is selected from the group consisting of: riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof.

[67] A poultry or non-human feed comprising a supraphysiological dose of an active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, wherein a sufficient amount of the active agent is present in the intestine.

the Present Invention Further Relates to the Following Embodiments:

(1) An active agent selected from the group consisting of riboflavin, vitamin A, vitamin C vitamin D, vitamin E, vitamin K, folic acid, β-carotene, vitamin B1, niacin, vitamin B5, vitamin B6, biotin, vitamin B12, omega-3 fatty acids and combinations thereof, for use in increasing the concentration of at least one short-chain fatty acid (SCFA) or a salt thereof in the intestine of a mammal, wherein said use comprises administering to the mammal a delayed release formulation comprising an effective dose of the active agent, wherein the release of the active agent is delayed until the intestine.

(2) The active agent for use according to embodiment (1), wherein said at least one short-chain fatty acid is selected from the group consisting of butyric acid, acetic acid, propionic acid and combinations thereof.

(3) The active agent for use according to embodiment (2), wherein said at least one short-chain fatty acid is butyric acid.

(4) The active agent for use according to embodiment (2), wherein said at least one short-chain fatty acid is acetic acid.

(5) The active agent for use according to embodiment (2), wherein said at least one short-chain fatty acid is propionic acid.

(6) The active agent for use according to any one of the preceding embodiments, wherein said use comprises, or consists of, treating or preventing a disorder associated with low concentrations of one or more SCFAs in the lower intestinal tract.

(7) The active agent for use according to embodiment (6), wherein said disorder associated with low concentrations of one or more SCFAs in the lower intestinal tract is an inflammatory disorder.

(8) The active agent for use according to embodiment (7), wherein said inflammatory disorder is characterized by chronic inflammation.

(9) The active agent for use according to embodiment (6), wherein said disorder associated with low concentrations of one or more SCFAs in the lower intestinal tract is atherogenesis.

(10) The active agent for use according to embodiment (6), wherein said disorder associated with low concentrations of one or more SCFAs in the lower intestinal tract is a metabolic disorder.

(11) An active agent selected from the group consisting of riboflavin, vitamin A, vitamin C, vitamin D, vitamin E, vitamin K, folic acid, omega-3 fatty acids and combinations thereof, for use in the treatment or prevention of a condition associated with an impaired barrier function of the intestine of a mammal, wherein said use comprises administering to the mammal a delayed release formulation comprising an effective dose of the active agent, wherein the release of the active agent is delayed until the intestine.

(12) The active agent for use according to embodiment (12), wherein said condition associated with an impaired barrier function of the intestine of a mammal is characterized by a leaky gut.

(13) The active agent for use according to embodiment (12) or (13), wherein said condition associated with an impaired barrier function of the intestine is caused by malnutrition.

(14) The active agent for use according to embodiment (12) or (13), wherein said condition associated with an impaired barrier function of the intestine of a mammal is inflammatory bowel disease.

(15) The active agent for use according to embodiment (15), wherein said inflammatory bowel disease is Crohn's disease.

(16) The active agent for use according to embodiment (15), wherein said inflammatory bowel disease is Ulcerative colitis.

(17) The active agent for use according to any one of embodiments (1) to (17), wherein the delayed release formulation is an extended release formulation.

(18) The active agent for use according to any one of embodiments (1) to (17), wherein the release of the active agent is delayed until the large intestine.

(19) The active agent for use according to any one of embodiments (1) to (17), wherein the release of the active agent is delayed until the colon.

(20) The active agent for use according to any one of the preceding embodiments, wherein the active agent consists of riboflavin.

(21) The active agent for use according to any one of the preceding embodiments, wherein the active agent consists of vitamin A.

(22) The active agent for use according to any one of the preceding embodiments, wherein the active agent consists of vitamin C.

(23) The active agent for use according to any one of the preceding embodiments, wherein the active agent consists of vitamin D.

(24) The active agent for use according to any one of the preceding embodiments, wherein the active agent consists of vitamin E.

(25) The active agent for use according to any one of the preceding embodiments, wherein the active agent consists of vitamin K.

(26) The active agent for use according to any one of the preceding embodiments, wherein the active agent consists of folic acid.

(27) The active agent for use according to any one of the preceding embodiments, wherein the active agent consists of at least one omega-3 fatty acid.

(28) The active agent for use according to any one of the preceding embodiments, wherein the active agent consists of docosahexaenoic acid (DHA), eicosapentaenoic acid (EPA), or a combination thereof.

(29) The active agent for use according to any one of the preceding embodiments, wherein the active agent consists of DHA.

(30) The active agent for use according to any one of the preceding embodiments, wherein the active agent consists of EPA.

(31) The active agent for use according to any one of the preceding embodiments, wherein the active agent consists of a combination of DHA and EPA.
(32) The active agent for use according to any one of the preceding embodiments, wherein the active agent consists of a combination of riboflavin, vitamin A, vitamin C, vitamin D, vitamin E, vitamin K, folic acid, β-carotene, vitamin B1, niacin, vitamin B5, vitamin B6, biotin, vitamin B12, DHA and EPA.
(33) The active agent for use according to any one of the preceding embodiments, wherein the active agent is administered to the mammal at a daily dose 0.01-1.2 mg riboflavin per kg body weight, 2.9-5.7 µg vitamin A per kg body weight, 0.1-1.1 µg vitamin D per kg body weight, 0.2-1.7 mg vitamin E per kg body weight, 1.1-2.0 µg vitamin K per kg body weight, 4.3-7.1 µg folic acid per kg body weight 1.1-1.7 mg omega-3 fatty acid(s) per kg body weight or combinations thereof.
(34) The active agent for use according to any one of the preceding embodiments, wherein the active agent is administered to the mammal at a daily dose of 1.0-1.1 mg riboflavin per kg body weight, 3.6-5.0 µg vitamin A per kg body weight, 0.2-0.4 µg vitamin D per kg body weight, 1.3-1.6 mg vitamin E per kg body weight, 1.4-1.7 µg vitamin K per kg body weight, 5.0-6.4 µg folic acid per kg body weight 1.3-1.6 mg omega-3 fatty acid(s) per kg body weight, or combinations thereof.
(35) A delayed release formulation for delivery of an active agent to the intestine, comprising the active agent and an enteric coating, wherein said active agent consists of 1-85 mg riboflavin, 0.2-0.4 mg vitamin A, 400-600 mg vitamin C, 5-80 ag vitamin D, 80-120 mg vitamin E, 80-140 µg vitamin K, 0.3-0.5 mg folic acid, 80-120 mg omega-3 fatty acid(s) or combinations thereof, and wherein the release of the active agent is delayed until the intestine.
(36) The delayed release formulation of embodiment (36), wherein said active agent consists of 70-80 mg riboflavin, 0.25-0.35 mg vitamin A, 450-550 mg vitamin C, 15-25 µg vitamin D, 90-110 mg vitamin E, 100-120 µg vitamin K, 0.35-0.45 mg folic acid, 90-110 mg Omega-3 fatty acid(s) or combinations thereof.
(37) The delayed release formulation of embodiment (36) or (37), wherein the delayed release formulation is an extended release formulation.
(38) The delayed release formulation of embodiment (36) or (37), wherein the release of the active agent is delayed until the large intestine preferably in the colon.
(39) The delayed release formulation of embodiment (36) or (37), wherein the release of the active agent is delayed until the colon.
(40) The delayed release formulation of any one of embodiments (36) to (40), comprising riboflavin as the sole active agent.
(41) The delayed release formulation of any one of embodiments (36) to (40), comprising vitamin A as the sole active agent.
(42) The delayed release formulation of any one of embodiments (36) to (40), comprising vitamin C as the sole active agent.
(43) The delayed release formulation of any one of embodiments (36) to (40), comprising vitamin D as the sole active agent.
(44) The delayed release formulation of any one of embodiments (36) to (40), comprising vitamin E as the sole active agent.
(45) The delayed release formulation of any one of embodiments (36) to (40), comprising vitamin K as the sole active agent.
(46) The delayed release formulation of any one of embodiments (36) to (40), comprising folic acid as the sole active agent.
(47) The delayed release formulation of any one of embodiments (36) to (40), comprising β-carotene as the sole active agent.
(48) The delayed release formulation of any one of embodiments (36) to (40), comprising vitamin B1 as the sole active agent.
(49) The delayed release formulation of any one of embodiments (36) to (40), comprising niacin as the sole active agent.
(50) The delayed release formulation of any one of embodiments (36) to (40), comprising vitamin B5 as the sole active agent.
(51) The delayed release formulation of any one of embodiments (36) to (40), comprising vitamin B6 as the sole active agent.
(52) The delayed release formulation of any one of embodiments (36) to (40), comprising biotin as the sole active agent.
(53) The delayed release formulation of any one of embodiments (36) to (40), comprising vitamin B12 as the sole active agent.
(54) The delayed release formulation of any one of embodiments (36) to (40), comprising one or more omega-3 fatty acid(s) as the sole active agent.
(55) The non-therapeutic use of an active agent selected from the group consisting of riboflavin, vitamin A, vitamin D, vitamin C, vitamin E, vitamin K, folic acid, β-carotene, vitamin B1, niacin, vitamin B5, vitamin B6, biotin, vitamin B12, omega-3 fatty acids and combinations thereof, for increasing the concentration of at least one short-chain fatty acid or a salt thereof in the intestine of a mammal not suffering from any disorder or pathologic condition of the intestine.
(56) The non-therapeutic use of embodiment (49), wherein said mammal is a healthy human.
(57) The non-therapeutic use of an active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for maintaining or improving gut function in a healthy mammal.
(58) The non-therapeutic use of embodiment (51), wherein said mammal is a human.

DESCRIPTION OF THE DRAWINGS

FIG. 1 Acetate production after 48 h fermentation upon administration of the different test products, either as an aqueous solution (top) or dissolved in ethanol (bottom). A negative control for each type of stock solution was also included. RTG=Riboflavin Table Grade, R5P=Riboflavin-5-phosphate, AA=Ascorbic Acid, RTG+AA=Riboflavin Table Grade+Ascorbic Acid, FA=Folic Acid, VK1=Vitamin K1, 0080 EE=DHA, 4535 EE=DHA+EPA, 8000 EE=EPA. Each compound was tested at 3 doses (0.2×, 1× and 5×) (Table 1).

FIG. 2 Propionate production after 48 h fermentation upon administration of the different test products, either as an aqueous solution (top) or dissolved in ethanol (bottom). A negative control for each type of stock solution was also included. RTG=Riboflavin Table Grade, R5P=Riboflavin-5- phosphate, AA=Ascorbic Acid, RTG+AA=Riboflavin Table Grade+Ascorbic Acid, FA=Folic Acid, VK1=Vitamin K1, 0080 EE=DHA, 4535 EE=DHA+EPA, 8000 EE=EPA. Each compound was tested at 3 doses (0.2×, 1× and 5×) (Table 1).

FIG. 3 Butyrate production after 48 h fermentation upon administration of the different test products, either as an aqueous solution (top) or dissolved in ethanol (bottom). A negative control for each type of stock solution was also included. RTG=Riboflavin Table Grade, R5P=Riboflavin-5-phosphate, AA=Ascorbic Acid, RTG+AA=Riboflavin Table Grade+Ascorbic Acid, FA=Folic Acid, VK1=Vitamin K1, 0080 EE=DHA, 4535 EE=DHA+EPA, 8000 EE=EPA. Each compound was tested at 3 doses (0.2×, 1× and 5×) (Table 1).

FIG. 4 Total SCFA production after 48 h fermentation upon administration of the different test products, either as an aqueous solution (top) or dissolved in ethanol (bottom). A negative control for each type of stock solution was also included. RTG=Riboflavin Table Grade, R5P=Riboflavin-5-phosphate, AA=Ascorbic Acid, RTG+AA=Riboflavin Table Grade+Ascorbic Acid, FA=Folic Acid, VK1=Vitamin K1, 0080 EE=DHA, 4535 EE=DHA+EPA, 8000 EE=EPA. Each compound was tested at 3 doses (0.2×, 1× and 5×) (Table 1).

Figure 5:
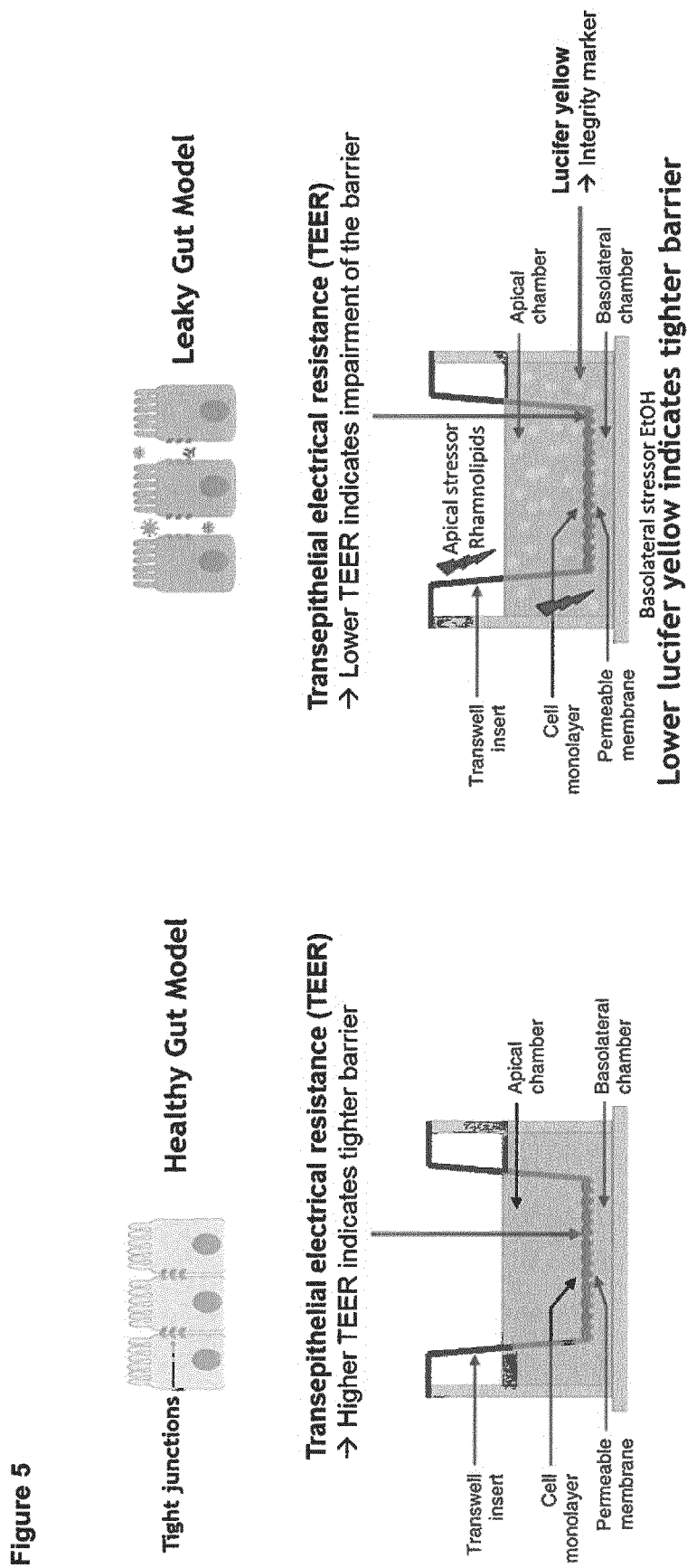

FIG. 5A schematic representation of co-cultured Caco-2 and goblet cells in a transwell plate. Measurements of transepithelial electrical resistance (TEER) provides information about the integrity of the tight junctions formed between the polarized cells. 'Leaky gut' is characterized by increased intestinal permeability and can be achieved in vitro by stressing the cells. Addition of apical or basolateral stressors leads to a significant time-dependent decrease in TEER and an increase in lucifer yellow paracellular flux rate compared with the control cells.

Figure 6:
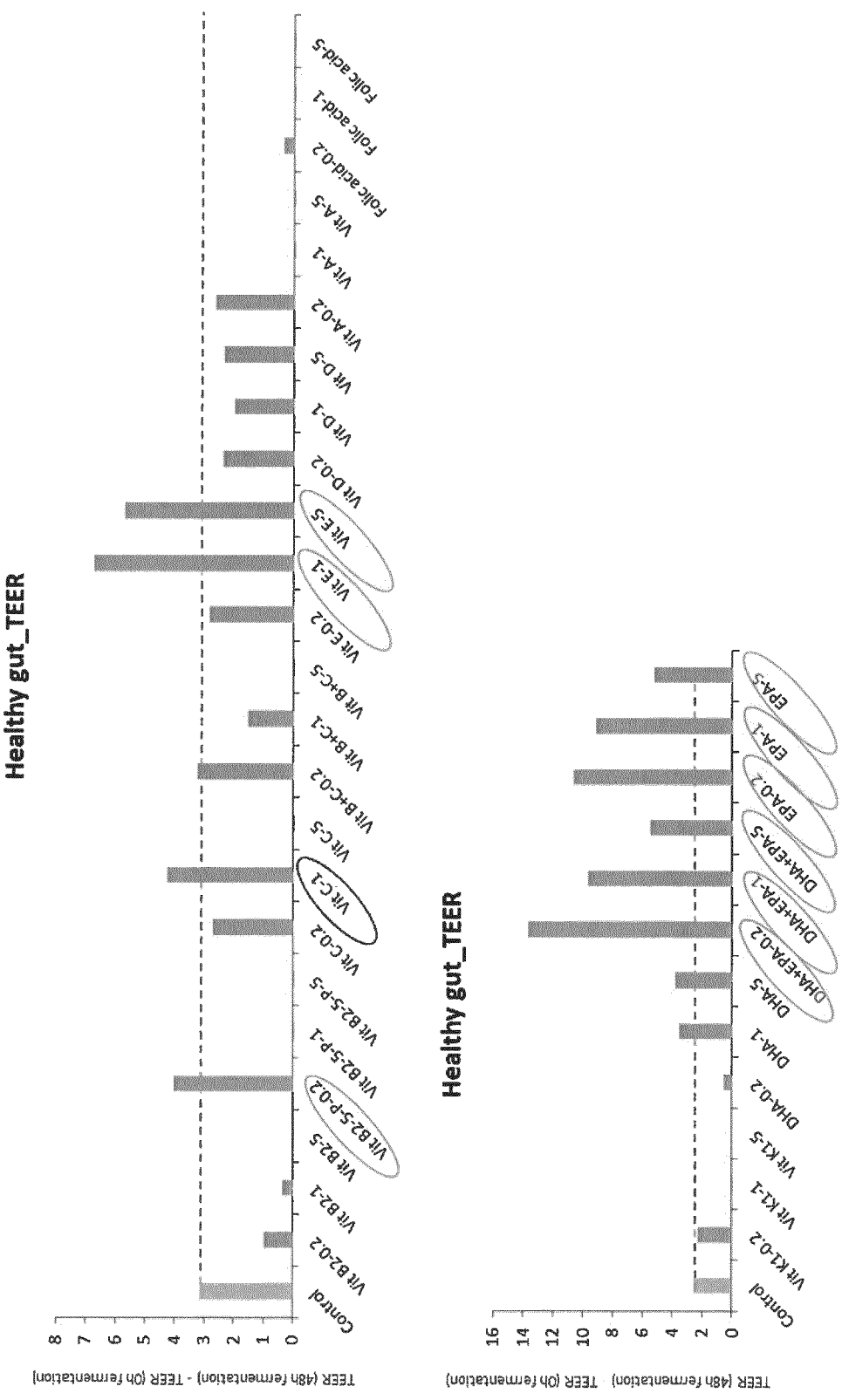

FIG. 6 Impact of vitamins and omega-3-fatty acids on gut integrity in healthy gut cellular model. Values are depicted as the difference between trans-epithelial electrical resistant (TEER) of cells treated with 48 h fermentation samples and TEER of cells treated with 0 h fermentation samples. Each compound was tested at 3 doses (0.2×, 1× and 5×) (Table 1).

Figure 7:
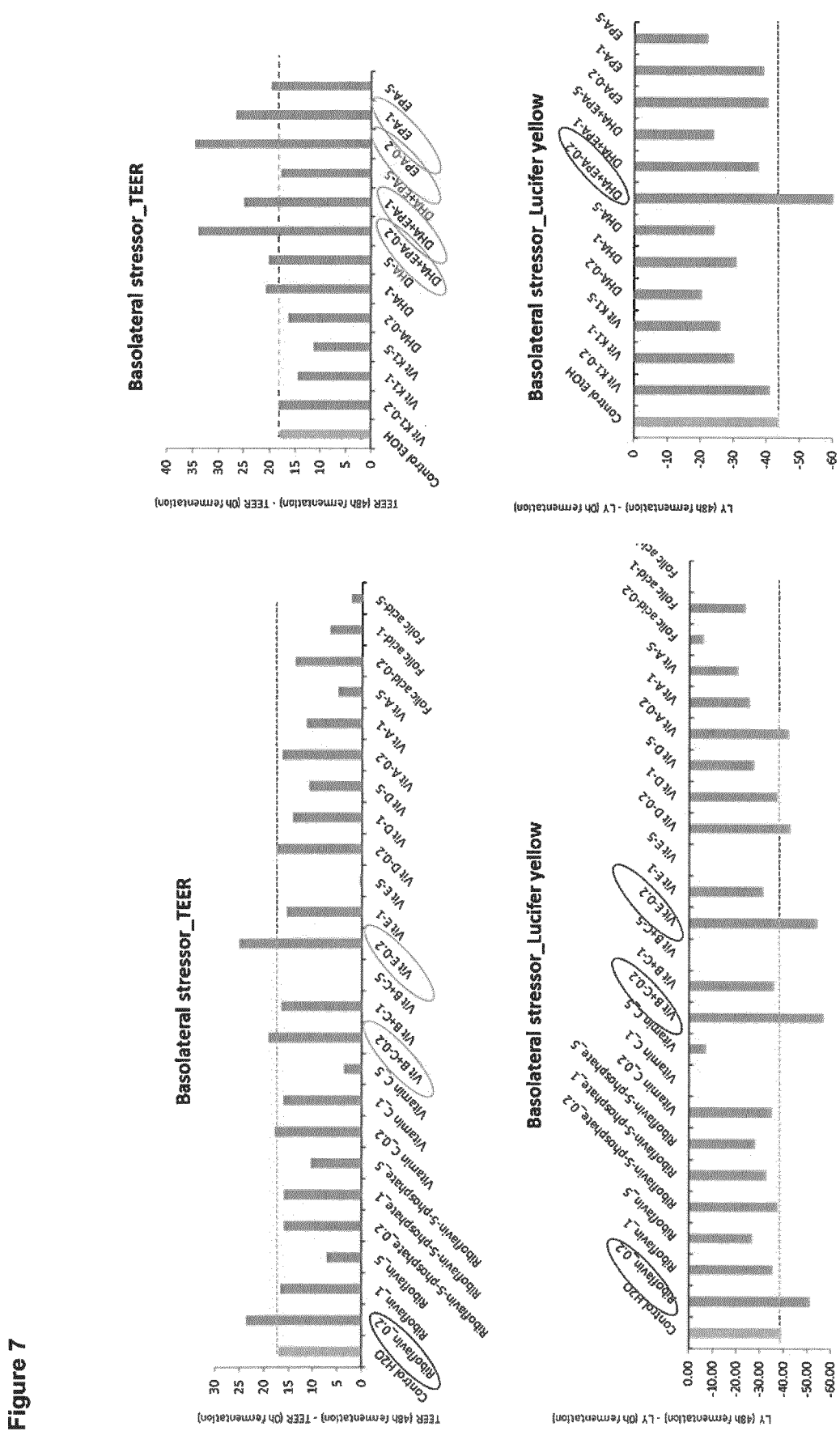

FIG. 7 Impact of vitamins and omega-3-fatty acids on gut integrity in basolateral induction of leaky gut cellular model. Values are depicted as the difference between trans-epithelial electrical resistant (TEER)/Lucifer yellow of cells treated with 48 h fermentation samples and TEER/Lucifer yellow of cells treated with 0 h fermentation samples. Each compound was tested at 3 doses (0.2×, 1× and 5×) (Table 1).

Figure 8:
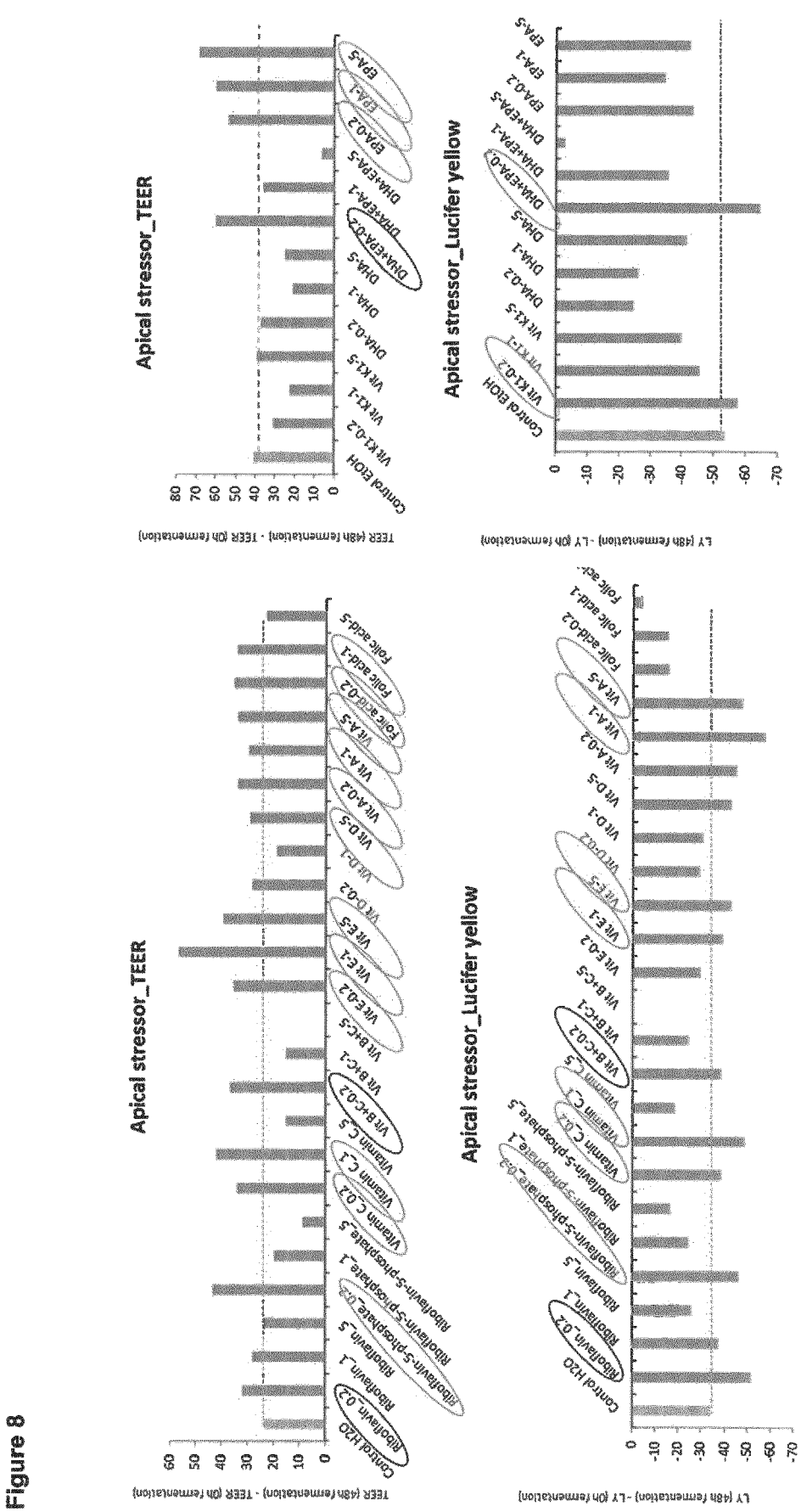

FIG. 8 Impact of vitamins and omega-3-fatty acids on gut integrity in apical induction of leaky gut cellular model. Values are depicted as the difference between trans-epithelial electrical resistant (TEER)/Lucifer yellow of cells treated with 48 h fermentation samples and TEER/Lucifer yellow of cells treated with 0 h fermentation samples. Each compound was tested at 3 doses (0.2×, 1× and 5×) (Table 1).

FIG. 9 Shannon diversity index after 24 h fermentation upon administration of the different test products, either as an aqueous solution (top) or dissolved in ethanol (bottom). A negative control for each type of stock solution was also included. Each compound was tested at 3 doses (0.2×, 1× and 5×) (Table 1).

Figure 10:
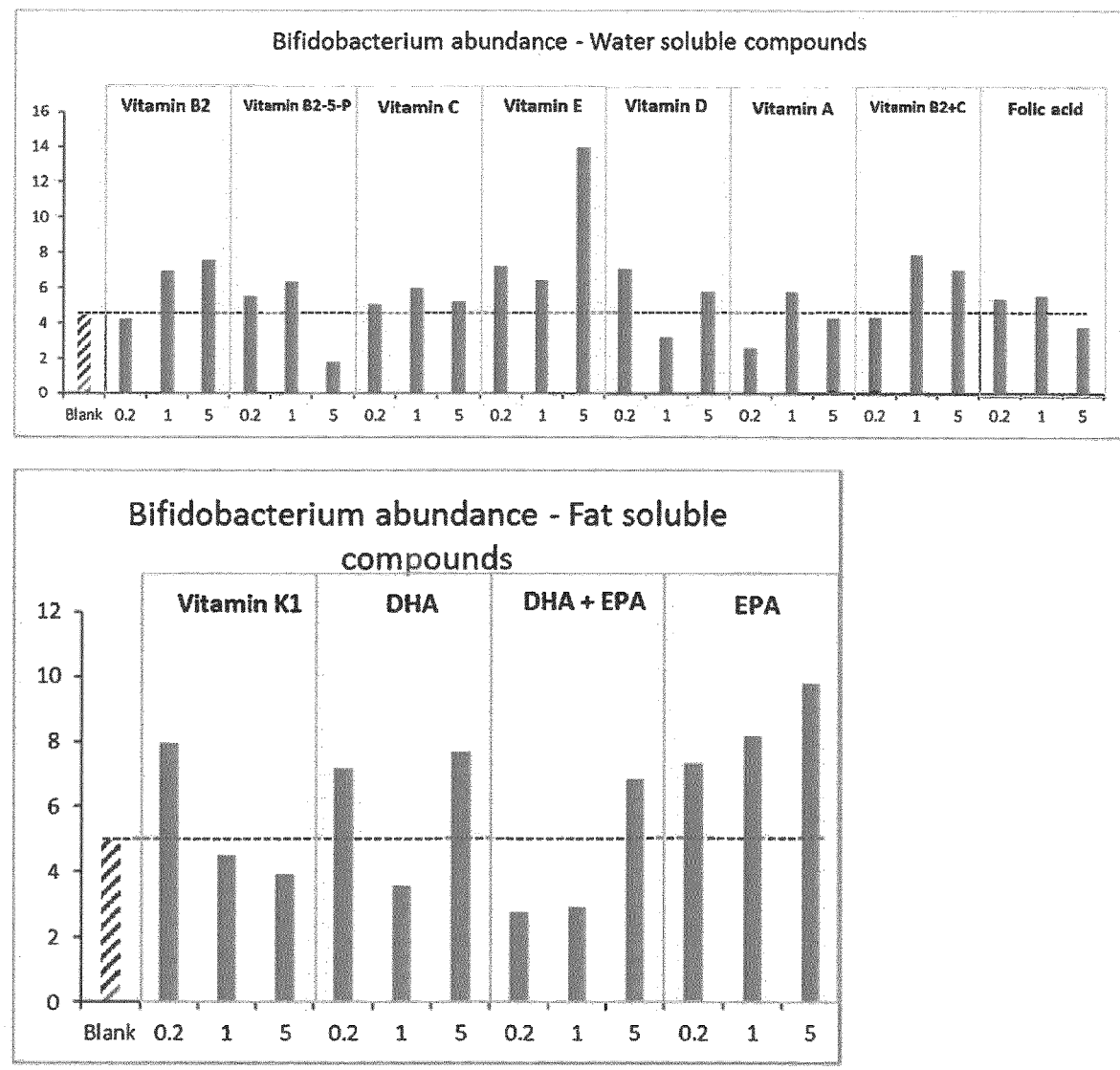

FIG. 10 Relative abundance (%) of *Bifidobacterium* after 24 h fermentation upon administration of the different test products, either as an aqueous solution (top) or dissolved in ethanol (bottom). A negative control for each type of stock solution was also included. Each compound was tested at 3 doses (0.2×, 1× and 5×) (Table 1).

FIG. 11 Relative abundance (%) of genes involved in Acetyl-CoA fermentation to Butyrate pathway after 24 h fermentation upon administration of the different test products, either as an aqueous solution (top) or dissolved in ethanol (bottom). A negative control for each type of stock solution was also included. Each compound was tested at 3 doses (0.2×, 1× and 5×) (Table 1).

Figure 12:
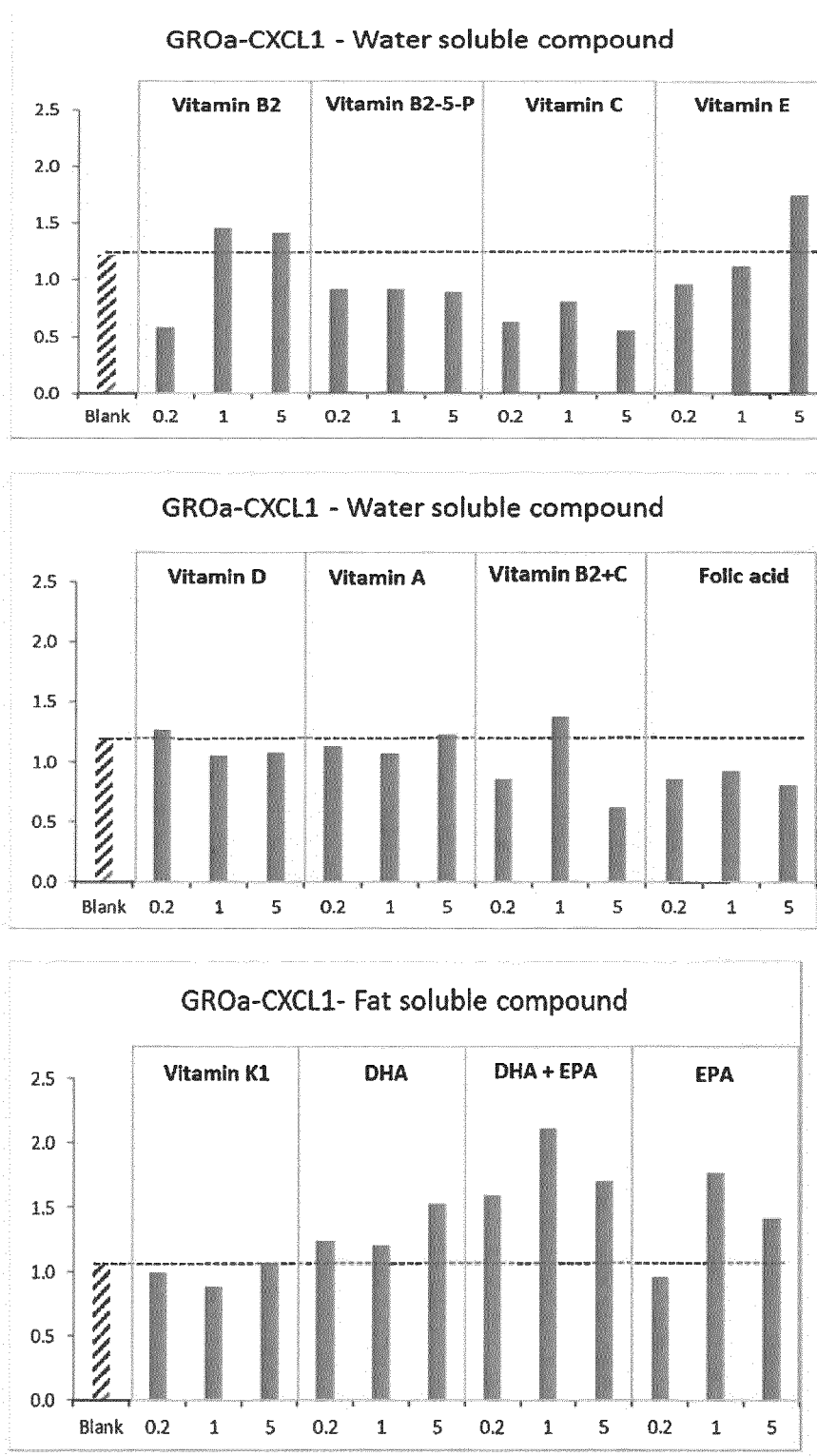

FIG. 12 Effect of vitamins and omega-3 fatty acids on GROa-CXCL1 production by HT29 cells. Data are expressed as pg/ml.

Figure 13:
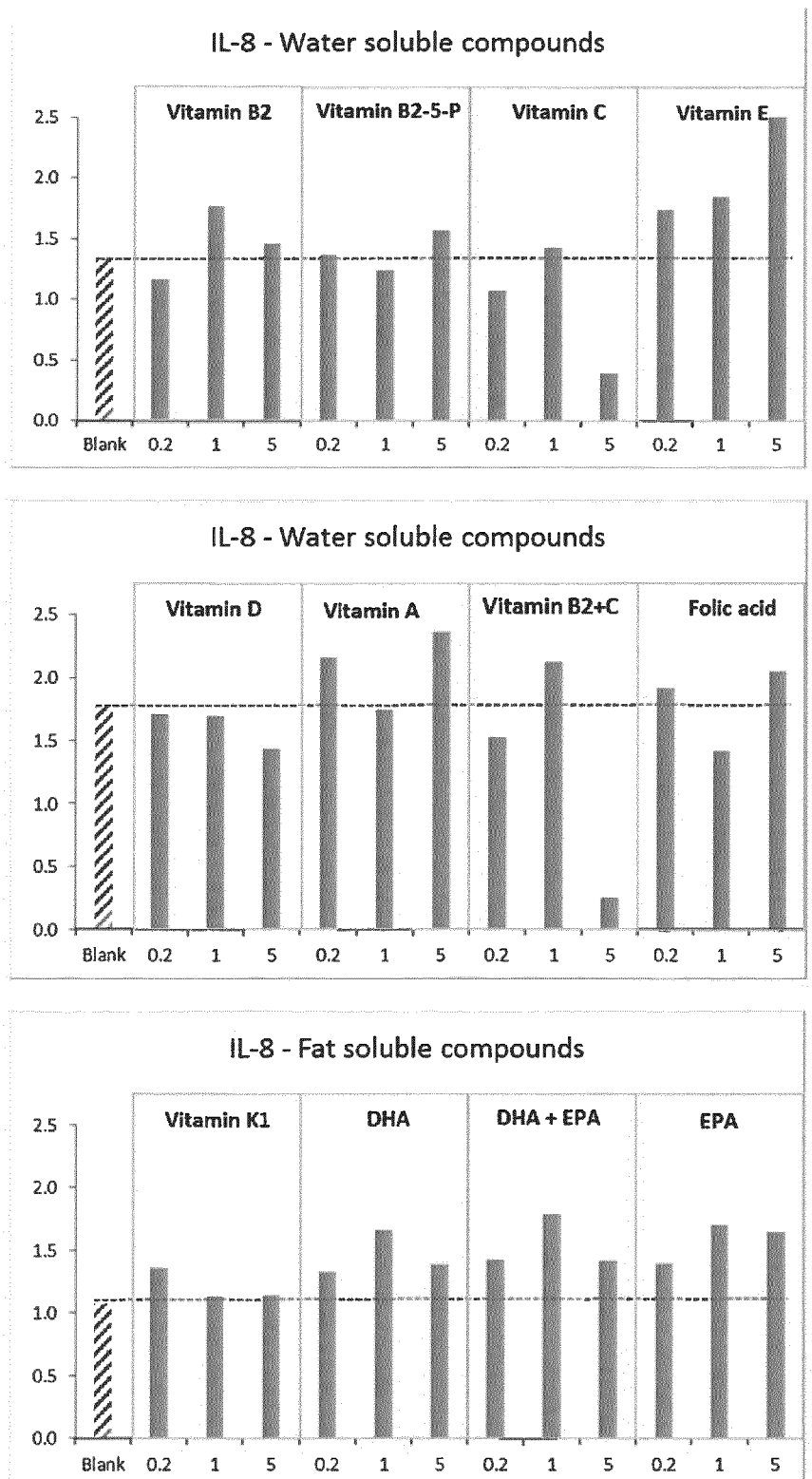

FIG. 13 Effect of vitamins and omega-3 fatty acids on IL-8 production by HT29 cells. Data are expressed as pg/mi.

FIG. 14 Effect of vitamins and omega-3 fatty acids on MIP3A-CCL20 production by HT29 cells. Data are expressed as pg/ml.

Figure 15:
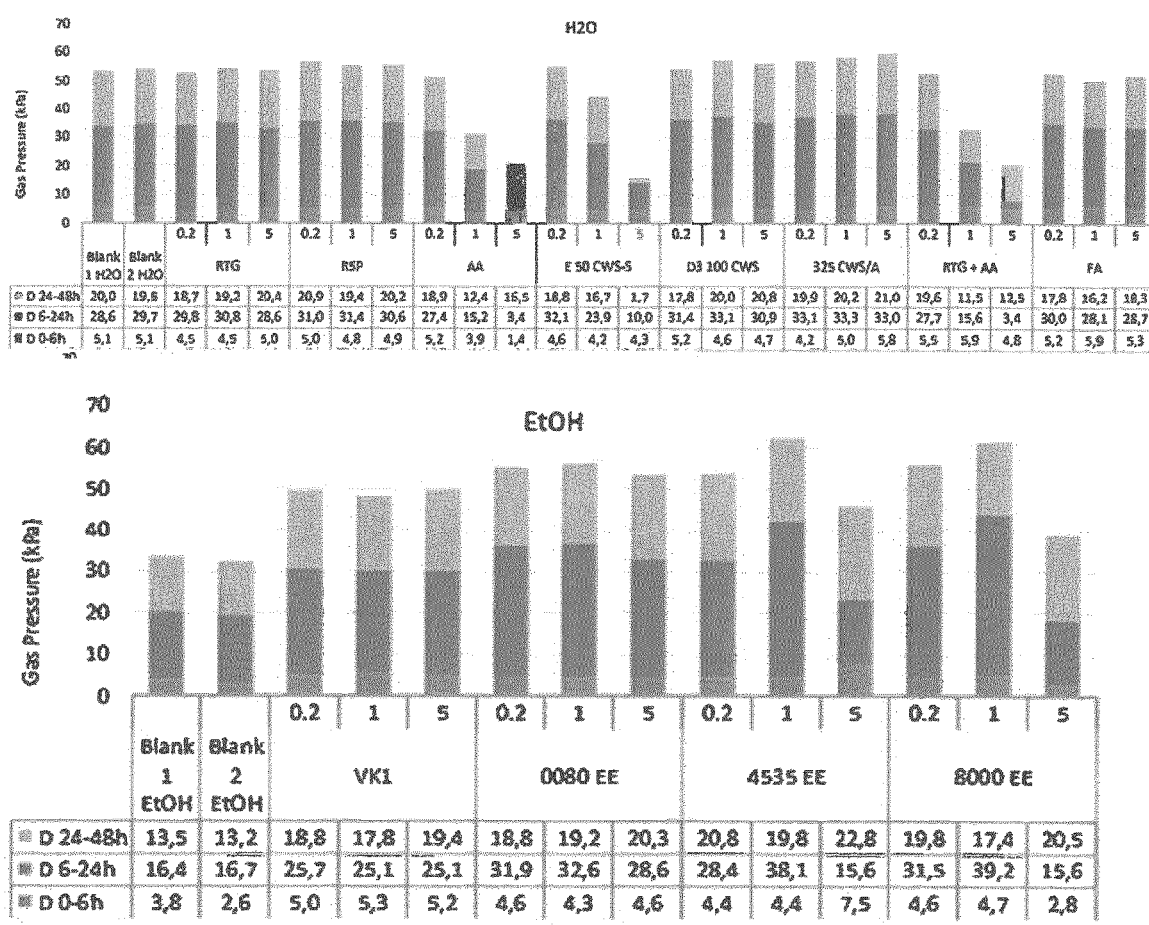

FIG. 15 Gas pressure (kPa) during different time intervals (0-6 h, 6-24 h and 24-48 h) upon administration of the different test products, either as an aqueous solution (top) or dissolved in ethanol (bottom). A negative control for each type of stock solution was also included. Each compound was tested at 3 doses (0.2×, 1× and 5×) (Table 1).

Figure 16:
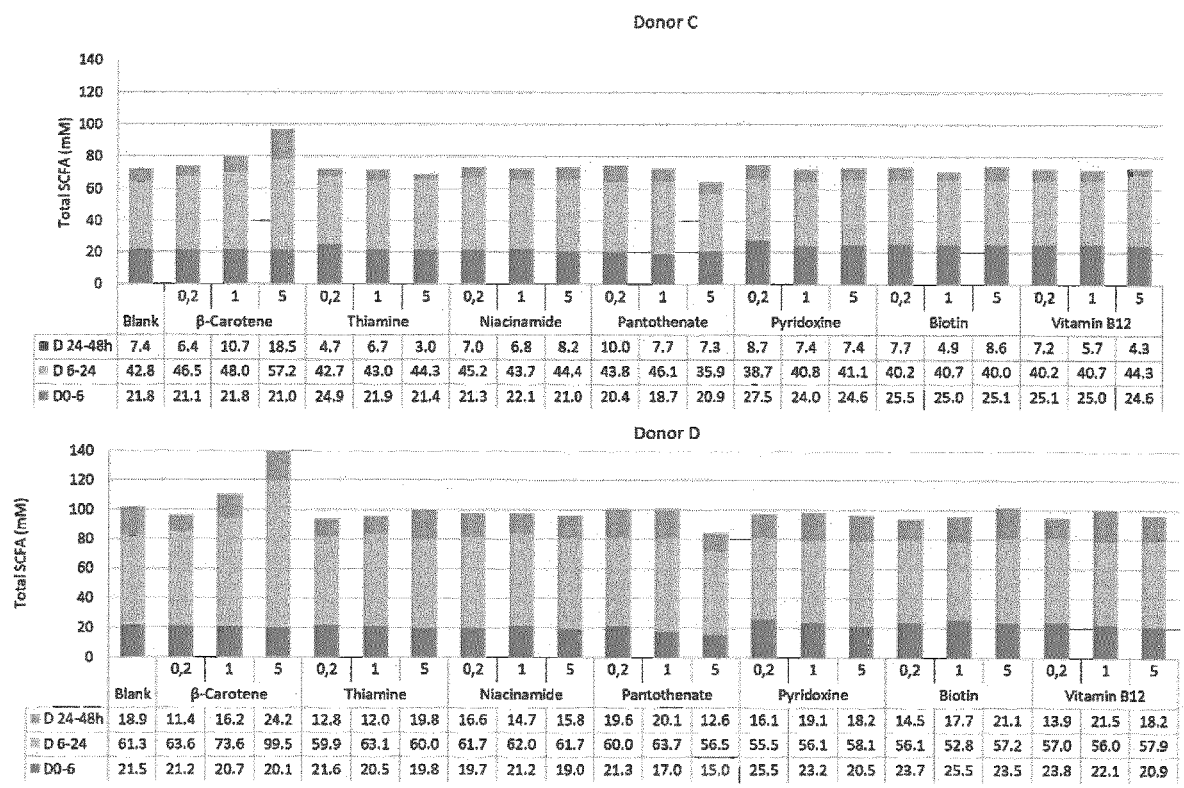

FIG. 16 Total SCFA production during different time-intervals (0-6 h, 6-24 h and 24-48 h) upon administration of the different test products, either for donor C (top) or donor D (bottom). A negative control (blank) was also included. Each compound was tested at 3 doses (0.2×, 1× and 5×) (Table 2).

FIG. 17 Abundances (log(cells/ml)) of the Bifidobacteriaceae in the control incubations and in the incubations with the test products after 24 h of incubation using the fecal inoculum of donor C and donor D.

Figure 18:
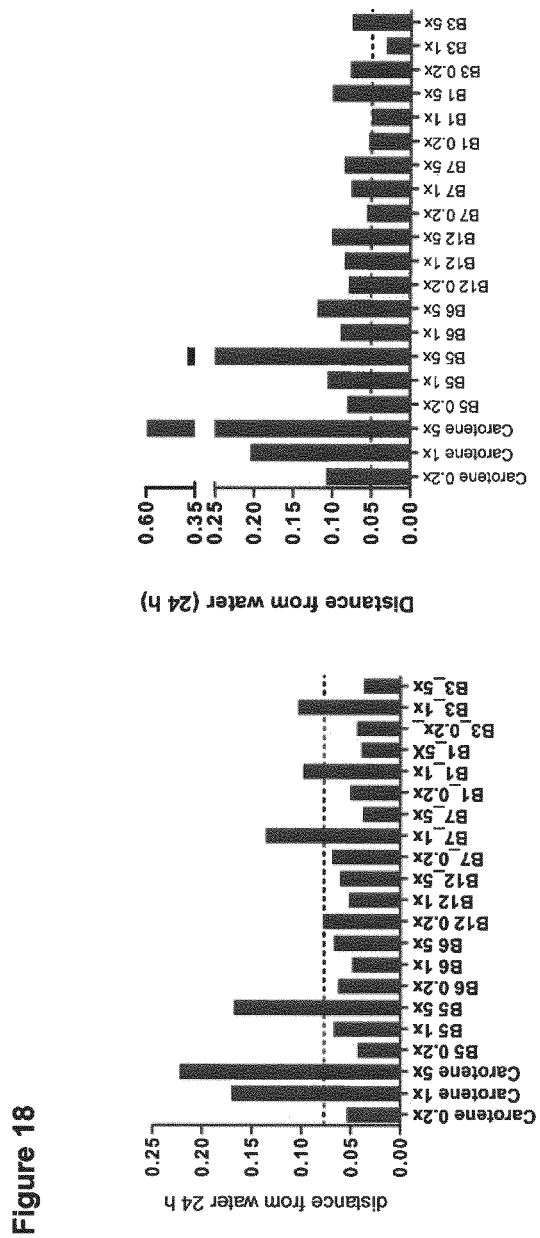

FIG. 18 Bray-Curtis distances (beta diversity) between water as control and supplemented vitamins. Dotted line showing Bray-Curtis distance between two controls at 24 h, serving as reference point.

Figure 19:
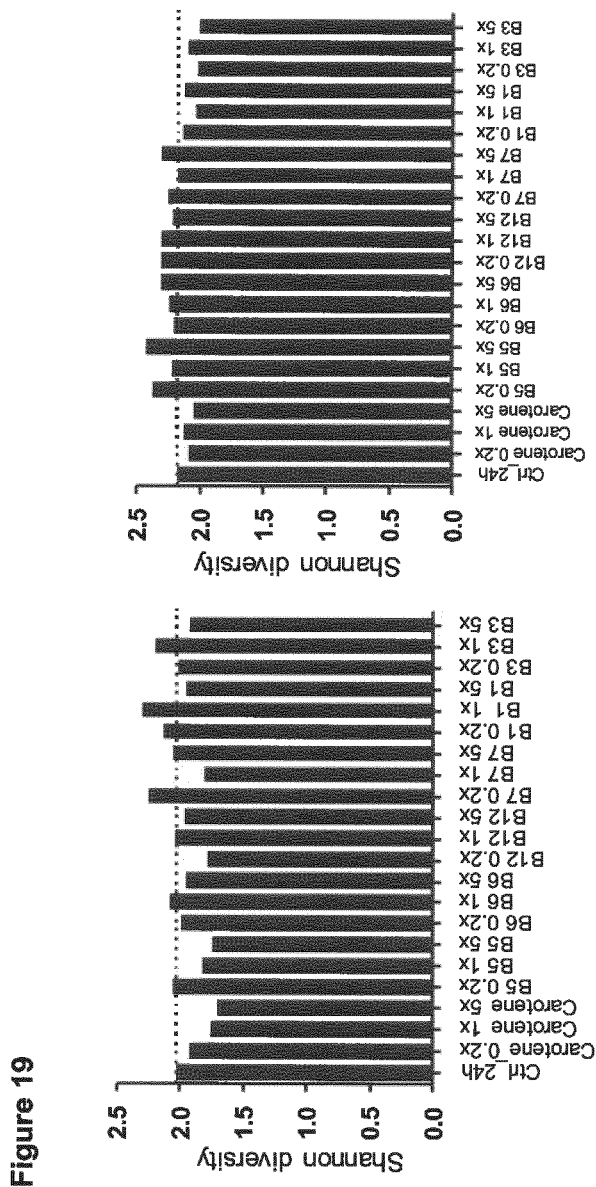

FIG. 19 Shannon diversity index (alpha diversity) in water as control and supplemented vitamins. Dotted line showing alpha diversity values in water control at 24 h. Diversity index value larger than this reference control are shown as increase in diversity.

FIGS. 20A and B Principal Coordinates Analyses (PCoA) based on Weighted (A) and Unweighted (B) Unifrac distances of cecal microbiota profiles in broiler in groups A (shades of green), B (shades of gold) and C (shades of pink). Samples are depicted as dots filled in different shades of color, from light (earlier samples) to dark (later samples), according to the provided color legend. First and second coordination axes are reported in each plot; percentages of variation in the datasets explained by each axes are reported.

FIG. 21A-F Principal Coordinates Analyses (PCoA) based on Weighted (A-C) and Unweighted (D-E) Unifrac distances of cecal microbiota profiles in broiler taken at time points T1 (A, D), T2 (B, E), and T3 (C, F). Samples are depicted as dots filled in different shades of color as in FIG. 1, green for groups A, gold for group B, pink for group. First and second coordination axes are reported in each plot; percentages of variation in the datasets explained by each axes are reported.

Figure 22:
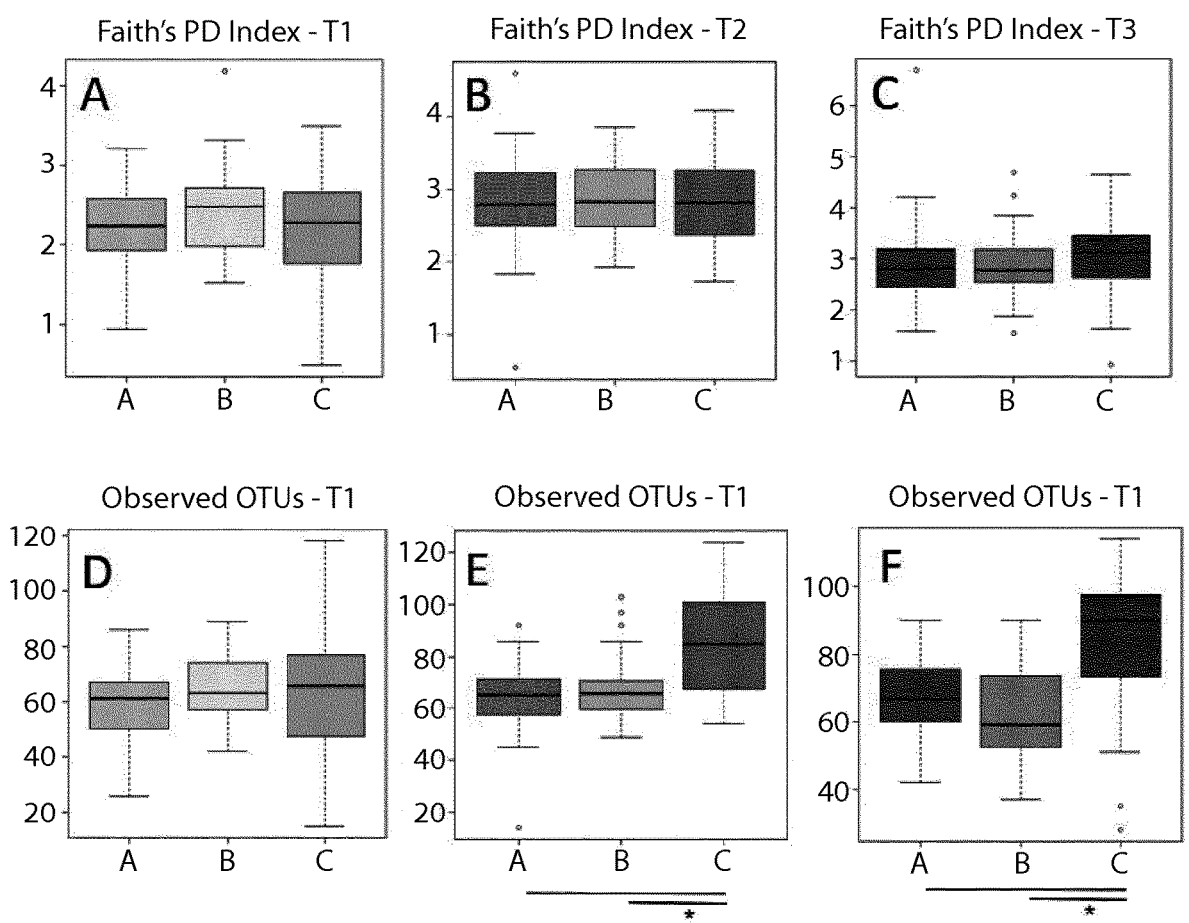

FIG. 22 Alpha diversity, measured as Faith PD index (A-C) and number of observed OTUs (D-F) in the cecal microbiota of broiler taken at time points T1 (A, D), T2 (B, E), and T3 (C, F). Box and whiskers distributions of diversity indexes in all samples are depicted. Shades of green, gold and pink are used to distinguish between chicken in groups A, B and C, respectively. *, statistically significant differences (P<0.0001).

Figure 23:
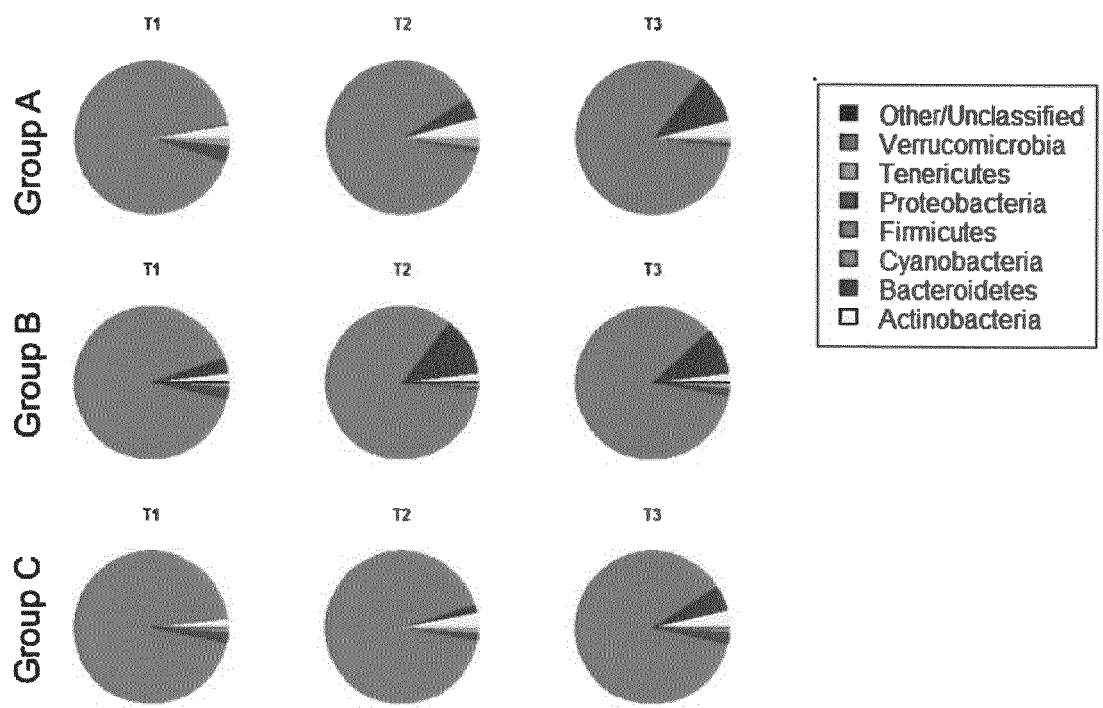

FIG. 23 Phylum level microbiota profiles of broiler cecum ecosystem. Average phylogenetic profiles of the cecal microbiome of broilers in groups A, B and C, for each available time point (T1, T2, T3) are provided as pie charts at phylum level; bacterial taxa were filtered for graphical representation as >0.1% in at least 1% of all the available samples.

Figure 24:
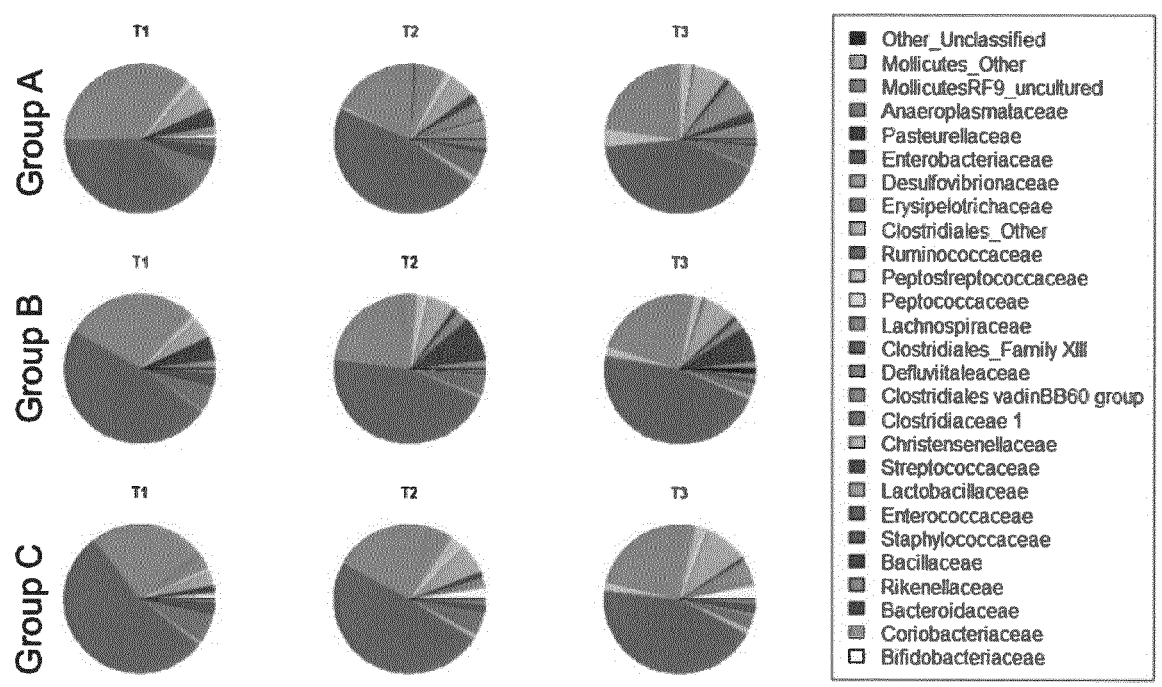

FIG. 24 Family level microbiota profiles of broiler cecum ecosystem. Average phylogenetic profiles of the cecal microbiome of broilers in groups A, B and C, for each available time point (T1, T2, T3) are provided as pie charts at family level; bacterial taxa were filtered for graphical representation as >0.5% in at least 1% of all the available samples.

Figure 25:
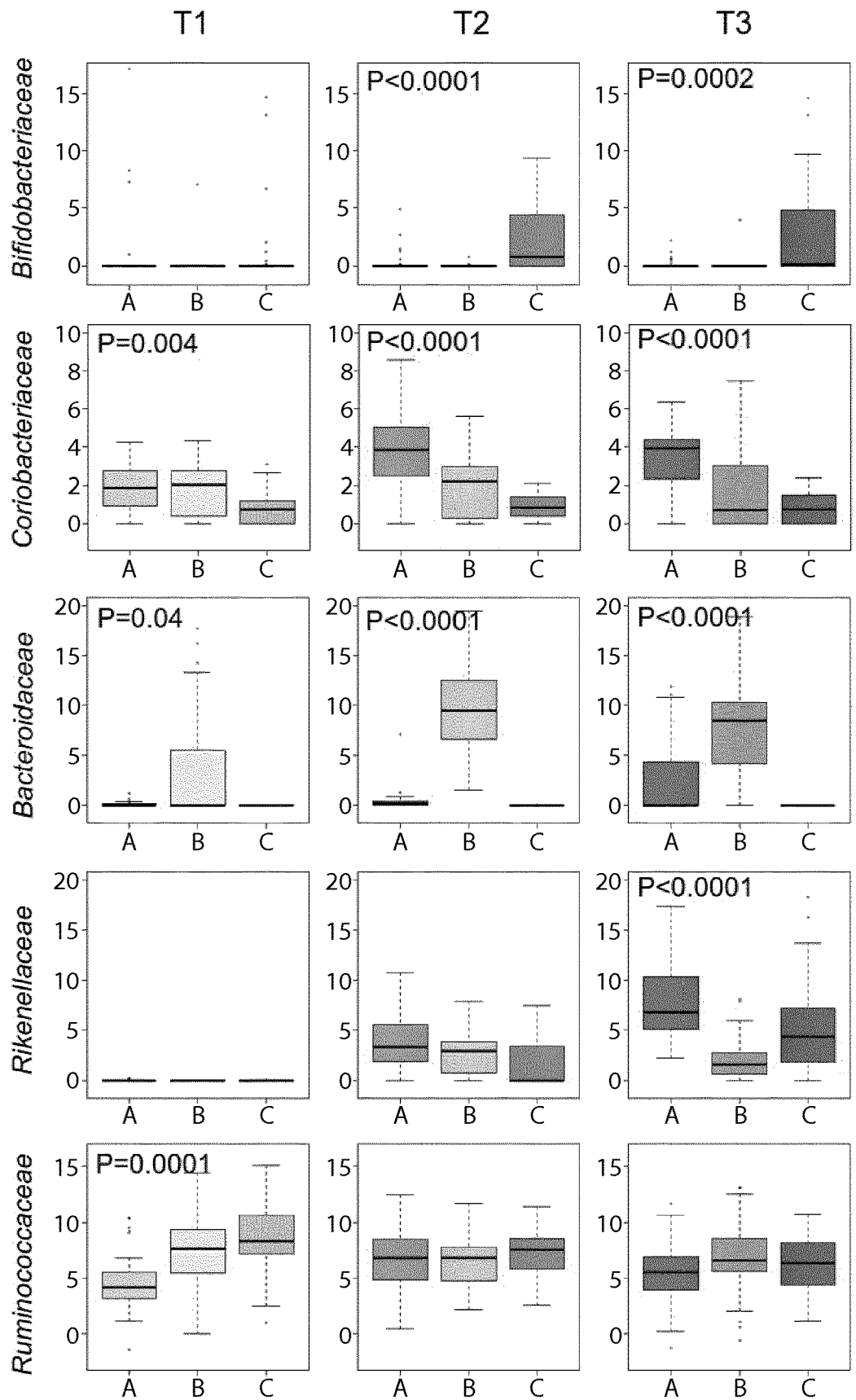

FIG. 25 Relative abundance distributions of bacterial families in the cecal microbiota of broiler. Box and whiskers distributions of relative abundances (%) in all samples, at the three time points (from left to right) are depicted for those families showing significant differences between the three group (A, B, C) in at least 1 timepoint. Shades of green, gold and pink are used to distinguish between chicken in groups A, B and C, respectively. Bejamini-Hocherg corrected P values are reported when statistical significance was reached ($P<0.05$).

Figure 26:
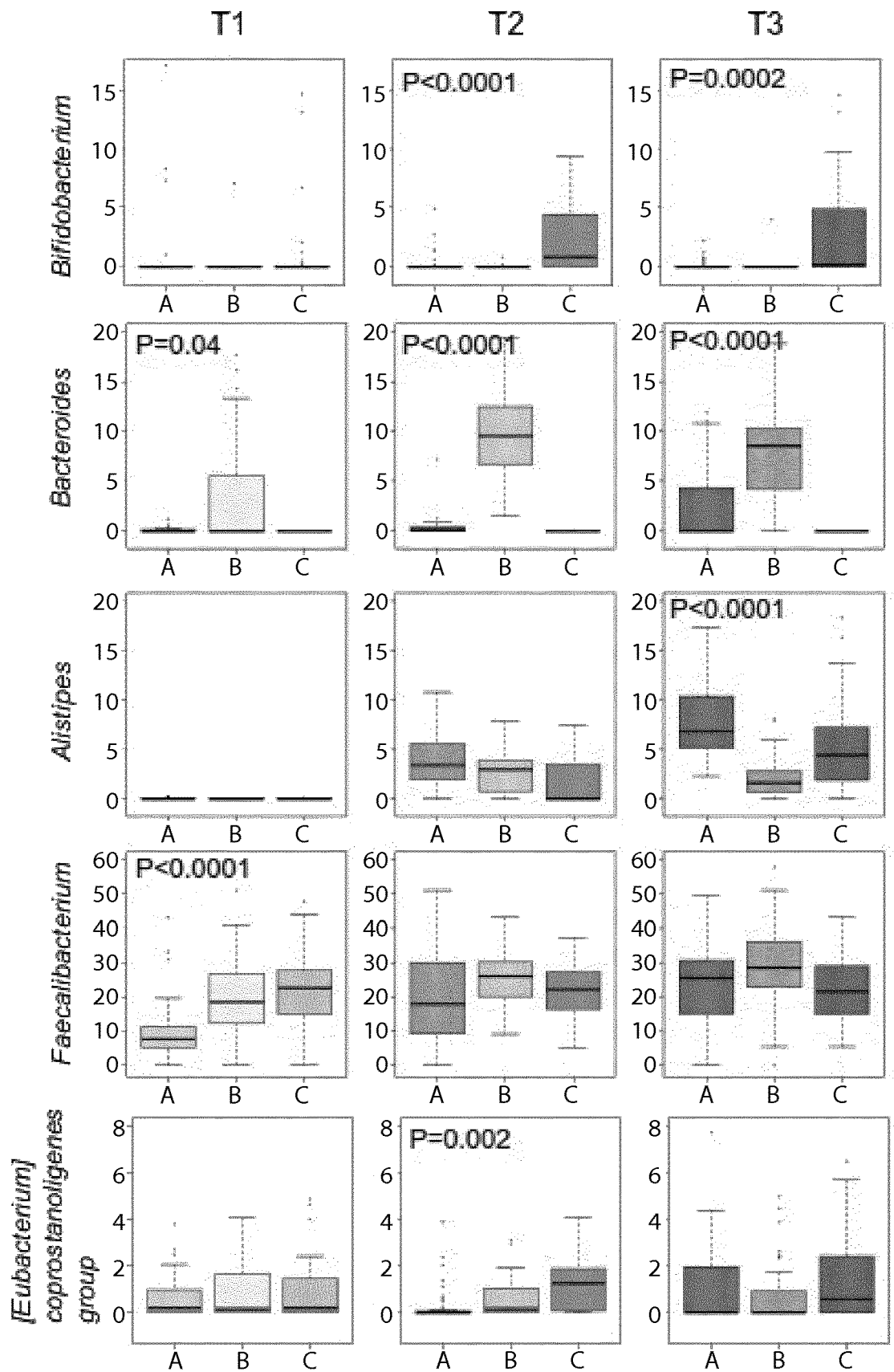

FIG. 26 Relative abundance distributions of bacterial genera in the cecal microbiota of broiler. Box and whiskers distributions of relative abundances (°/o) in all samples, at the three time points (from left to right) are depicted for those genera showing significant differences between the three group (A, B, C) in at least 1 timepoint. Shades of green, gold and pink are used to distinguish between chicken in groups A, B and C, respectively. Bejamini-Hocherg corrected P values are reported when statistical significance was reached ($P<0.05$).

FIG. 27 Principal Coordinates Analyses PCoA based on Weighted (A) and Unweighted (B) UniFrac distances of ileal microbiota profiles in broilers in groups A (shades of green), B (shades of gold) and C (shades of pink). Samples are depicted as triangles filled in different shades of color, from light (earlier samples) to dark (later samples), according to the provided color legend First and second coordination axes are reported in each plot percentages of variation in the datasets explained by each axes are reported.

Figure 28:
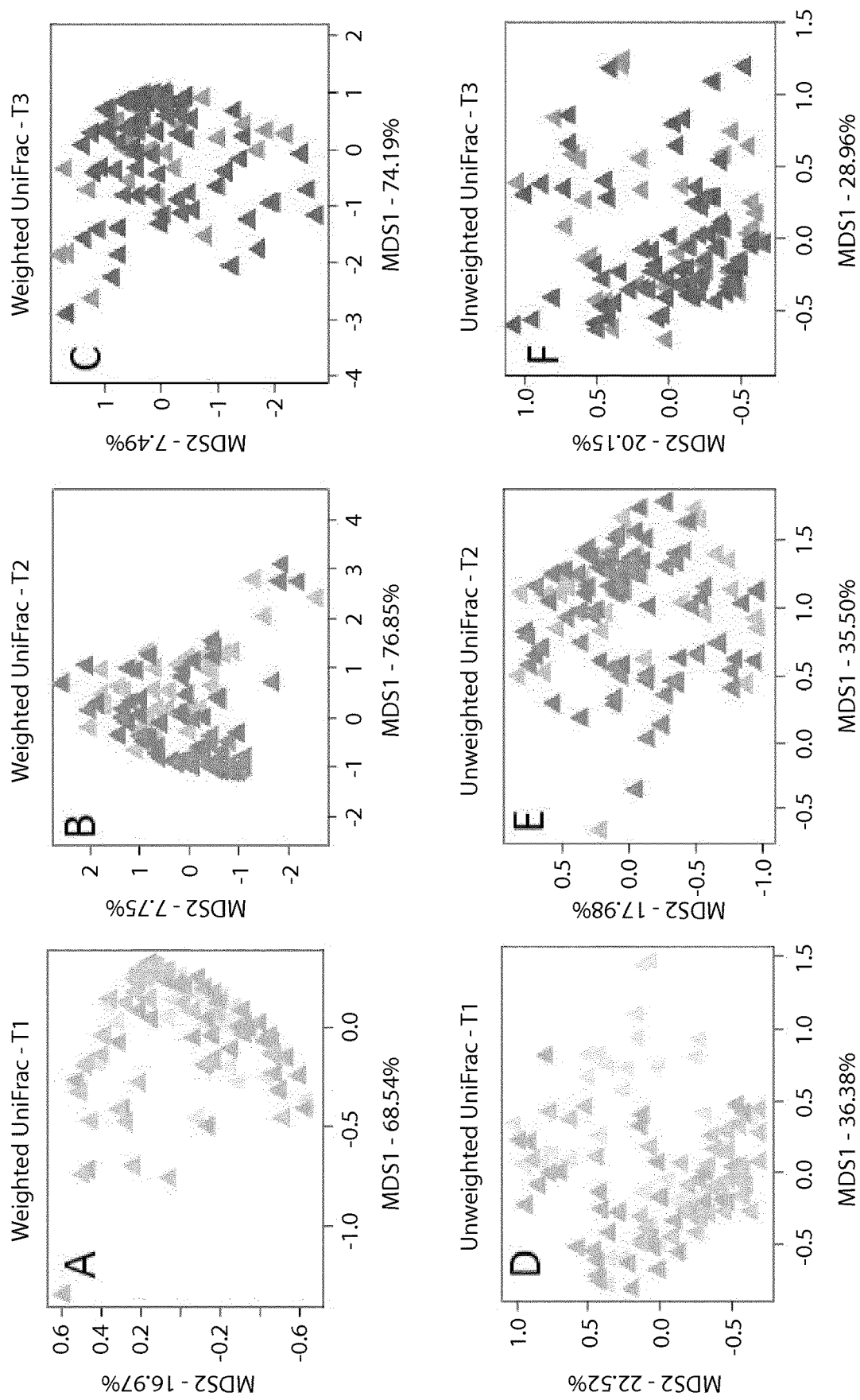

FIG. 28 Principal Coordinates Analyses PCoA based on Weighted (A-C) and Unweighted (D-F) Unifrac distances of ileal microbiota profiles in broiler taken at time points T1 (A, D), T2 (B, E), and T3 (C, F). Samples are depicted as triangles filled in different shades of color as in FIG. 27 green for groups A, gold for group B, pink for group. First and second coordination axes are reported in each plot percentages of variation in the datasets explained by each axes are reported.

Figure 29:
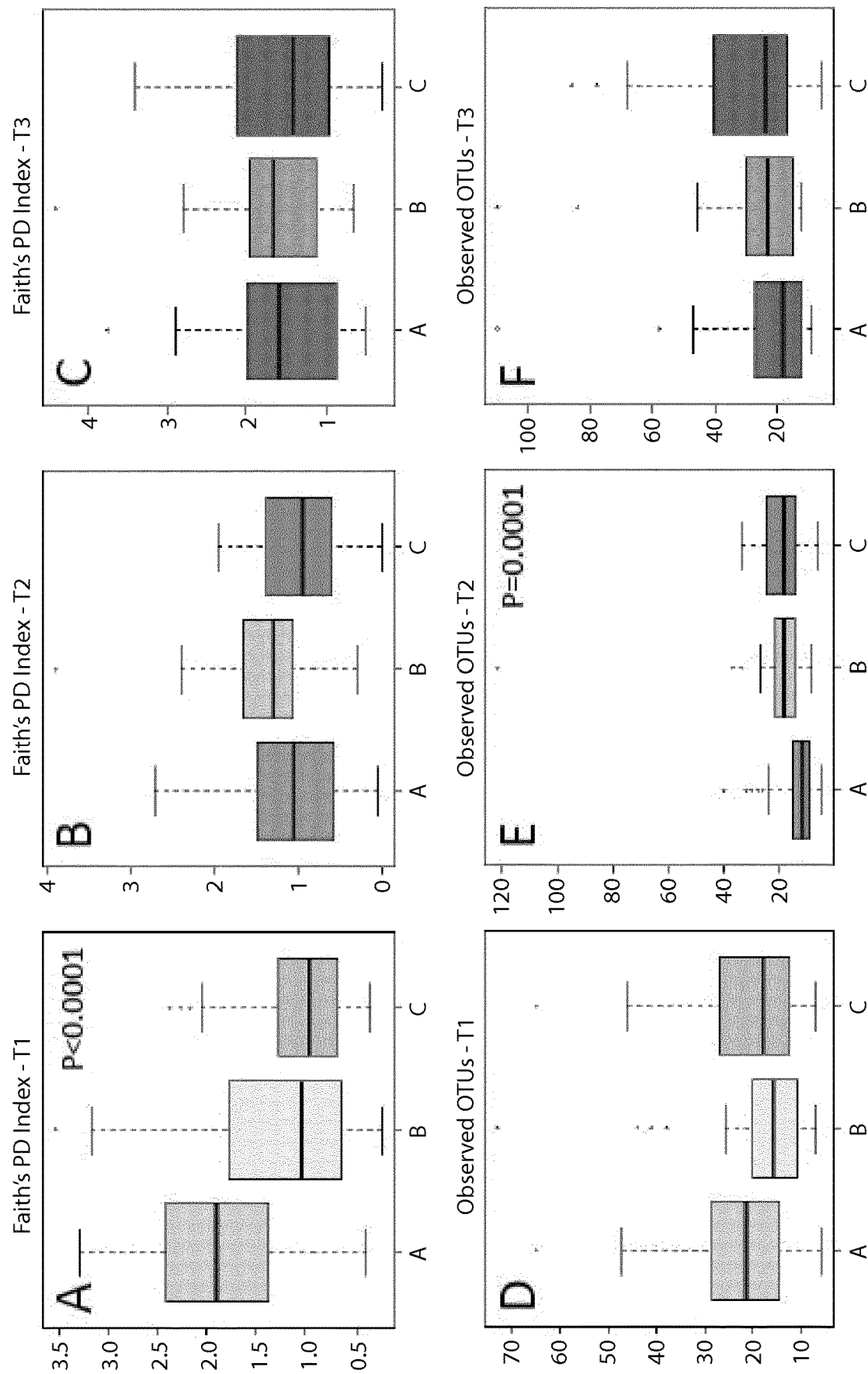

FIG. 29 Alpha diversity, measured as Faith PD index (A-C) and number of observed OTUs (D-F) in the ileal microbiota of broilers taken at time points T1 (A, D), T 2 (B, E), and T 3 (C, F). Box and whiskers distributions of diversity indices in all samples are depicted Shades of green, gold and pink are used to distinguish between chicken in groups A, B and C, respectively. Statistically significant differences (Kruskall Wallis test) are indicated with the corresponding P value.

Figure 30:
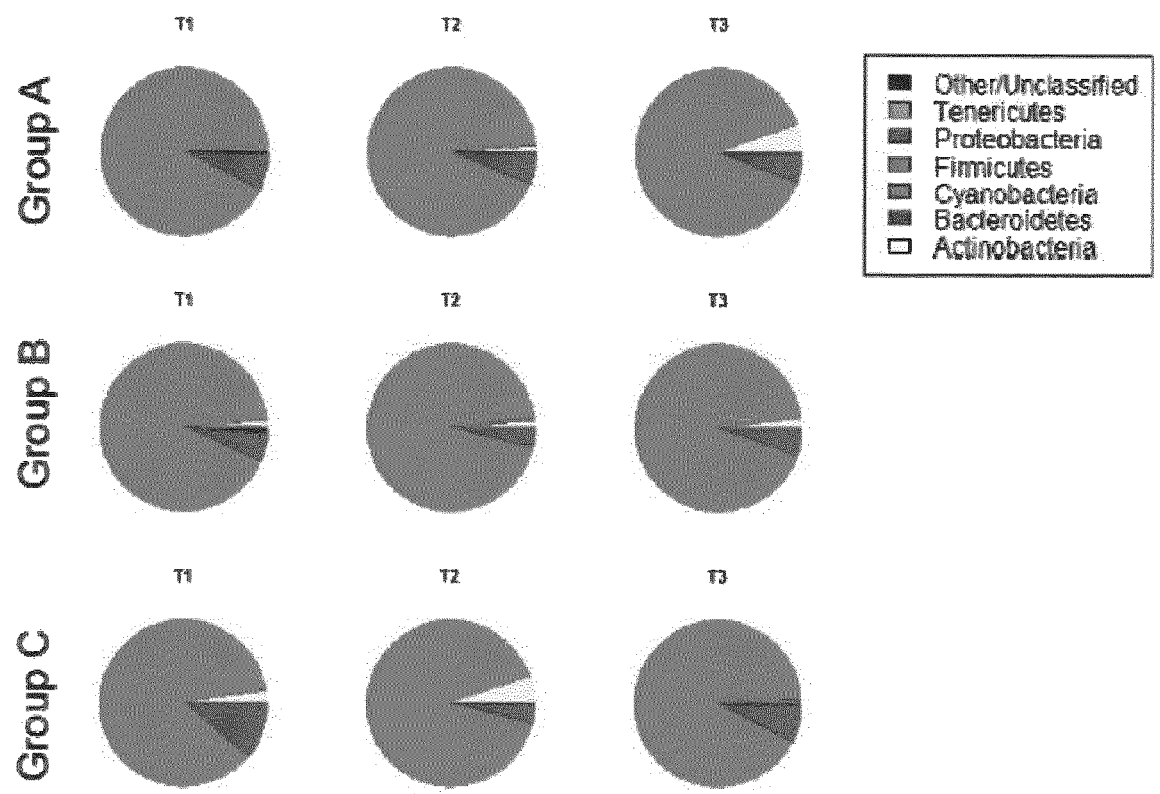

FIG. 30 Phylum level microbiota profiles of broilers ileum ecosystem. Average phylogenetic profiles of the ileal microbiome of broilers in groups A, B and C, for each available time point (T1, T2, T3) are provided as pie charts at phylum level bacterial; taxa were filtered for graphical representation as >0.1% in at least 1 of all the available samples.

Figure 31:
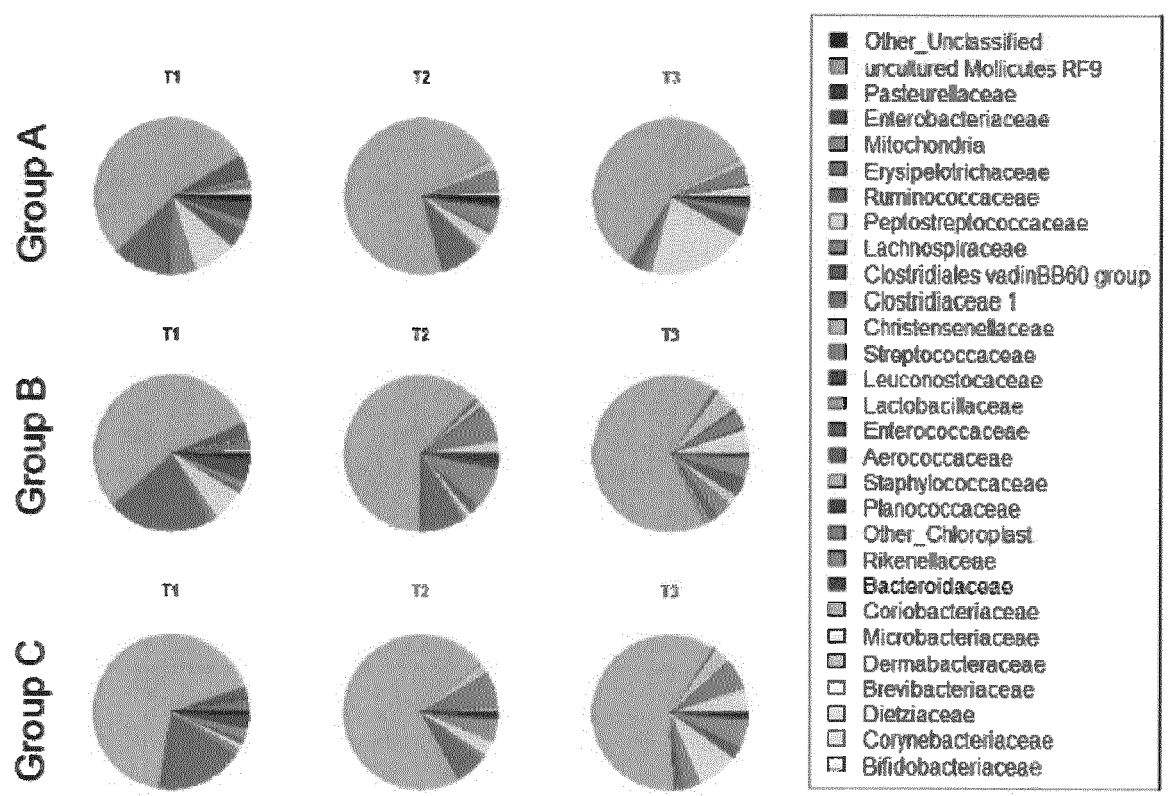

FIG. 31 Family level microbiota profiles of broilers ileum ecosystem. Average phylogenetic profiles of the ileal microbiome of broilers in groups A, B and C, for each available time point (T1, T2, T3) are provided as pie charts at family level bacterial; taxa were filtered for graphical representation as >0.5% in at least 1 of all the available samples.

Figure 32:
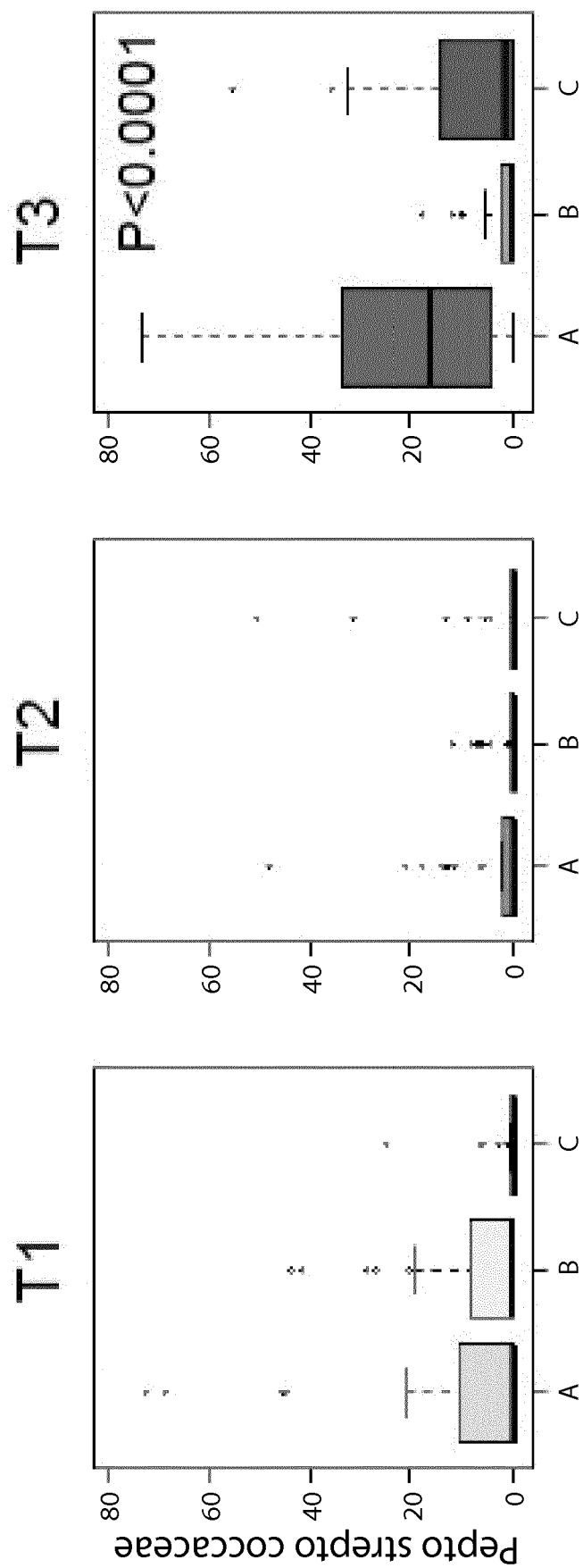

FIG. 32 Relative abundance distributions of Peptostreptococcaceae family in the ileum microbiota of broilers. Box and whiskers distributions of relative abundances in all samples, at the three time points (from left to right) are depicted Shades of green, gold and pink are used to distinguish between chicken in groups A, B and C, respectively. Bejamini Hocherg corrected P values are reported when statistical significance was reached ($P<0.05$).

Figure 33:
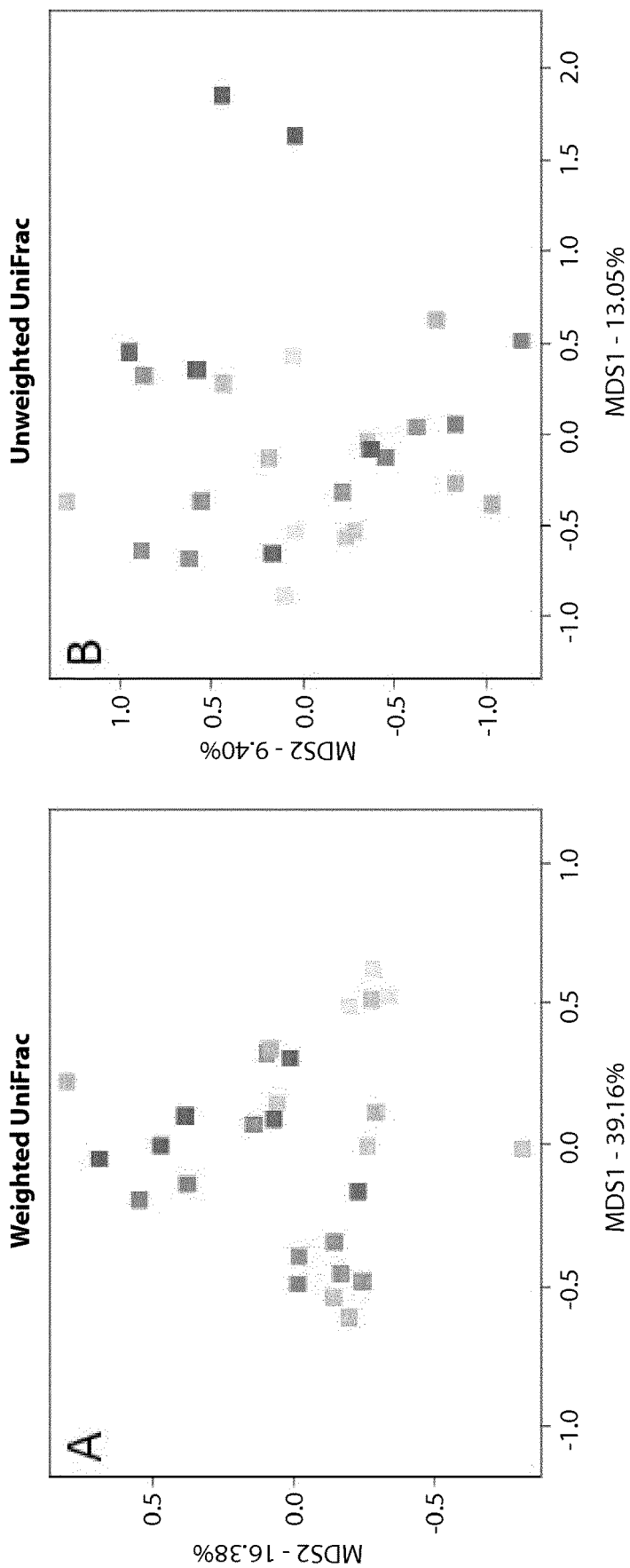

FIG. 33 Principal Coordinates Analyses PCoA based on Weighted (A) and Unweighted (B) UniFrac distances of litter microbiota profiles in broilers in groups A (shades of green), B (shades of gold) and C (shades of pink). Samples are depicted as squares filled in different shades of color, from light (earlier samples) to dark (later samples). First and second coordination axes are reported in each plot percentages of variation in the datasets explained by each axes are reported.

Figure 34:
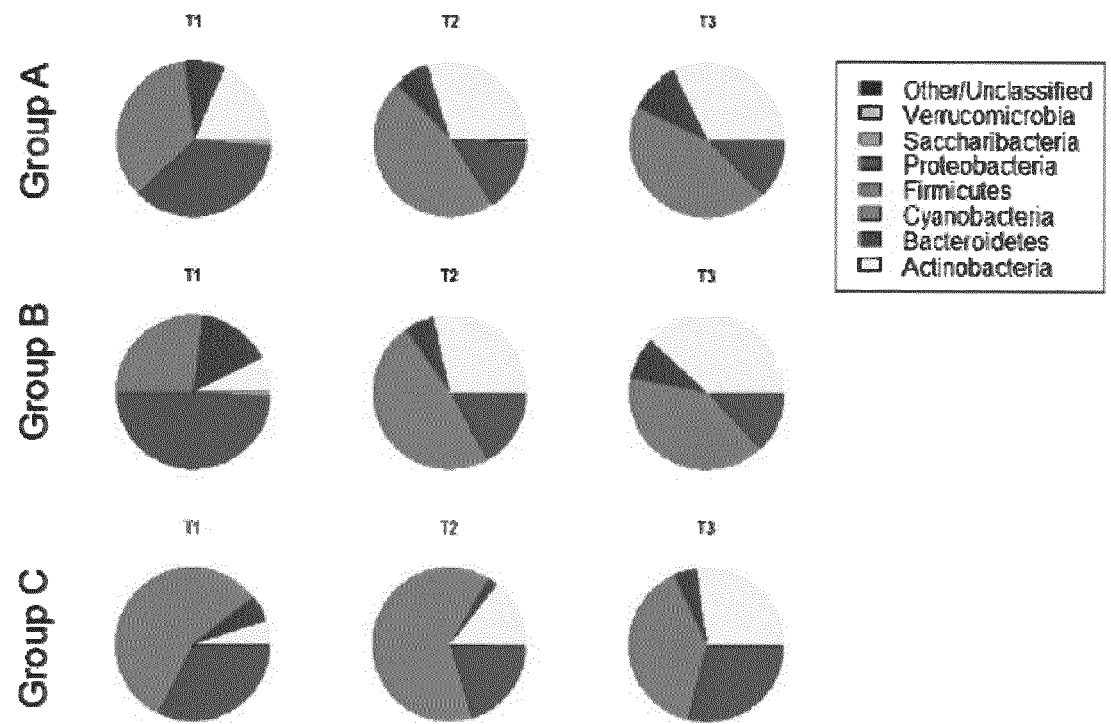

FIG. 34 Phylum level microbiota profiles of litters ecosystem. Average phylogenetic profiles of the litters microbiome of broilers in groups A, B and C, for each available time point (T1, T2, T3) are provided as pie charts at phylum level bacterial taxa were filtered for graphical representation as >0.1% in at least 1 of all the available samples.

Figure 35:
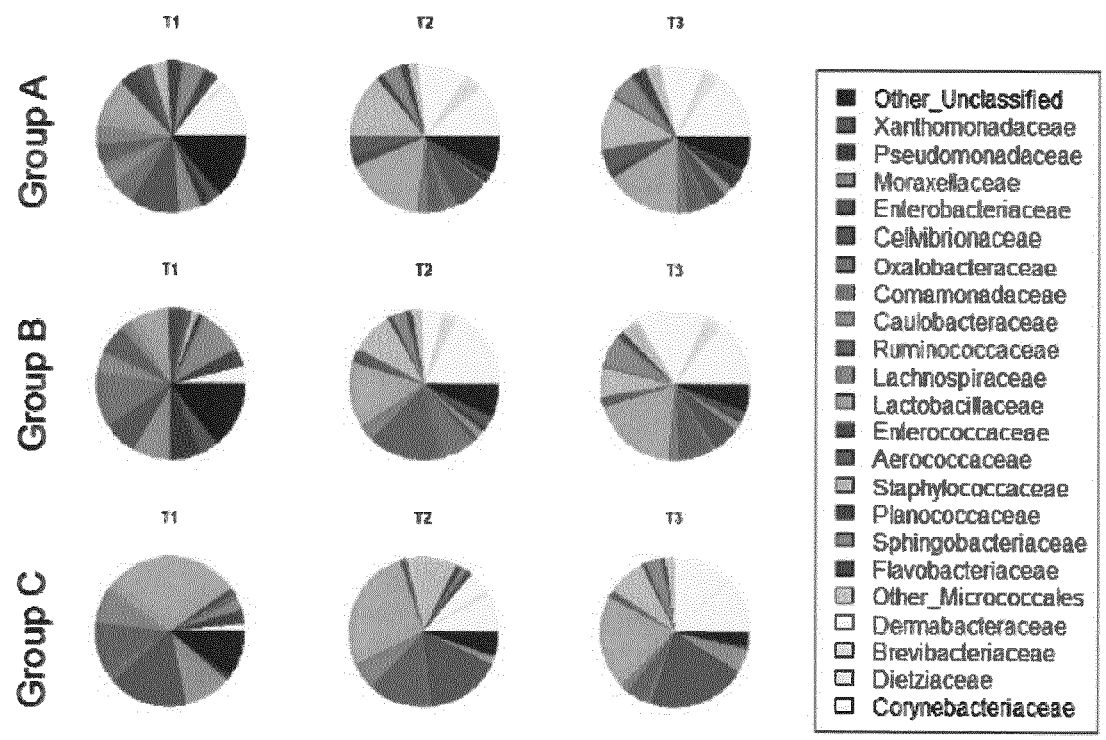

FIG. 35 Family level microbiota profiles of litters ecosystem. Average phylogenetic profiles of the litters microbiome of broilers in groups A, B and C, for each available time point (T1, T2, T3) are provided as pie charts at family level bacterial; taxa were filtered for graphical representation as >0.5% in at least 1 of all the available samples.

Figure 36:
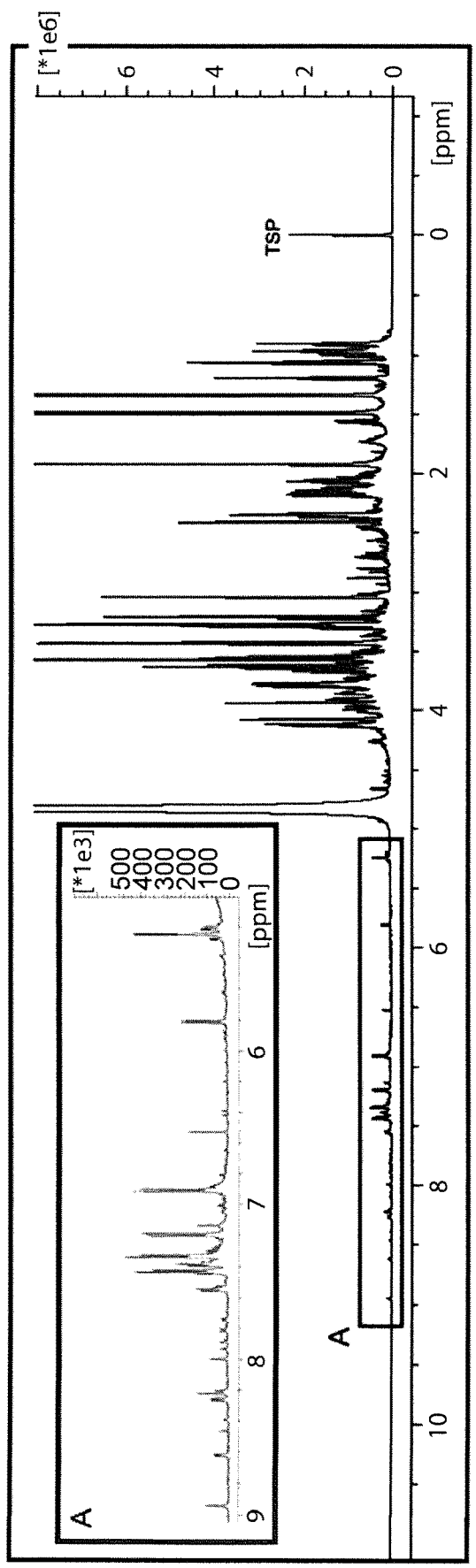

FIG. 36 $^1$H-NMR spectrum of water extract of DSM Caecum Sample C281 pH 7.13. Vertical scale in A is magnified in order to better appreciate small signals in the downfield region (Aromatic Region).

Figure 37:
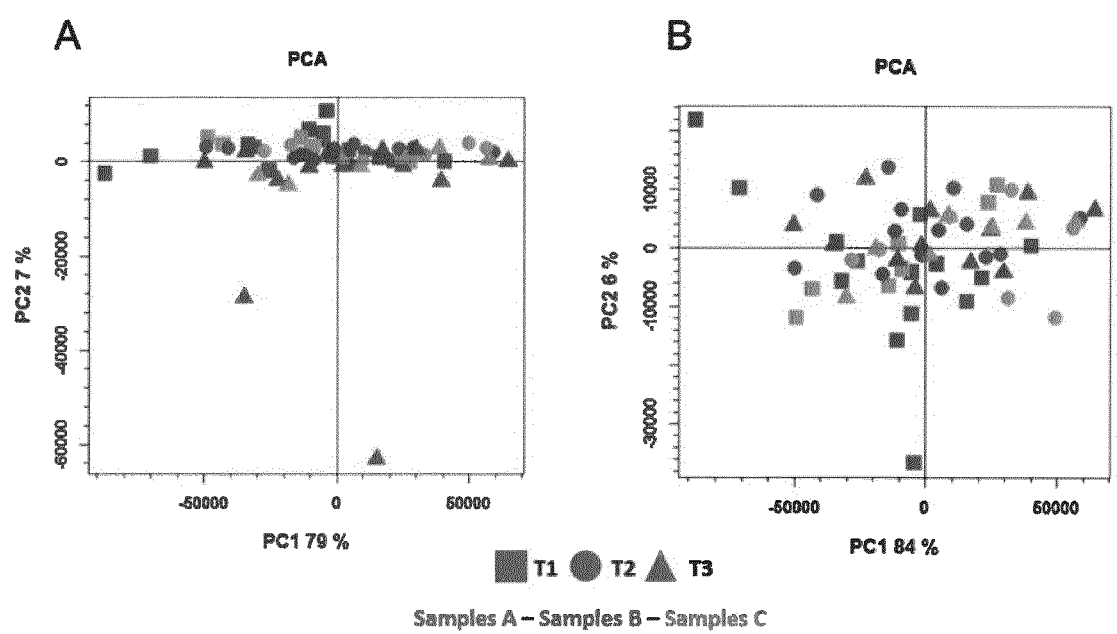

FIG. 37 PCA scores plot of the binned and normalized $^1$H NMR spectra of all samples and B) PCA scores without outliers' samples (graphics are performed by using R software).

FIG. 38A) PLS-DA scores plot of the binned and normalized $^1$H NMR spectra of 61 samples in which the 3 groups appear to be linearly separable according to time points. B) PLS-DA scores plot considering control [A] and treatment groups [B+C] (graphics are performed by using Python software).

Figure 39:
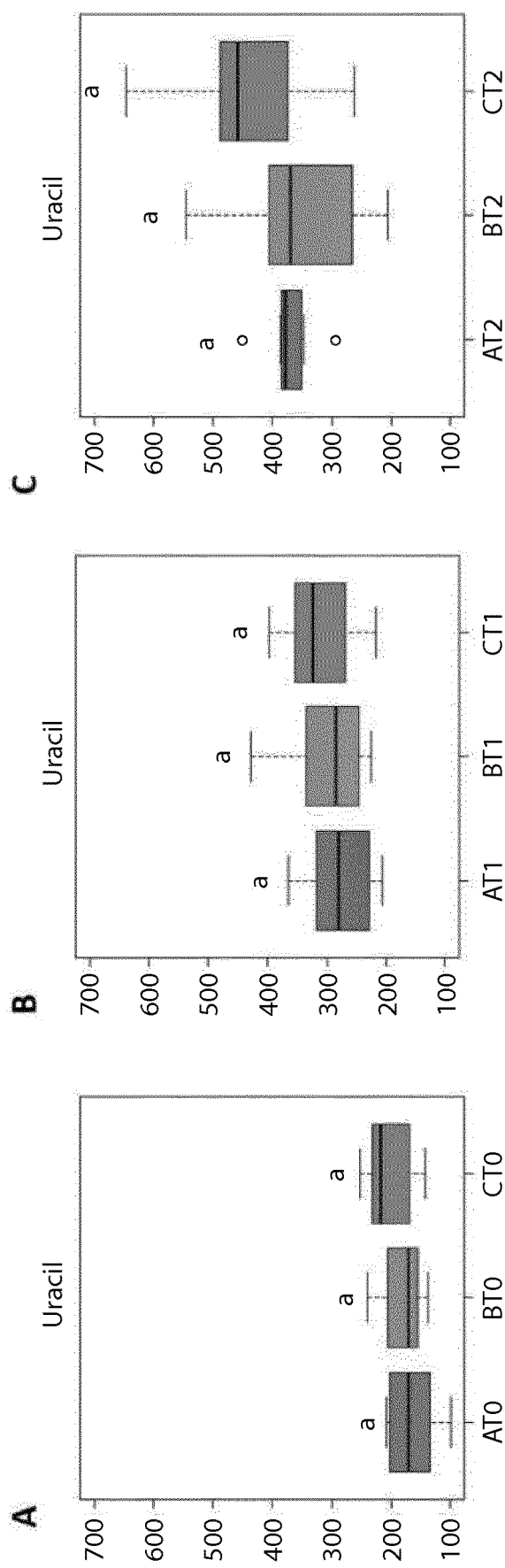

FIG. 39 Box plot of the integral of uracil signals at 5.793 ppm (d); samples are compared according to time points: A) at T0 which correspond to 14 days; B) at T1 corresponding to 28 days and C) T2 to 42 days.

Figure 40:
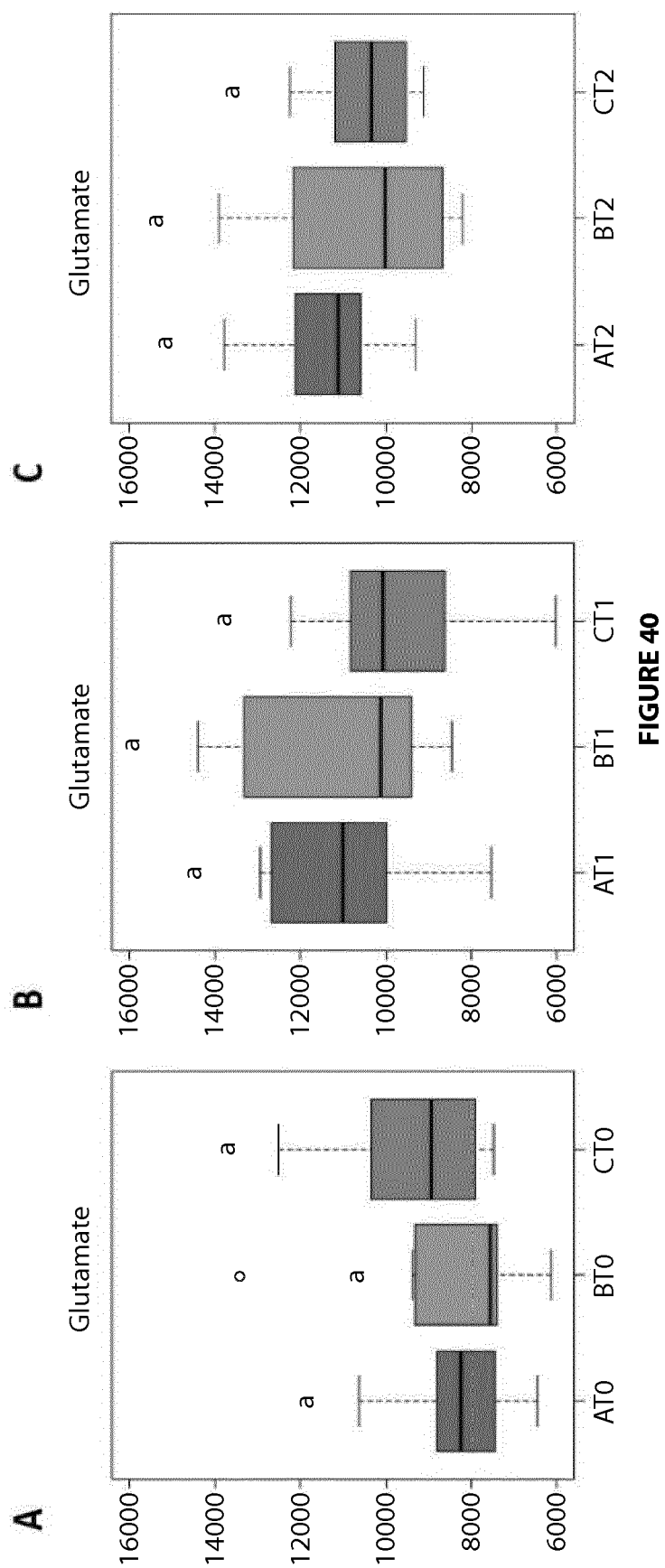
Figure 41:
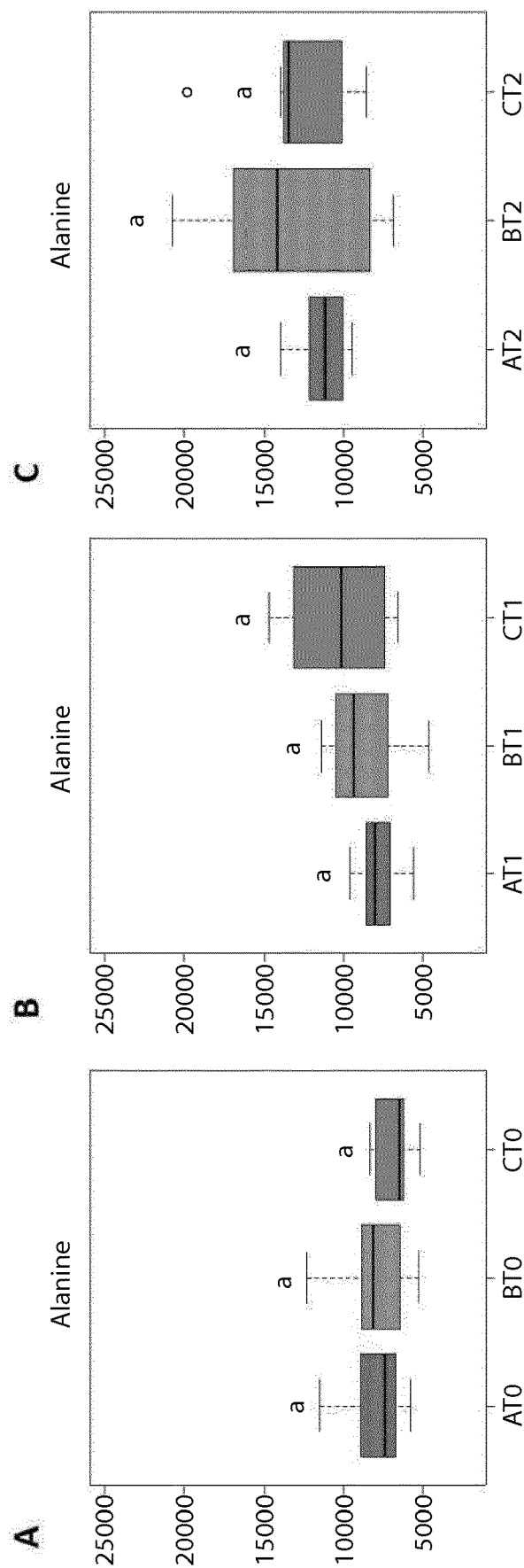

FIG. 40 Box plot of the integral of glutamate signals at 2.0447 ppm (m); samples are compared according to time points: A) at T0 which correspond to 14 days; B) at T1 corresponding to 28 days and C) T2 to 42 days. Uracile seems to increase its concentration to 42 days in all treatments, especially for samples C FIG. 41 Box plot of the integral of alanine signals at 1.470 ppm (d); samples are compared according to time points: A) at T0 which correspond to 14 days; B) at T1 corresponding to 28 days and C) T2 to 42 days.

Figure 42:
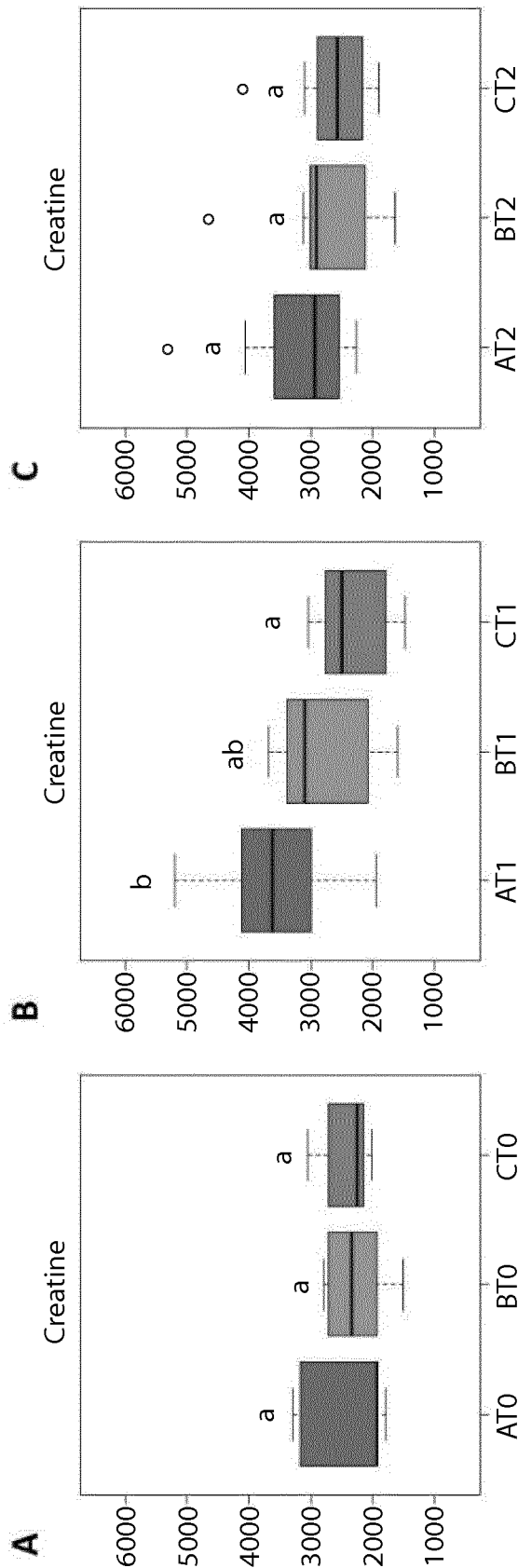

FIG. 42 Box plot of the integral of creatine signals at 3.920 ppm (s); samples are compared according to time points: A) at T0 which correspond to 14 days; B) at T1 corresponding to 28 days and C) T2 to 42 days.

Figure 43:
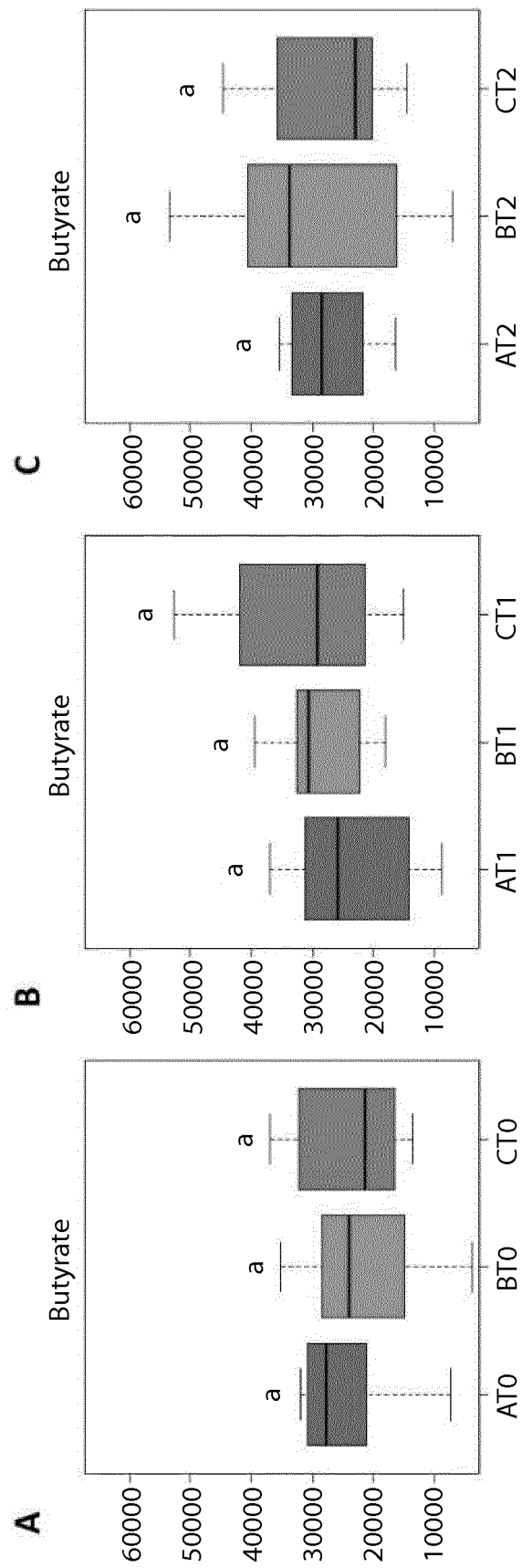

FIG. 43 Box plot of the integral of butyrate signals at 0.883 ppm (t); samples are compared according to time points: A) at T0 which correspond to 14 days; B) at T1 corresponding to 28 days and C) T2 to 42 days.

Figure 44:
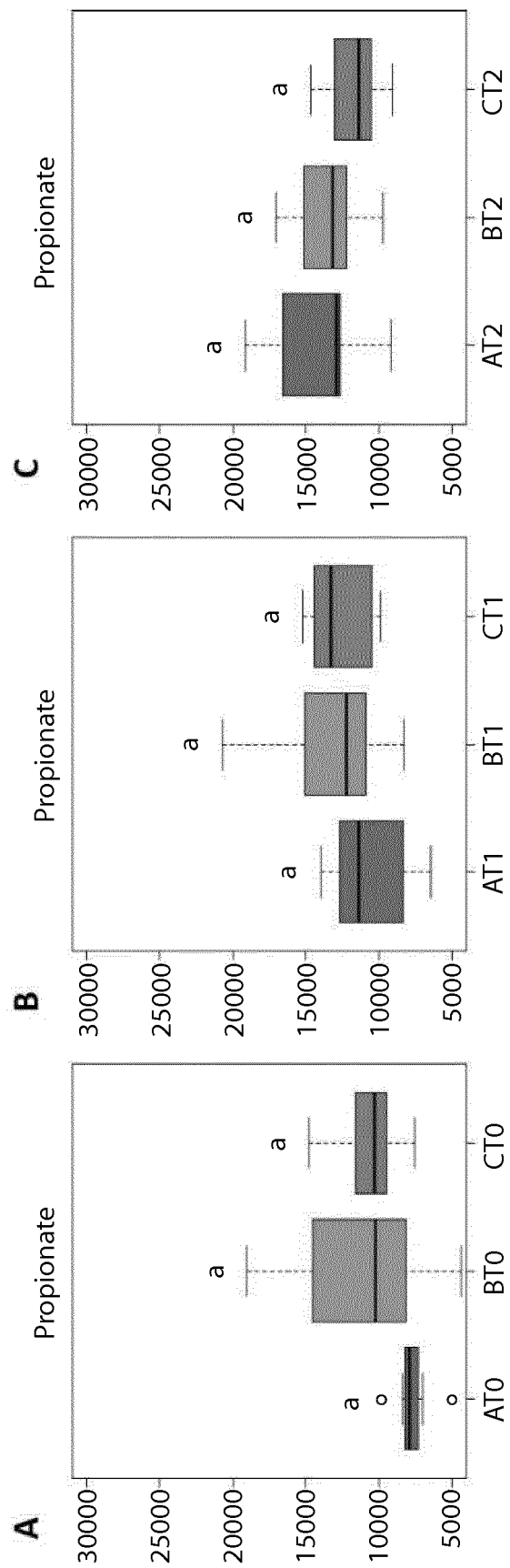

FIG. 44 Box plot of the integral of propionate signals at 1.0446 ppm (m); samples are compared according to time points: A) at T0 which correspond to 14 days; B) at T1 corresponding to 28 days and C) T2 to 42 days.

Figure 45:
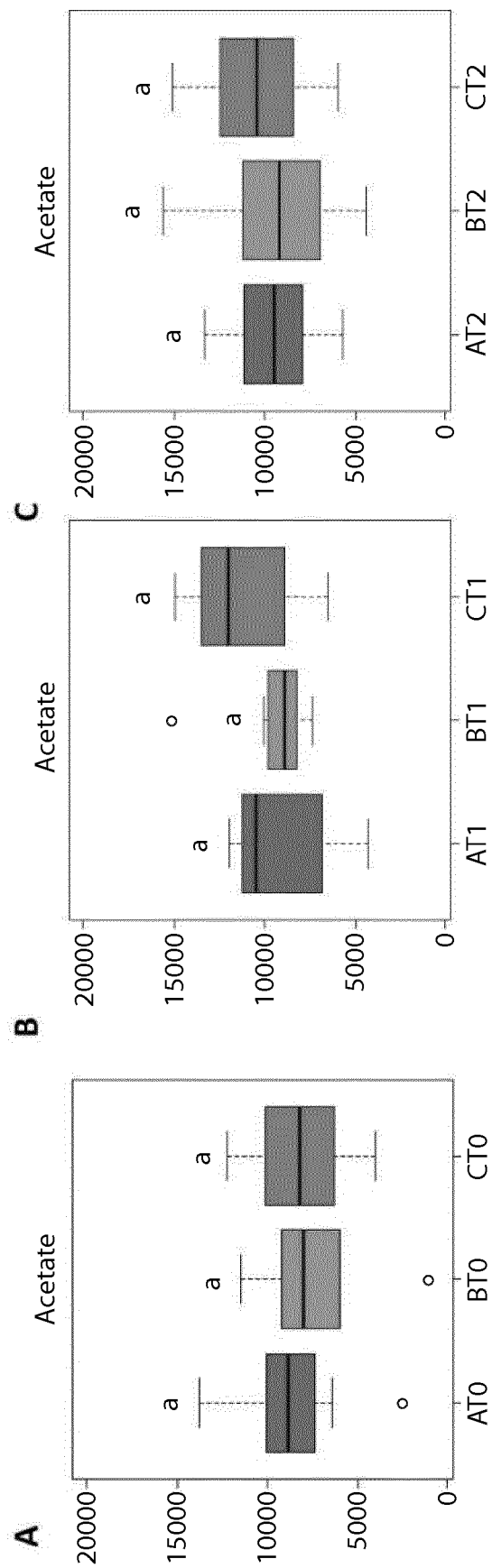

FIG. 45 Box plot of the integral of acetate signals at 1.0909 ppm (s); samples are compared according to time points: A) at T0 which correspond to 14 days; B) at T1 corresponding to 28 days and C) T2 to 42 days.

Figure 46:
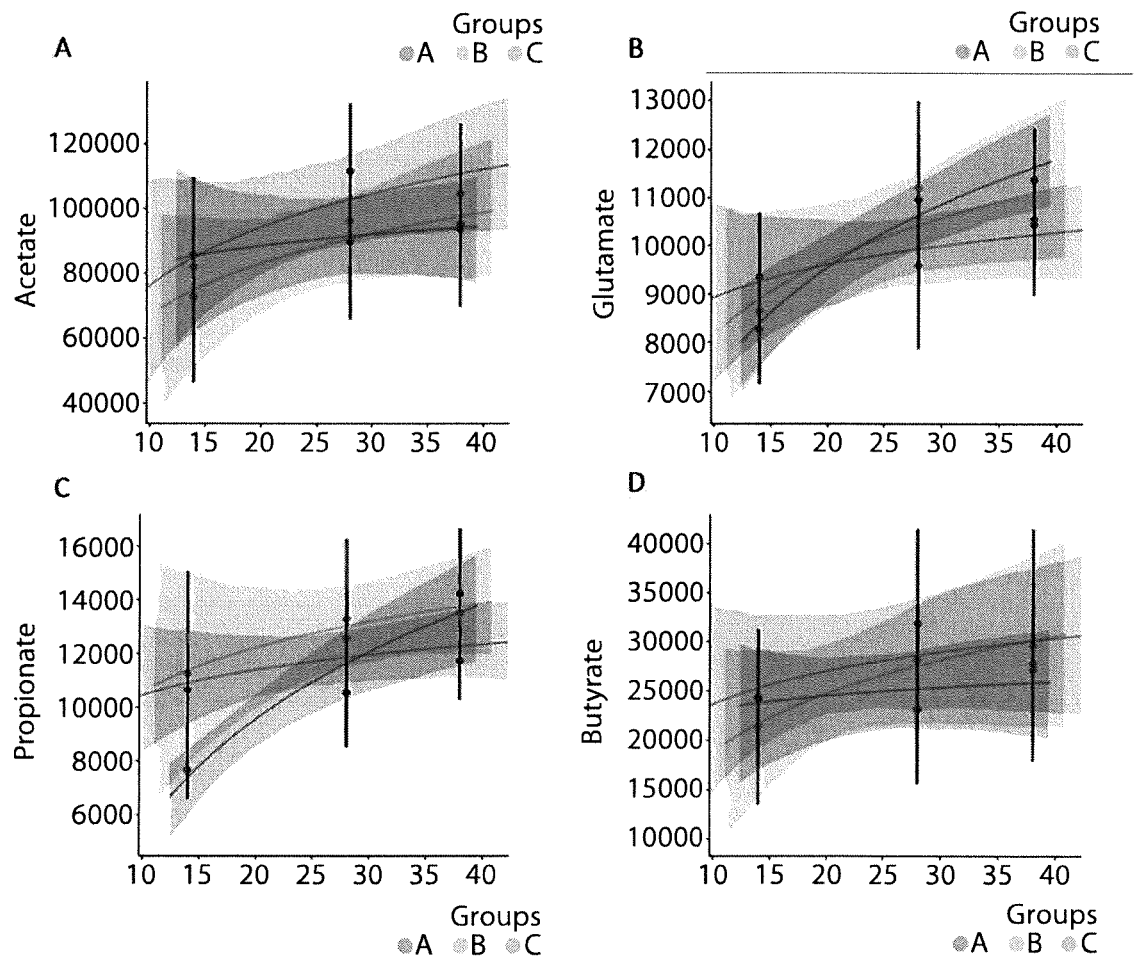

FIG. 46 Log Normal fits of average metabolites signal integral versus time. Comparison is treatment group-wise with standard deviation as error bar. The translucent area defines 95% confidence interval of the fit.

Figure 47:
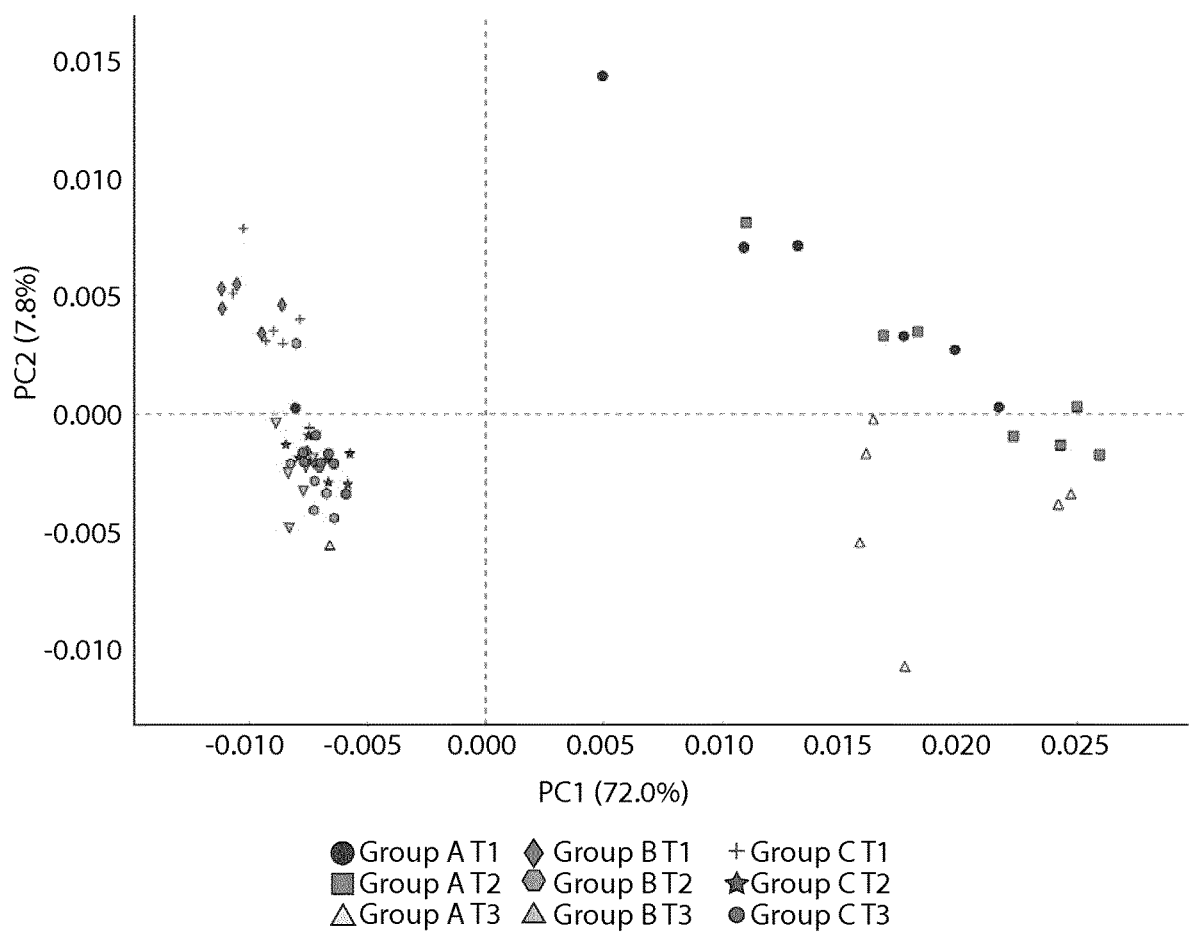

FIG. 47 PCA scores plot of all normalized functional features (6361 data) of all samples (63 samples)

Figure 48:
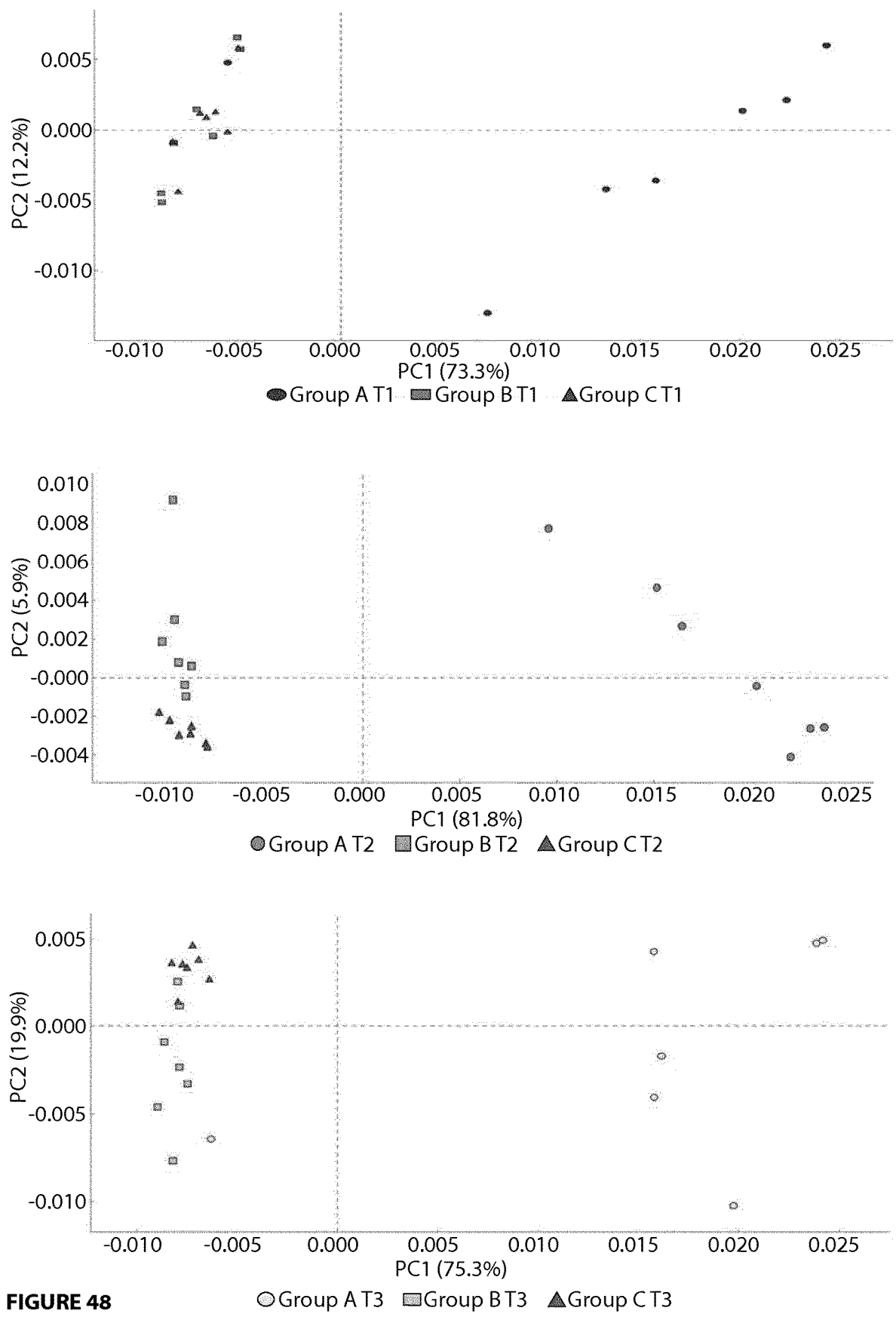

FIG. 48 PCA scores plot of the normalized functional features of treated groups (Group B and C) in comparison to control group (Group A) for each time point.

Figure 49:
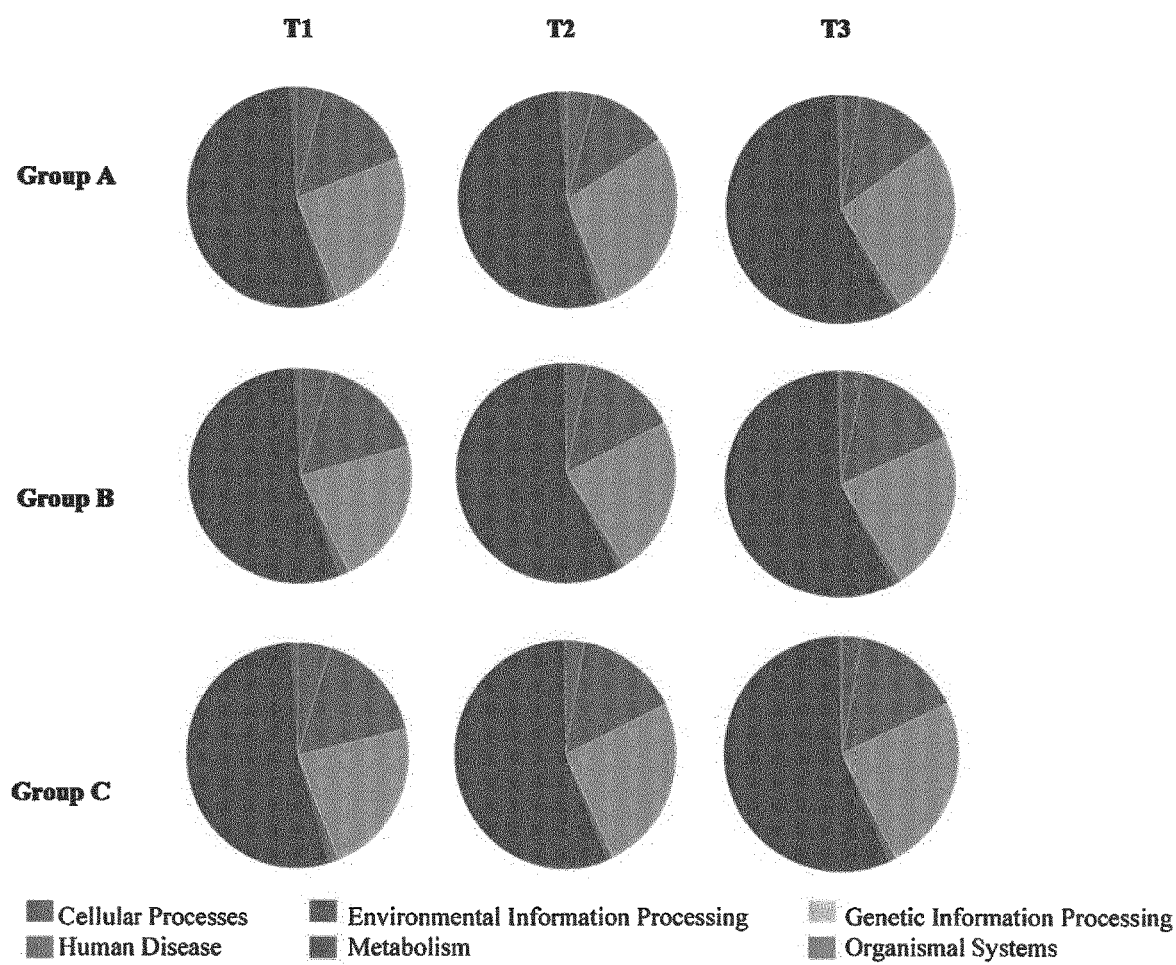

FIG. 49 Primary KEGG metabolic pathways in broiler caeca of three different groups A, B and C, for each available time point (T1, T2, T3)

Figure 50:
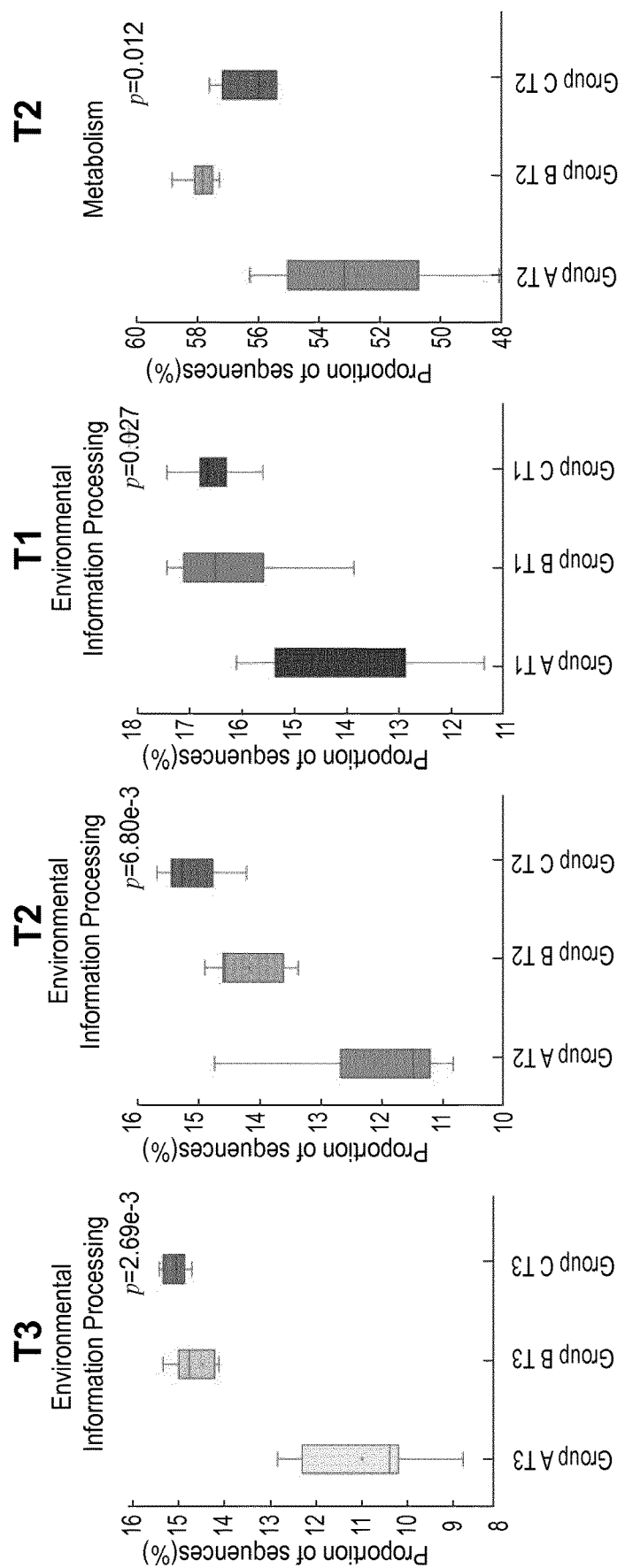

FIG. 50 Relative abundance of Environmental Information Processing and Metabolism pathways (KEGG database) in broiler caeca of three different groups A, B and C, for each available time point (T1, T2, T3) with statistically significant relative abundance. Green and red box are related to Group B and C respectively while blue box is related to Group A. P values are shown at the top right of each graph.

Figure 51:
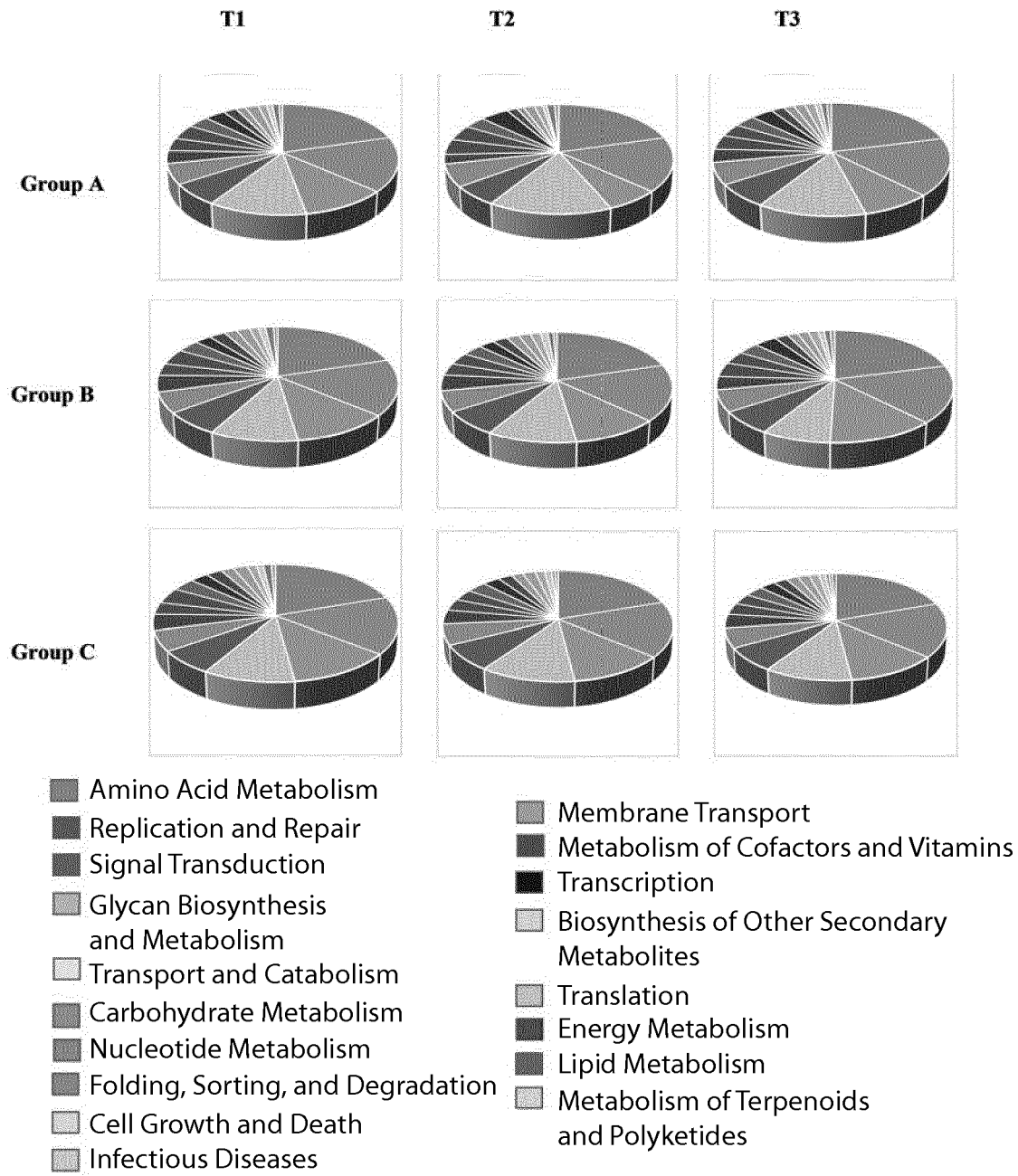

FIG. 51 Secondary KEGG metabolic pathways with a relative abundance 0.5% in broiler caeca of three different groups A, B and C, for each available time point (T1, T2, T3).

Figure 52:
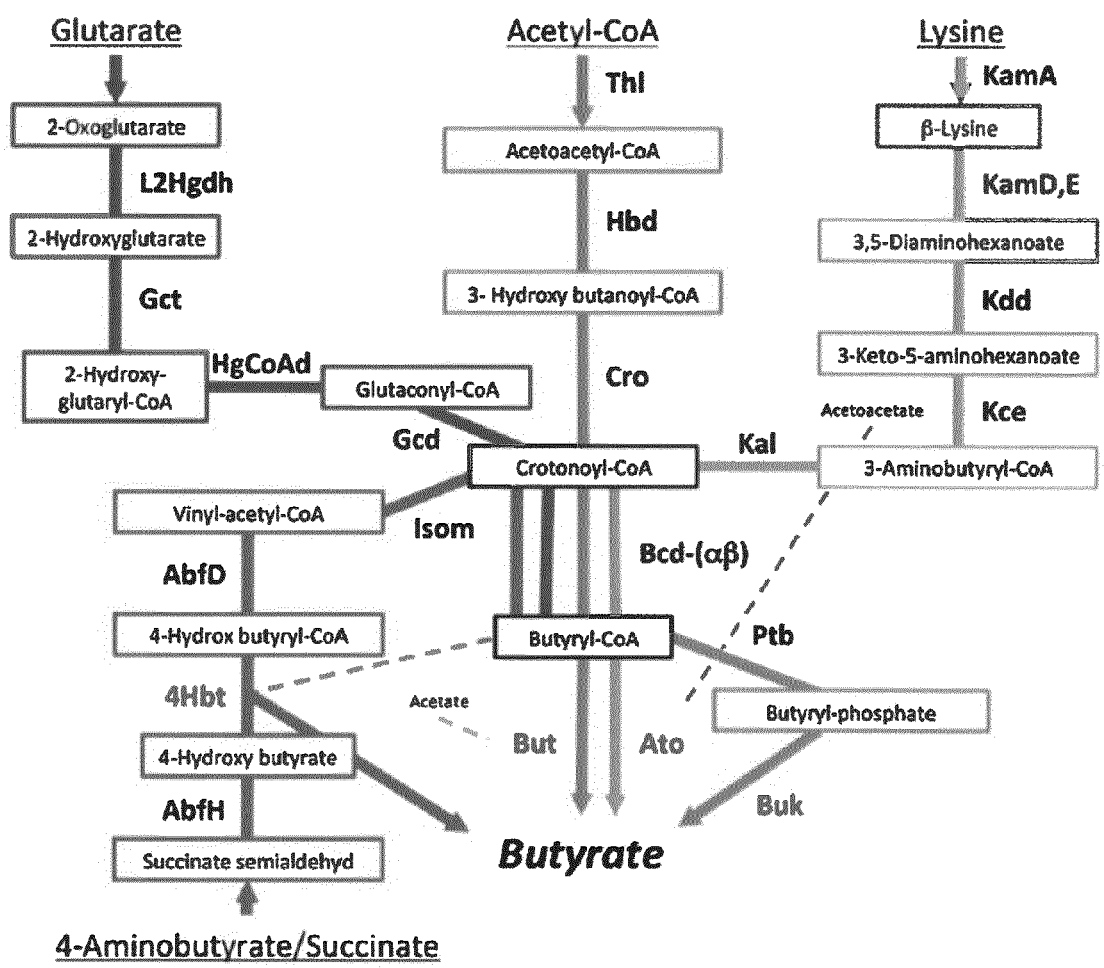

FIG. 52 Four different pathways for butyrate synthesis and corresponding genes (protein names) are displayed. Major substrates are shown. Terminal genes are highlighted in red. L2Hgdh, 2-hydroxyglutarate dehydrogenase; Gct, glutaconate CoA transferase ($\alpha$, $\beta$ subunits); HgCoAd, 2-hydroxy-glutaryl-CoA dehydrogenase ($\alpha,\beta,\gamma$ subunits); Gcd, glutaconyl-CoA decarboxylase ($\alpha,\beta$ subunits); Thl, thiolase; hbd, $\beta$-hydroxybutyryl-CoA dehydrogenase; Cro, crotonase; Bcd, butyryl-CoA dehydrogenase (including electron transfer protein $\alpha,\beta$ subunits); KamA, lysine-2,3-aminomutase; KamD,E, _$\beta$-lysine-5,6-aminomutase ($\alpha,\beta$ subunits); Kdd, 3,5-diaminohexanoate dehydrogenase; Kce, 3-keto-5-aminohexanoate cleavage enzyme; Kal, 3-aminobutyryl-CoA ammonia lyase; AbfH, 4-hydroxybutyrate dehydrogenase; AbfD, 4-hydroxybutyryl-CoA dehydratase; Isom, vinylacetyl-CoA 3,2-isomerase (same protein as AbfD): 4Hbt, butyryl-CoA:4-hydroxybutyrate CoA transferase; But, butyryl-CoA:acetate CoA transferase; Ato, butyryl-CoA: acetoacetate CoA transferase ($\alpha,\beta$ subunits); Ptb, phosphate butyryltransferase; Buk, butyrate kinase. Cosubstrates for individual butyryl-CoA transferases are shown. (Vital et al 2014)

DEFINITIONS

As used throughout the specification and claims the term "beneficial bacteria" includes at least one bacterial taxa selected from the following genera: *Acidaminococcus, Akkermansia, Bacteroides, Bifidobacterium, Blautia, Clostridium, Collinsella, Dorea, Escherichia coli, Eubacterium, Faecalibacterium, Lachnospira, Lactobacillus, Parabacteroides, Raoultella, Roseburia, Ruminococcus, Prevotella*, and *Christensenella*. Also the following families *Erysipelotrichaceae, Coriobacteriaceae, Barnesiellaceae* may include beneficial bacterial taxa.

As used throughout the specification and claims, when "niacin" is referred to, it is not a sole active agent. If present, it is in combination with at least another active agent, and preferably niacin is not present.

"Supra physiological" dose means the same as "supra-nutritional", i.e. a dosage which is higher than the recommended amount of the active ingredient for the animal, such that at least an effective amount of the active ingredient is present in the animal's intestine, preferably its lower intestine and/or colon, and is available to directly nourish the bacterial population.

"Sole active agent" means that the only active agent which is present in the intestine, preferably the colon, is the one indicated.

The term "intestine" as used herein refers to the portion of the gastrointestinal tract consisting of the small intestine and the large intestine.

The term "vitamin A" as used herein means a compound selected from retinol, retinal, retinoic acid, and provitamin A carotenoids (most notably beta-carotene). In a preferred embodiment vitamin A is retinol. Any concentrations or amounts of vitamin A as used herein refer to retinol equivalents.

The term "vitamin E" refers to compounds having $\alpha$-tocopherol activity. In a preferred embodiment the vitamin E is $\alpha$-tocopherol and its esters, in particular $\alpha$-tocopherol acetate. Any concentrations or amounts of vitamin E mentioned herein refer to alpha-tocopherol equivalents.

The term "vitamin D" as used herein means vitamin D3. 25-hydroxyvitamin D3 can be use in lieu of or in addition to Vitamin D3, preferably in non-human species. The relative strength of 25-hydroxyvitamin D3 to Vitamin D3 is approximately 40:1, so dosing of 25-hydroxyvitamin D3 should be adjusted accordingly.

The term "riboflavin" includes riboflavin and esters thereof, in particular riboflavin-5'-phosphate.

The term "folic acid" refers to folic acid and pharmaceutically acceptable salts thereof.

The term "vitamin C" means ascorbic acid, pharmaceutically acceptable salts thereof (e.g. sodium ascorbate and calcium ascorbate) and pharmaceutically acceptable esters thereof (in particular ascorbyl palmitate).

The term "vitamin K" includes vitamin K1 and vitamin K2.

The term "$\beta$-carotene" refers to $\beta$-carotene or Provitamin A.

The term "vitamin B1" means thiamine, aneurine and pharmaceutical salts thereof (e.g. thiamine mononitrate).

The term "niacin" means nicotinic acid, vitamin B3, pyridine-3-carboxylic acid and includes nicotinamide or niacinamide. It may be present in combination with at least one other active ingredient, but it is specifically excluded from this invention when it is the sole active ingredient.

The term "vitamin B5" means pantothenic acid and pharmaceutically acceptable salts thereof (e.g. calcium pantothenate) and includes its derivate pantothenol or panthenol.

The term "vitamin B6" means pyridoxal phosphate and includes pyridoxal 5'phosphate.

The term "biotin" means vitamin B7, vitamin H, coenzyme R, biopeiderm.

The term "vitamin B12" means cobalamin and includes all forms of vitamin B12 (e.g. cyanocobalamin and methylcobalamin).

"Omega-3 fatty acids" are polyunsaturated fatty acids having a double bond at the n−3 position. In a preferred embodiment, the omega-3 fatty acid is eicosapentaenoic acid (EPA) or docosahexaenoic acid (DHA) or a combination of both.

DETAILED DESCRIPTION

In one aspect, the present invention relates to an active agent selected from the group consisting of riboflavin, vitamin A, beta-carotene, vitamin C, vitamin D, vitamin E, vitamin K, folic acid, β-carotene, vitamin B1 niacin (if present), vitamin B5, vitamin B6, biotin, vitamin B12, omega-3 fatty acids, and combinations thereof, for use in improving intestinal health in an animal wherein said improving comprises or consists of:
  (i) increasing the concentration of at least one short-chain fatty acid or a salt thereof in the intestine,
  (ii) increasing microbiome diversity in the intestine,
  (iii) increasing microbial abundance of beneficial bacteria in the intestine,
  (iv) promoting or increasing the butyrate synthesis pathway in the intestine,
  (v) improving the barrier function of the intestine;
  (vi) reducing the redox potential of the gut;
  (vii) reducing the amount of gas produced in the intestine, and
  (vii) stimulating the intestinal immune responses;
wherein said use comprises administering to the animal
  a) a formulation comprising an effective dose of the active agent, wherein the active agent is delivered to the large intestine; or
  b) a supra physiological dose of an active ingredient so that at least an effective amount of the active ingredient is present in the animal's intestine;
with the provisos that if niacin is an active agent it is not the sole active agent; and if riboflavin is present it has an improving effect other than increasing the amount of *Faecalibacterium prausnitzii*.

Typically, said use comprises administering to an animal which may be a mammal, a delayed release formulation comprising an effective dose of the active agent, wherein the release of the active agent is delayed until the large intestine or until the colon, or by a non-oral route where the agent is delivered directly to the colon. Delayed release formulations and their preparation are explained in more detail infra.

When the animal is a non-human such as a monogastric farm animal or poultry, the administration can be through either a delayed release formulation whereby the release of the active agent is delayed until the large intestine or by use of a supra-physiological dose in the feed, such that an effective amount of the active is present in the intestine. When the animal is human, administration can be done in a number of ways, as detailed in the specification, including administration of a delayed release formulation, administration through a non-oral route, and/or by use of a supra-physiological dose.

In some embodiments, niacin is not considered one of the active agents of this invention.

Increasing Short-Chain Fatty Acids/Promoting Butyrate Synthesis

The term "short-chain fatty acid" (SCFA) as used herein refers to fatty acids with two to six carbon atoms. SCFAs include formic acid, acetic acid, propionic acid, butyric acid, 2-methylpropanoic acid, 3-methylbutanoic acid, and hexanoic acid. The most important SCFAs are acetic acid, propionic acid and butyric acid.

The "increase" in the concentration of one or more SCFA in the colon of an animal is relative to the SCFA concentration of an animal not administered with the active agent. The animal not administered with the active agent is referred to herein as "control animal". Preferably, the "increase" in the concentration of one or more SCFA in the colon of an animal is relative to the SCFA concentration of the same animal not administered with the active agent. That is, the control animal in this situation is the same animal typically prior to the start of the administration of the active agent. Preferably, the control animal has not received an active agent recited herein in the form of nutritional supplements for at least 28 days. In some embodiments the animal is a mammal; in some embodiments the animal is a monogastric animal, such as a pig. In some embodiments, the animal is poultry.

In one embodiment, the concentration of acetic acid is increased upon administration of the active agent. In another embodiment, the concentration of propionic acid is increased upon administration of the active agent. In another embodiment, the concentration of butyric acid is increased upon administration of the active agent. In yet another embodiment, the concentration of acetic acid, propionic acid and butyric acid is increased upon administration of the active agent.

In one embodiment, the concentration of one or more SCFAs is increased upon a single administration of the active agent. In another embodiment, the concentration of one or more SCFAs is increased upon two administrations of the active agent, which are applied on two consecutive days. In another embodiment, the concentration of one or more SCFAs is increased upon seven administrations of the active agent, which are applied on seven consecutive days. In another embodiment, the concentration of one or more SCFAs is increased upon 14 administrations of the active agent, which are applied on 14 consecutive days. Preferably, the concentration of one or more SCFAs (e.g., of acetic acid, propionic acid and/or butyric acid) is increased upon 21 administrations of the active agent, which are applied on 21 consecutive days. Most preferably, the concentration of one or more SCFAs (e.g., of acetic acid, propionic acid and/or butyric acid) is increased upon 28 administrations of the active agent, which are applied on 28 consecutive days, once daily.

The concentration of the SCFA in the colon may be increased by at least 5%, preferably by at least 10%, or at least 15%, or at least 20%, relative to the SCFA concentration in the colon of a control. In the control no active agent has been administered.

The concentration of SCFAs in the colon can be determined by obtaining fecal samples from the mammal administered with the active agent and measuring the concentration of one or more SCFAs.

Methods for measuring the concentration of commonly known SCFAs, e.g. by gas chromatography, are known to those of skill in the art. For example, De Weirdt et al (2010) (DOI:10.1111/j.1574-6941.2010.00974.x) describes suitable methods.

Alternatively, the increase of one or more SCFAs upon administration of an active agent can be determined using a reactor and fecal suspension as an in vitro model, as described in the Examples of this application.

It was further found that administration of active agents leads to an increase in the relative abundance of genes involved in Acetyl-CoA fermentation to Butyrate pathway.

The invention therefore pertains to the use of the active agent for the activation or increase of the butyrate synthesis pathway. The relative abundance of genes involved in Acetyl-CoA fermentation to Butyrate pathway can be determined as described in the examples.

The active agents described herein are micronutrients that are effective in increasing the concentration of at least one SCFA in the colon of a mammal, and/or in improving the barrier function of the intestine. It was found that vitamin A, Vitamin C, riboflavin, vitamin D, vitamin E, vitamin K, folic acid and omega-3 fatty acids are capable of increasing the concentration of at least one SCFA in the colon of a mammal when administered in certain concentrations.

The active agents preferred to increase the butyrate pathway are Vitamin A, Vitamin C, riboflavin, Vitamin E, folic acid, beta-carotene, omega 3 fatty acids and combinations thereof. Conditions which are treated, improved or prevented by this action include metabolic disorders, Type 2 diabetes, obesity, chronic inflammation and arteriogenesis.

Thus another embodiment of this invention is a method of increasing at least one short-chain fatty acid and/or increasing the butyrate synthesis pathway activity in an animal including a human experiencing at a condition selected from the group consisting of metabolic disorders, Type 2 diabetes, obesity, chronic inflammation and arteriogenesis comprising administering at least one active agent selected from the group consisting of Vitamin A, Vitamin C, riboflavin, Vitamin E, folic acid, beta-carotene, omega 3 fatty acids and combinations thereof.

Another embodiment of this invention is an active agent for use in the improvement of intestinal health in an animal, including a human, wherein the improvement comprises increasing the concentration of at least one short-chain fatty acid or a salt thereof in the intestine; or promoting or increasing the butyrate synthesis pathway in the intestine; and wherein the short-chain fatty acid is selected from the group consisting of: of acetic acid, propionic acid and butyric acid or salts thereof.

Another embodiment of this invention is an active agent selected from the group consisting of: Vitamin A, beta carotene, Vitamin C, riboflavin, Vitamin D, Vitamin E, Vitamin K, folic acid, omega 3 fatty acids, and combinations thereof for use in increasing the concentration of at least one short-chain fatty acid or a salt thereof in the intestine.

Another embodiment if this invention is an active agent for use in the improvement of intestinal health in an animal, including a human, wherein the improvement comprises increasing the concentration of at least one short-chain fatty acid or a salt thereof in the intestine; or promoting or increasing the butyrate synthesis pathway in the intestine, wherein the animal, including a human is experiencing a condition selected from the group consisting of: metabolic disorder, Type 2 Diabetes, obesity, chronic inflammation, and atherogenesis.

Microbiome Diversity and Enhancing Beneficial Bacteria

It was further observed that administration of active agents increases the microbiome diversity in the intestine. The invention therefore pertains to the use of the active agent for increasing intestinal microbiome diversity, preferably colonic microbiome diversity. Microbiome diversity can be determined as described in the examples for human, swine, and poultry.

In particular, the inventors found that supplementation of active agents increases the relative abundance of beneficial bacteria, preferably *Lactobacillus, Bifidobacterium, Akkermansia* and *Faecalibacterium* in humans. The invention therefore pertains to the use of the active agent for increasing the relative abundance of beneficial bacteria, and preferably a beneficial bacteria which includes at least one of *Lactobacillus, Bifidobacterium Akkermansia* and/or *Faecalibacterium* in the intestine, preferably in the colon.

In poultry for example, *Bacteroides* and *Faecalibacterium* are increased. Thus another embodiment is a method of increasing beneficial bacteria in an animal comprising administering a supra-physiological dose of an active agent to an animal.

An increase in the abundance of beneficial bacteria can treat, prevent, or lessen the symptoms of irritable bowel syndrome, metabolic disease, obesity and inflammatory conditions.

The preferred agents are Vitamin B1, riboflavin, Vitamin B5, Vitamin B12, beta-carotene, biotin, Vitamin C, Vitamin E, Vitamin D, folic acid, Vitamin K, omega 3 fatty acids, and combinations thereof, However if riboflavin is an active agent, then it is present for a purpose other than increasing the abundance of *F. prausnitzii*.

Thus another embodiment of this invention is a method of treating, preventing, or lessening the symptoms of irritable bowel syndrome, metabolic disease, obesity, or inflammatory conditions in an animal including a human in need thereof comprising: administering a beneficial bacteria enhancing amount of an active agent to the colon of the animal; the active agent being selected from the group consisting of: Vitamin B1, riboflavin, Vitamin B5, Vitamin B12, beta-carotene, biotin, Vitamin C, Vitamin E, Vitamin D, folic acid, Vitamin K, omega 3 fatty acids, and combinations thereof; with the proviso that if riboflavin is an active agent, then it is present for a purpose other than increasing the abundance of *F. prausnitzii*.

Another embodiment of this invention is an active agent for use in improving gut health wherein the improvement comprises increasing microbiome diversity in the intestine and/or increasing the abundance of beneficial bacteria are increased in the colon. The beneficial bacteria which are increased are selected from the group consisting of: *Acidaminococcus, Akkermansia* sp. *Bacteroides ovatus, Bifidobacterium* spp., *Blautia producta, Clostridium cocleatum, Collinsella aerofaciens, Dorea longicatena, Escherichia coli, Eubacterium* spp., *Faecalibacterium prausnitzii, Lachnospira pectinoshiza, Lactobacillus* spp., *Parabacteroides distasonis, Raoultella* spp., *Roseburia* spp., *Ruminococcus* spp., *Streptococcus* spp., and combinations thereof, with the proviso that if riboflavin is present it has an improving effect other than increasing the amount of *Faecalibacterium prausnitzii*. Preferably the bacteria which are increased are selected from the group consisting of *Bifidobacterium, Akkermansia Faecalibacterium* and *Bacteroides*.

The active agent may be used in an animal, including a human, who is experiencing a condition selected from the group consisting of: irritable bowel disease, metabolic disease, obesity, and inflammatory conditions. Preferably the active agent is selected from the group consisting of: Vitamin B1, Vitamin B2, Vitamin B5, Vitamin B6, Vitamin B12, Beta-carotene, biotin, Vitamin C, Vitamin E, Vitamin D, folic acid, Vitamin K, omega 3 fatty acids, and combinations thereof.

Stimulating Immune Responses

It was further observed that the production of certain markers and cytokines by the colon epithelial cell line HT29 is increased after treating the cells with effluent from 24 h intestinal batch fermentation upon administration of active agents. The biomarkers and cytokines include GROa-CXCL1, IL-8 and MIP3A-CCL20.

GROa-CXCL1 is a chemokine which, plays an important role in inflammation and acts as a chemoattractant for neutrophils. It activates host immune response by recruiting and activating neutrophils at tissue site for microbial killing. CXCL1 is also known to activate the release of proteases and reactive oxygen species (ROS) for microbial defense.

Interleukin-8 (IL-8) is a chemoattractant cytokine that is known to have neutrophil migration ability, which helps in enhanced chemotaxis. It induces chemotaxis in target cell causing neutrophils and other granulocytes to migrate toward the site of infection.

MIP3A-CCL20 is also a chemokine that selectively attracts effector and memory T lymphocytes, immature DCs, and native B cells that expresses the receptor CCR6. CCL20 is expressed constitutively at immunological barriers such as the gastrointestinal tract and the skin.

All of these biomarkers reflect activation of immune responses.

Stimulating the immune response can benefit conditions including chronic inflammation as well as acute inflammation.

Preferred agents are riboflavin, Vitamin E, Vitamin A, Vitamin K, and combinations thereof.

Thus another embodiment of this invention is the use of an agent to stimulate an intestinal immune response, improve a symptom of immune weakness, produce a systemic anti-inflammatory response, by using and/or administering an effective amount of an active agent to the colon of an animal in need thereof, wherein the agent is selected from the group consisting of riboflavin, Vitamin E, Vitamin A, Vitamin K and combinations thereof. A further embodiment is a method of treating, preventing, or lessening the symptoms of chronic or acute inflammation comprising administering an immune stimulating effective amount of an agent to the colon of an animal wherein the agent is selected from the groups consisting of riboflavin, Vitamin E, Vitamin A, Vitamin K, and combinations thereof.

Another embodiment of this invention is an active agent for the use of improving gut health wherein the improvement is stimulating the intestinal immune responses. Preferably the use is to increase an immune response molecule selected from the group consisting of: GROa-CXCL1, MIP3A-CCL20, Interleukin 8, and a combination of thereof. Preferably the active agent is selected from the group consisting of: Vitamin B2, Vitamin E, Vitamin D, Vitamin A, and Vitamin K, and mixtures thereof.

Another embodiment is a method of improving intestinal immune responses in an animal, including a human experiencing acute or chronic inflammation comprising administering to the intestine an active agent selected from the group consisting of riboflavin, Vitamin E, Vitamin A Vitamin K and combinations thereof, Redox Potential While usually antioxidant compounds such as Vitamin C and E do not reach the colon, the colon target delivery of antioxidant vitamins and compounds to the large intestine allows reduction of the redox potential in the gut. This lower redox potential can counteract the symptoms associated with a disturbance of the composition and activity of the normal gut microbial flora, especially in situations where the gut microbiome environment is confronted with presence of more oxygen and/or oxygen radicals, which hampers growth of strictly anaerobic beneficial microbes, facilitates growth of aerotolerant pathogenic organisms, and/or causes inflammation and cell damage to the host cells.

Thus, another embodiment of this invention is the use of an active agent, preferably Vitamin C and/or E to lower the redox potential in the gut, and thereby reduce the growth of aerotolerant pathogenic organisms, reduce gut inflammation and resultant cell damage, and promote growth of beneficial strict anerobic bacteria.

Moreover, another embodiment of this invention is the use of an active agent, preferably Vitamin C and/or E to lower plasma free thiols, which are a measure of systemic redox status in various inflammatory conditions such as inflammatory bowel disease.

Thus, another embodiment of this invention is a method of reducing the redox potential of the gut, which results in a benefit selected from the group consisting of:
  promoting growth of strictly anerobic beneficial bacteria in the colon;
  reducing aerotolerant pathogenic organisms in the gut;
  decreasing the inflammation in the gut; and
  decreasing cell damage in the gut resulting from inflammation in the gut
comprising administering to an animal, including a human in need thereof and agent selected from the group consisting of riboflavin, Vitamin C, Vitamin E and mixtures thereof.

Gas Production

The colon incubations were performed in closed incubation systems. This allowed us to evaluate the accumulation of gasses in the headspace, which can be measured with a pressure meter. Gas production is a measure of microbial activity, and thus of the speed of fermentation of the potentially prebiotic substrates. It can be used as an indication for bloating and digestive wellbeing upon prebiotic consumption.

As demonstrated in the Examples, the active agents, preferably Vitamin B2 and/or Vitamin C can be used to reduce the amount of gas produced in the intestine.

Thus another embodiment of this invention is a method of treating, preventing, or lessening the amount of gas produced in the gut comprising delivering an active agent selected from the group consisting of Vitamin B2, Vitamin C and combinations thereof to the large intestine.

Strengthening of Intestinal Barrier

Co-cultures of Caco-2 and HT29-MTX-E12 cells were used to assess the protective effect of the supernatants before and after fermentation. Transepithelial electrical resistance (TEER) readings correlate with the tightness of a confluent monolayer (Srinivasan et al. 2015) and can be used as an indication for intestinal barrier strength. Reduction of the barrier strength of the intestine is seen in conditions associated with a number of conditions including irritable bowel disease, Crohn's disease, ulcerative colitis, leaky gut and malnutrition.

The preferred agents for improving the gut barrier are riboflavin, vitamin C, Vitamin E, omega-3 fatty acids, Vitamin D, Vitamin A, folic acid, Vitamin K and mixtures thereof. Thus another embodiment of this invention is a method of treating, preventing or lessening the symptoms of a condition selected from the group consisting of irritable bowel disease, Crohn's disease, ulcerative colitis, leaky gut and malnutrition comprising administering to an animal, including a human in need thereof, an agent selected from the group consisting of riboflavin, vitamin C, Vitamin E, omega-3 fatty acids, Vitamin D, Vitamin A, folic acid, Vitamin K and mixtures thereof.

Another embodiment of this invention is the use of an active agent according to improve gut health wherein the improvement comprises improving the barrier function of the intestine. The use can be in an animal including the human is experiencing a condition selected from the group consisting of: irritable bowel disease, Chron's Disease, ulcerative colitis, leaky gut, and malnutrition. Preferably the active agent is selected from the group consisting of: Vitamin B2, Vitamin C, Vitamin E, omega-3 fatty acids, Vitamin D, Vitamin A, folic acid, Vitamin K1 and mixtures thereof.

Dosage and Concentrations

The dosages used herein are intended to be in addition to the active ingredients that a mammal ingests for general nutrition purposes. Instead they act upon the gut microbiome environment as a whole, at the genus, species and strain level of the gut microbes. The active agents are not intended to be metabolized directly by the mammal, rather they are intended to be utilized by the bacterial population of the colon. Therefore, the amounts reported below would be consumed by the animal in addition to the usual diet, but as they are not directly available to the animal due to their delayed release.

| Compound | Unit | Amount per day* |
|---|---|---|
| Vitamin A (retinol) | μg RAE | up to 3,000 |
| β-carotene | mg | up to 25 |
| B1 (thiamin) | mg | up to 100 |
| B2 (riboflavin) | mg | up to 200 |
| B3 (Niacin) | mg | up to 1,500 |
| B5 (Pantothenic acid) | mg | up to 1,000 |
| B6 (Pyridoxal phosphate) | mg | up to 100 |
| B12 | μg | up to 3,000 |
| B7 (Biotin) | μg | up to 2,500 |
| B9 (Folate/folic acid) | μg DFE | up to 1,000 |
| Vitamin C | mg | up to 2,000 |
| Vitamin D3 | μg | up to 250 |
| α-Tocopherol (Vitamin E) | mg a-TE | up to 1,000 |
| Vitamin K | μg | up to 10,000 |
| DHA and EPA combined | mg | up to 5,000 |
| DHA | mg | up to 1,000 |
| EPA | mg | up to 1,800 |

*for all vitamins the upper limit is based on the recommendations of the council of responsible nutrition (https://www.crnusa.org/resources/vitamin-mineral-safety). For DHA and EPA the upper concentration limit is based on UL levels from EFSA.

*for all vitamins the upper limit is based on the recommendations of the council of responsible nutrition (crnusa.org/resources/vitamin-mineral-safety). For DHA and EPA the upper concentration limit is based on UL levels from EFSA.

Preferably, riboflavin is administered in an amount such that its local concentration in the colon is at least 0.01 mg/ml, preferably at least 0.1 mg/ml, more preferably at least 0.5 mg/ml, most preferably at least 1.25 mg/ml, e.g. about 1.4 mg/ml. Preferred local concentrations in the colon range from about 0.01 mg/ml to about 5 mg/ml, or from about 0.1 mg/ml to about 4 mg/ml, or from about 0.5 mg/ml to about 3 mg/ml, or from about 1.25 mg/ml to about 2 mg/ml.

In one embodiment suitable for poultry a supra-physiological amount may be at least about 10× or even 20× the recommended dose, for example if the recommended daily dose is 5 mg, the amount administered in the feed is 50 mg or 100 mg in order for the riboflavin to be present in the colon.

Preferably, vitamin E is administered in an amount such that its local concentration in the colon is at least 0.01 mg/ml, preferably at least 0.05 mg/ml, most preferably at least 0.1 mg/ml.

Preferred local concentrations in the colon range from about 0.01 mg/ml to about 5 mg/ml, more preferably from about 0.03 mg/ml to about 4 mg/ml, most preferably from about 0.05 mg/ml to about 3 mg/ml.

Preferably, ascorbic acid is administered in an amount such that its local concentration in the colon is at least 0.05 mg/ml, preferably at least 0.1 mg/ml, most preferably at least 0.5 mg/ml.

Preferred local concentrations in the colon range from about 0.05 mg/ml to about 50 mg/ml, more preferably from about 0.1 mg/ml to about 20 mg/ml, most preferably from about 1 mg/ml to about 10 mg/ml.

Preferably, vitamin D is administered in an amount such that its local concentration in the colon is at least 0.01 μg/ml, preferably at least 0.03 μg/ml, most preferably at least 0.04 μg/ml or at least 0.1 μg/ml. Preferred local concentrations in the colon range from about 0.01 μg/ml to about 20 μg/ml, more preferably from about 0.03 μg/ml to about 10 μg/ml, most preferably from about 0.04 μg/ml to about 2 μg/ml. or from about 0.1 μg/ml to about 2 μg/ml.

Preferably, vitamin A is administered in an amount such that its local concentration in the colon is at least 0.05 μg/ml, preferably at least 0.1 μg/ml, most preferably at least 0.2 μg/ml. Preferred local concentrations in the colon range from about 0.05 μg/ml to about 20 μg/ml, more preferably from about 0.1 μg/ml to about 10 μg/ml, more preferably from about 0.2 μg/ml to about 5 μg/ml.

Preferably, vitamin K is administered in an amount such that its local concentration in the colon is at least 0.01 mg/ml, preferably at least 0.03 mg/ml, most preferably at least 0.04 mg/ml. Preferred local concentrations in the colon range from about 0.01 mg/ml to about 5 mg/ml, more preferably from about 0.03 mg/ml to about 1 mg/ml, most preferably from about 0.05 mg/ml to about 0.5 mg/ml.

Preferably, folic acid is administered in an amount such that its local concentration in the colon is at least 0.1 μg/ml, preferably at least 0.5 μg/ml, most preferably at least 1 μg/ml. Preferred local concentrations in the colon range from about 0.1 μg/ml to about 20 μg/ml, more preferably from about 0.5 μg/ml to about 15 μg/ml, most preferably from about 1 μg/ml to about 10 μg/ml.

Preferably, β-carotene is administered in an amount such that its local concentration in the colon is at least 5 μg/ml, preferably at least 40 μg/ml, most preferably at least 100 μg/ml. Preferred local concentrations in the colon range from about 5 μg/ml to about 20 mg/ml, more preferably from about 40 μg/ml to about 10 mg/ml, most preferably from about 100 μg/ml to about 5 mg/ml.

Preferably, vitamin B1 is administered in an amount such that its local concentration in the colon is at least 1 μg/ml, preferably at least 10 μg/ml, most preferably at least 20 μg/ml. Preferred local concentrations in the colon range from about 1 μg/ml to about 10 mg/ml, more preferably from about 10 μg/ml to about 5 mg/ml, most preferably from about 20 μg/ml to about 1 mg/ml.

Preferably, niacin is administered in an amount such that its local concentration in the colon is at least 0.5 μg/ml, preferably at least 1 μg/ml, most preferably at least 2 μg/ml or at least 3 μg/ml. Preferred local concentrations in the colon range from about 0.5 μg/ml to about 1 mg/ml, more preferably from about 1 μg/ml to about 500 μg/ml, most preferably from about 2 μg/ml to about 100 μg/ml. If niacin is administered, then is it not the sole active agent.

Preferably, vitamin B5 is administered in an amount such that its local concentration in the colon is at least 0.05 mg/ml, preferably at least 0.1 mg/ml, most preferably at least 0.4 mg/ml. Preferred local concentrations in the colon range from about 0.05 mg/ml to about 100 mg/ml, more preferably from about 0.1 mg/ml to about 50 mg/ml, most preferably from about 0.4 mg/ml to about 20 mg/ml.

Preferably, vitamin B6 is administered in an amount such that its local concentration in the colon is at least 1 μg/ml, preferably at least 5 μg/ml, most preferably at least 10 μg/ml. Preferred local concentrations in the colon range from about 1 μg/ml to about 3 mg/ml, more preferably from about 5 μg/ml to about 1 mg/ml, most preferably from about 10 μg/ml to about 500 μg/ml.

Preferably, biotin is administered in an amount such that its local concentration in the colon is at least 1 μg/ml, preferably at least 2 μg/ml, most preferably at least 4 μg/ml. Preferred local concentrations in the colon range from about 1 μg/ml to about 1 mg/ml, more preferably from about 2 μg/ml to about 500 μg/ml, most preferably from about 4 μg/ml to about 200 μg/ml.

Preferably, vitamin B12 is administered in an amount such that its local concentration in the colon is at least 0.01 μg/ml, preferably at least 0.03 μg/ml, most preferably at least 0.05 μg/ml. Preferred local concentrations in the colon range from about 0.01 μg/ml to about 10 μg/ml, more preferably from about 0.03 μg/ml to about 5 μg/ml, most preferably from about 0.05 μg/ml to about 2 μg/ml.

Preferably, omega-3 fatty acid is administered in an amount such that its local concentration in the colon is at least 0.02 mg/ml, preferably at least 0.05 mg/ml, most preferably at least 0.1 mg/ml. Preferred local concentrations in the colon range from about 0.02 mg/ml to about 2 mg/ml, more preferably from about 0.05 mg/ml to about 1.5 mg/ml, most preferably from about 0.1 mg/ml to about 1 mg/ml. In another embodiment, omega-3 fatty acid is administered in an amount such that its local concentration in the colon is at least 0.02 mg/ml, preferably at least 0.05 mg/ml, most preferably at least 0.1 mg/ml. Preferred local concentrations in the colon range from about 0.02 mg/ml to about 100 mg/ml, more preferably from about 0.05 mg/ml to about 75 mg/ml, most preferably from about 0.1 mg/ml to about 60 mg/ml. In another embodiment, the active agent is administered to the mammal at a daily dose of up to 2.9 mg riboflavin per kg body weight, up to 42.9 μg vitamin A per kg body weight, up to 3.6 μg vitamin D per kg body weight, up to 28.6 mg vitamin C per kg body weight, up to 14.3 mg vitamin E per kg body weight, up to 143 μg vitamin K per kg body weight, up to 14.3 μg folic acid per kg body weight, up to 0.4 mg β-carotene, up to 1.4 mg vitamin B1, up to 21.4 mg niacin, up to 14.3 mg vitamin B5, up to 1.4 mg vitamin B6, up to 35.7 μg biotin, up to 43 μg vitamin B12, 71.4 mg omega-3 fatty acid(s) per kg body weight or combinations thereof, where preferably EPA is up to 25.7 mg per kg body weight and DHA is up to 14.3 mg per kg body weight.

Another embodiment is a delayed release formulation for delivery of an active agent to the intestine, comprising the active agent and an enteric layer or an enteric shell, wherein said active agent consists of up to 200 mg riboflavin, up to 3000 μg vitamin A, up to 2000 mg vitamin C, up to 250 μg vitamin D, up to 1000 mg vitamin E, up to 10 mg vitamin K, up to 1 mg folic acid, up to 25 mg β-carotene, up to 100 mg vitamin B1, up to 1500 mg niacin, up to 1000 mg vitamin B5, up to 100 mg vitamin B6, up to 2500 μg biotin, up to 3000 μg vitamin B12, up to 5000 mg omega-3 fatty acid(s) or combinations thereof where preferably EPA is up to 1800 mg and DHA is up to 1000 mg, and wherein the release of the active agent is delayed until the intestine.

Another embodiment is a delayed release formulation for delivery of an active agent to the intestine, comprising the active agent and an enteric layer or an enteric shell, wherein said active agent consists of 1-85 mg riboflavin, 0.2-0.4 mg vitamin A, 400-600 mg vitamin C, 5-80 μg vitamin D, 80-120 mg vitamin E, 80-140 μg vitamin K, 0.3-0.5 mg folic acid, 80-120 mg omega-3 fatty acid(s) or combinations thereof, and wherein the release of the active agent is delayed until the intestine.

Another embodiment is a delayed release formulation of item wherein said active agent consists of 70-80 mg riboflavin, 0.25-0.35 mg vitamin A, 450-550 mg vitamin C, 15-25 μg vitamin D, 90-110 mg vitamin E, 100-120 μg vitamin K, 0.35-0.45 mg folic acid, 90-110 mg omega-3 fatty acid(s) or combinations thereof.

In one embodiment, riboflavin is administered as the sole active agent.

In another embodiment, vitamin A is administered as the sole active agent.

In another embodiment, vitamin C is administered as the sole active agent.

In another embodiment, vitamin D is administered as the sole active agent.

In another embodiment, vitamin E is administered as the sole active agent.

In another embodiment, vitamin K is administered as the sole active agent.

In another embodiment, omega-3-fatty acid(s) is/are administered as the sole active agent.

In one embodiment, folic acid is administered as the sole active agent.

In another embodiment, β-carotene is administered as the sole active agent.

In another embodiment, vitamin B1 is administered as the sole active agent.

In another embodiment, vitamin B5 is administered as the sole active agent.

In another embodiment, vitamin B6 is administered as the sole active agent.

In another embodiment, biotin is administered as the sole active agent.

In another embodiment, vitamin B12 is administered as the sole active agent.

In another embodiment, DHA is administered as the sole active agent.

In another embodiment, EPA is administered as the sole active agent.

In another embodiment, EPA and DHA are administered as sole active agents.

In another embodiment, the active agent consists of a combination of riboflavin, vitamin A, vitamin D, vitamin E, vitamin K, folic acid, EPA and DHA. In yet another embodiment, the active agent consists of a combination of riboflavin, vitamin A, vitamin C, vitamin D, vitamin E, vitamin K, folic acid, EPA and DHA. In yet another embodiment the active agent consists of a combination of riboflavin, vitamin A, vitamin C, vitamin D, vitamin E, vitamin K, folic acid, β-carotene, vitamin B1, niacin, vitamin B5, vitamin B6, biotin, vitamin B12, EPA and DHA In one embodiment, the delayed release formulation of the present invention is administered once per day. In other embodiments, the formulation is administered twice daily, or every second day.

In one embodiment, the active agent is administered to a mammal. The mammal may be a horse, a cow, a pig, a dog, or a cat. More preferably, the mammal is a human, e.g. an adult human. In one embodiment the adult human has a body mass index (BMI) of at least 20, or at least 25, or even at least 30. For example, the BMI may range from 25 to 35, or from 26 to 34, or from 27 to 33, or from 28 to 32.

Conditions to be Treated or Prevented

According to the first aspect of the invention the active agent is administered in order to increase the concentration of one or more SCFA(s). Accordingly, any condition associated with an impaired SCFA level in the colon can be treated or prevented. The level of an SCFA is impaired if it is significantly reduced relative to that in a healthy individual, e.g. by at least 10%, or at least 20%, or at least 30%. The fecal concentration can be taken as a measure for the concentration in the colon.

Conditions to be treated or prevented according to the present invention include inflammatory conditions, disorders characterized by inflammation, in particular by chronic inflammation, and atherogenesis. In addition, metabolic disorders such as diabetes type 2, or obesity can be treated or prevented or ameliorated. Moreover, immune weakness or allergies can be treated.

According to another aspect of the invention the active agent is administered in order to improve, or strengthen, the barrier function in the intestine. In one embodiment the barrier function in the small intestine is improved or strengthened. In another embodiment the barrier function in the large intestine is improved or strengthened. In another embodiment the barrier function in the colon is improved or strengthened. Accordingly, any condition or disorder associated with an increased intestinal permeability can be treated, ameliorated or prevented. Conditions to be treated include, but are not limited to, disorders characterized by increased intestinal permeability, enteropathy (e.g. environmental enteropathy, enteropathy due to malnutrition), inflammatory bowel disease (e.g. Crohn's disease or ulcerative colitis), and irritable bowel syndrome.

The integrity of the barrier function of the intestine can be determined by measuring the initial transepithelial electrical resistance (TEER) in a model system (see examples). Alternatively, the integrity of the barrier function of the intestine can be determined by measuring the transport of Lucifer yellow from apical to basolateral compartments (see examples). In humans, intestinal permeability can be measured indirectly by determining circulating concentrations of bacterial lipopolysaccharide or antibodies to the lipopolysaccharide core moiety, or directly by dual sugar absorption tests (Dorshow et al, *Scientific Reports* volume 7, Article number: 10888 (2017). For example, the lactulose:mannitol ratio in urine after dual sugar intake can be determined. Alternatively, blood alpha-1 antitrypsin; myeloperoxidase; and/or REG1B protein can be determined.

Another aspect of the invention is to reduce gas production during large intestinal fermentation which will result in improved gut wellbeing, less bloating and potentially higher compliance to fibre and prebiotic treatment Formulations A used herein, "delayed release" refers to the release of the active agent at a time later than immediately after administration. Preferably, "delayed release" means delivery of the active agent, upon oral administration, to the large intestine in a delayed manner relative to an immediate release formulation.

An "enteric layer" is a layer surrounding a core, wherein the core comprises the active agent and the layer confers resistance to gastric juice. An "enteric shell" is a shell or matrix surrounding or encapsulating the active agent, wherein the shell confers resistance to gastric juice. Alternatively, a matrix-based delivery system can be used. Matrix based systems have no discrete layer of coating material but the active agent is more or less homogenously distributed within the matrix. Further, there are colon-release systems that embed the active agent in e.g. in a fiber matrix (enzyme-triggered) and an enteric coating on top.

In a preferred embodiment for humans, the formulation of the present invention is a solid dosage form for oral administration. The formulation may be in the form of a capsule, pellet, bead, sphere, mini spheres, tablet, mini tablet, or granule, optionally coated with a delayed release coating or shell that prevents the release of the active agent before the small intestine, preferably before the colon.

Coating, shell, or matrix materials for the delayed release of the active agent, in particular for targeted release in the ileum or the large intestine, upon oral administration are known in the art. They can be subdivided into coating materials that disintegrate above a specific pH, coating materials that disintegrate after a specific residence time in the gastrointestinal tract and coating materials that disintegrate due enzymatic triggers specific to the microflora of a specific region of the intestines. Coating or shell materials from different categories are commonly used in combinations. Coating or shell materials of these three different categories for targeting to the large intestine have been reviewed for example in Bansal et al. (Polim. Med. 2014, 44, 2, 109-118). In one embodiment of the present invention the delayed release coating comprises at least one component selected from coating materials that disintegrate pH-dependently, coating materials that disintegrate time-dependently, coating materials that disintegrate due to enzymatic triggers in the intestinal environment (e.g. in the intestinal environment of the ileum and the large intestine), and combinations thereof.

Coating materials that disintegrate pH-dependently include polyvinyl acetate phthalate, cellulose acetate trimellitate, hydroxypropyl methylcellulose phthalate HP-50, HP-55 or HP-55S, cellulose acetate phthalate, shellac, hydroxypropyl methylcellulose acetate succinate (HPMCAS), poly(methacrylic acid, ethyl acrylate) 1:1 (Eudragit® L100-55, Eudragit® L30D-55), poly(methacrylic acid, methyl methacrylate) 1:1 (Eudragit® L-100, Eudragit® L12.5), poly(methacrylic acid, methyl methacrylate) 1:2 (Eudragit® S-100, Eudragit® S12,5, and Eudragit® FS30D).

Coating materials that disintegrate time-dependently include Eudragit® RL, Eudragit®RS, and ethylcellulose.

Coating materials that disintegrate due to enzymatic triggers in the large intestinal environment include chondroitin sulfate, pectin, guar gum, chitosan, inulin, lactulose, raffinose, stachyose, alginate, dextran, xanthan gum, locust bean gum, arabinogalactan, cyclodextrin, pullulan, carrageenan, scleroglucan, chitin, curdlan, levan, amylopectin, starch, amylose, resistant starch, and azo compounds being degraded by azo bonds splitting bacteria.

In one embodiment the formulation comprises an enteric capsule, filled with a composition comprising the active agent. The enteric capsule confers resistance against the acidic environment of the stomach. For example, softgel formulations may deliver the active agent in solution and yet offer advantages of solid dosage forms. Softgel capsules are particularly suited for hydrophobic active agents which do not dissolve readily in water. Vitamin K and omega-3 fatty acids are preferably formulated in softgel capsules.

In another embodiment, the formulation is a tablet comprising (i) a core comprising the active agent, and (ii) a delayed release coating such as an enteric coating. This may be a hardgel capsule.

The release of the drug may be delayed until small intestine. In another embodiment, the release of the drug is delayed until the distal small intestine. In yet another embodiment, the release of the drug is delayed until the colon.

For example one formulation may comprise the active agent and an enteric layer or an enteric shell, wherein the active agent is selected from the group consisting of: up to 200 mg riboflavin, up to 3000 µg vitamin A, up to 2000 mg vitamin C, up to 250 µg vitamin D, up to 1000 mg vitamin E, up to 10 mg vitamin K, up to 1 mg folic acid, up to 25 mg β-carotene, up to 100 mg vitamin B1, up to 1500 mg niacin, up to 1000 mg vitamin B5, up to 100 mg vitamin B6, up to 2500 µg biotin, up to 3000 µg vitamin B12, up to 5000 mg omega-3 fatty acid(s) or combinations thereof where preferably EPA is up to 1800 mg and DHA is up to 1000 mg, and wherein the release of the active agent is delayed until the intestine.

Another aspect of the invention is the non-therapeutic use of an active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for increasing the concentration of at least one short-chain fatty acid or a salt thereof in the intestine of a mammal not suffering from any disorder or pathologic condition of the intestine, with the proviso that if niacin is an active agent, then it is not the sole active agent, The mammal preferably is a healthy human.

Yet another aspect of the invention is the non-therapeutic use of an active agent selected from the group consisting of riboflavin, vitamin A, vitamin C, vitamin D, vitamin E, vitamin K, folic acid, β-carotene, vitamin B1, niacin, vitamin B5, vitamin B6, biotin, vitamin B12, omega-3 fatty acids and combinations thereof, for maintaining or improving gut function in a healthy mammal, preferably a healthy human, with the proviso that if niacin is an active agent then it is not the sole active agent.

One consideration of this invention is that the active agents used are not intended to provide nourishment to the mammalian recipient; rather it is intended that they benefit the large intestine microbial population directly and thereby indirectly benefit the mammal. Thus, the dosages are meant to be in addition to the normal daily consumption of vitamins, fatty acids and other nutrients that are part of the diet of the mammal. Thus, by by-passing absorption in the stomach and preferably the small intestine, the microbial population can be nourished, maintain optimum performance in keeping the gut barrier intact. The formulations of this invention thus help maintain a healthy gut.

We also observed a beneficial effect on overall digestion. As shown in the Examples, pigs supplemented with Vitamin B2 showed a higher DM digestibility with substrate (feed or pig's stomach content) incubated in pepsin-HCl compared to the non-supplemented. This was surprising and is clearly a positive effect on gastrointestinal functionality. Additionally we observed a beneficial effect on large intestine fermentation using caecum content from pigs, namely a reduction of methane production. While not wishing to be bound by theory, we believe that this may be explained by the fact that vitamin B2 can reduce the activity of methanogenic bacteria or archaea population and consequently a positive impact on the environment.

EXAMPLES

Example 1

Materials and Methods

Donors and Sample Preparation

In a first set of in vitro experiments at the start of intestinal batch fermentation incubation, all test ingredients were added from stock solutions to the modified nutritional medium, containing (g/l): 2.5 $K_2HPO_4$, 10.9 $KH_2PO_4$, 2 $NaHCO_3$, 2 yeast extract, 2 peptone, 1 mucin, 0.5 cysteine, 2 Tween 80, 2 glucose, 2 starch, 2 cellobiose, 0.1 NaCl, 0.01 $MgSO_4·7H_2O$, 0.01 $CaCl_2·6H_2O$, 0.05 hemin, 0.5 bile salts.

The following compounds were added from stock solutions prepared in water:
Riboflavin Table Grade (abbreviation RTG),
Riboflavin-5-Phosphate (R5P),
Ascorbic Acid granular powder (AA),
Dry Vitamin E 50 CWS-S (E 50 CWS-S),
Dry Vitamin D3 100 CWS (D3 100 CWS),
Dry Vitamin A Acetate 325 CWS/A,
Riboflavin Table Grade+Ascorbic Acid,
Folic Acid,
The other compounds were prepared in ethanol:
Vitamin K1 (VK1),
MEG-3 0080 EE Oil (MEG-3 0080 EE),
MEG-3 4535 EE Oil (MEG-3 4535 EE),
MEG-3 8000 EE Oil (MEG-3 8000 EE).

Each compound was tested in three different concentrations; an overview is given in Table 1. Since ethanol is known to have antimicrobial effects, two blanks for each type of stock solution were included. As a source of the microbial community, a freshly prepared fecal suspension from the selected donor was added to the reactors. Each reactor had a volume of 70 ml. All tests, except the blanks, were performed in single repetition, resulting in 40 independent incubations, as specified in Table 1. Incubation conditions of the pre-screening experiment and the final experiment were 48 h at 37° C., under shaking (90 rpm) and anaerobic conditions. DNA were extracted from effluent samples collected from each fermentation flask before (0 h fermentation) and after fermentation (24 h fermentation) and use for microbiome composition analysis by Shotgun sequencing. Effluent samples were collected from each fermentation flask before (0 h fermentation) and after fermentation (48 h fermentation), sterilized by filtering through 0.22 µm filters and used for short chain fatty acids (SCFA), quantification of immunological biomarkers and in vitro analysis in cell culture systems.

TABLE 1

Experimental setup of the final experiment

| | Micronutrient | DSM product | Dose designation | Final concentration of DSM product in the reactor (mg/ml) | Final concentration of micronutrient in the reactor |
|---|---|---|---|---|---|
| 1 | Vitamin B2 | Riboflavin Table Grade (RTG) | 0.2x | 0.06 mg/ml | 0.06 mg/ml |
| 2 | | | 1x | 0.29 mg/ml | 0.29 mg/ml |
| 3 | | | 5x | 1.43 mg/ml | 1.43 mg/ml |

TABLE 1-continued

Experimental setup of the final experiment

| | Micronutrient | DSM product | Dose designation | Final concentration of DSM product in the reactor (mg/ml) | Final concentration of micronutrient in the reactor | |
|---|---|---|---|---|---|---|
| 4 | Vitamin B2 | Riboflavin-5- | 0.2x | 0.06 mg/ml | 0.06 | mg/ml |
| 5 | Phosphate | phosphate (R5P) | 1x | 0.29 mg/ml | 0.29 | mg/ml |
| 6 | | | 5x | 1.43 mg/ml | 1.43 | mg/ml |
| 7 | Vitamin C | Ascorbic acid | 0.2x | 0.43 mg/ml | 0.43 | mg/ml |
| 8 | | granular Powder | 1x | 2.14 mg/ml | 2.14 | mg/ml |
| 9 | | (AA) | 5x | 10.71 mg/ml | 10.71 | mg/ml |
| 10 | Vitamin E | Dry Vitamin E | 0.2x | 0.14 mg/ml | 0.07 | mg/ml[2] |
| 11 | | 50 CWS-S | 1x | 0.71 mg/ml | 0.36 | mg/ml[2] |
| 12 | | (E 50 CWS-S) | 5x | 3.57 mg/ml | 1.79 | mg/ml[2] |
| 13 | Vitamin D3 | Dry Vitamin D3 | 0.2x | 0.02 mg/ml | 0.04 | μg/ml |
| 14 | | 100 CWS | 1x | 0.09 mg/ml | 0.21 | μg/ml |
| 15 | | (D3 100 CWS) | 5x | 0.43 mg/ml | 1.07 | μg/ml |
| 16 | Vitamin A | Dry Vitamin A | 0.2x | 1.57 μg/ml | 0.18 | μg/ml[1] |
| 17 | | Acetate 325 | 1x | 7.86 μg/ml | 0.90 | μg/ml[1] |
| 18 | | CWS/A (325 CWS/S) | 5x | 39.29 μg/ml | 4.52 | μg/ml[1] |
| 19 | Vitamin B2 + Vitamin C | Riboflavin TG + Ascorbic acid (RTG + AA) | 0.2x | 0.06 mg/ml RTG 0.43 mg/ml AA | 0.06 mg/ml RTG 0.43 mg/ml AA | |
| 20 | | | 1x | 0.29 mg/ml RTG 2.14 mg/ml AA | 0.29 mg/ml RTG 2.14 mg/ml AA | |
| 21 | | | 5x | 1.43 mg/ml RTG 10.71 mg/ml AA | 1.43 mg/ml RTG 10.71 mg/ml AA | |
| 22 | Folic acid | Folic acid (FA) | 0.2x | 0.29 μg/ml | 0.29 | μg/ml |
| 23 | | | 1x | 1.43 μg/ml | 1.43 | μg/ml |
| 24 | | | 5x | 7.14 μg/ml | 7.14 | μg/ml |
| 25 | Vitamin K1 | Vitamin K1 (VK1) | 0.2x | 0.01 mg/ml | 0.01 | mg/ml |
| 26 | | | 1x | 0.04 mg/ml | 0.04 | mg/ml |
| 27 | | | 5x | 0.18 mg/ml | 0.18 | mg/ml |
| 28 | DHA | MEG-3 ® 0080 EE | 0.2x | 0.14 mg/ml | 0.11 | mg/ml |
| 29 | | Oil (0080 EE) | 1x | 0.71 mg/ml | 0.54 | mg/ml |
| 30 | | | 5x | 3.57 mg/ml | 2.68 | mg/ml |
| 31 | DHA + EPA | MEG-3 ® 4535 EE | 0.2x | 2.86 mg/ml | 1.22 + 0.90 | mg/ml |
| 32 | | Oil (4535 EE) | 1x | 14.29 mg/ml | 6.14 + 4.57 | mg/ml |
| 33 | | | 5x | 71.43 mg/ml | 30.71 + 22.85 | mg/ml |
| 34 | EPA | MEG-3 ® 8000 EE | 0.2x | 1.71 mg/ml | 1.29 | mg/ml |
| 35 | | Oil | 1x | 8.57 mg/ml | 6.43 | mg/ml |
| 36 | | (8000 EE) | 5x | 42.86 mg/ml | 32.14 | mg/ml |

[1] retinol equivalent
[2] alpha-tocopherol equivalent

In a second set of in vitro experiments, at the start of the short-term colonic incubations, the test ingredients were added to nutritional medium containing basal nutrients present in the colon (e.g. host-derived glycans such as mucin). Three doses were tested per product. The nutritional medium used for this particular project was again supplemented with NaCl, MgSO4, CaCl2, hemin and bile salts, and with carbon sources glucose, starch and cellobiose. A blank, containing the same nutritional medium as that used for the product incubations, but without product addition, was included for each donor. In doing so, an assessment can be made of the background activity of the bacterial community, which results from fermentation of compounds in the nutritional medium. As a source of the colonic microbiota a fecal inoculum of two healthy adults was added. Incubations were performed for 48 h at 37'C, under shaking (90 rpm) and anaerobic conditions and protected from light. The following compounds were tested:
  Thiamine Hydrochloride
  β-Carotene 10% CWS/S
  Niacinamide PC
  Calcium D-Pantothenate
  Pyridoxine Hydrochloride
  D-Biotin
  Vitamin B12 Crystalline.

Each compound was tested in three different concentrations; an overview is given in Table 2, below:

TABLE 2

Second Experimental results

| | Vitamin | DSM product | Dose designation | Final concentration of DSM product in the reactor (per ml) | Final concentration of vitamin added to reactor | |
|---|---|---|---|---|---|---|
| 1 | B-carotene | β-Carotene | 0.2x | 0.48 mg | 0.048 | mg/ml |
| 2 | | 10% CWS/S | 1x | 2.40 mg | 0.24 | mg/ml |
| 3 | | | 5x | 12.00 mg | 1.20 | mg/ml |
| 4 | B1 | Thiamine | 0.2 | 0.02 mg | 0.02 | mg/ml |
| 5 | | Hydrochloride | 1 | 0.11 mg | 0.11 | mg/ml |
| 6 | | | 5 | 0.56 mg | 0.56 | mg/ml |
| 7 | B3 | Niacinamide | 0.2 | 0.003 mg | 0.003 | mg/ml |
| 8 | | PC | 1 | 0.01 mg | 0.01 | mg/ml |
| 9 | | | 5 | 0.07 mg | 0.07 | mg/ml |
| 10 | B5 | Calcium D- | 0.2 | 0.45 mg | 0.45 | mg/ml |
| 11 | | Pantothenate | 1 | 2.25 mg | 2.25 | mg/ml |
| 12 | | | 5 | 11.25 mg | 11.25 | mg/ml |
| 13 | B6 | Pyridoxine | 0.2 | 0.01 mg | 0.01 | mg/ml |
| 14 | | Hydrochloride | 1 | 0.06 mg | 0.06 | mg/ml |
| 15 | | | 5 | 0.31 mg | 0.31 | mg/ml |

TABLE 2-continued

Second Experimental results

| | Vitamin | DSM product | Dose designation | Final concentration of DSM product in the reactor (per ml) | Final concentration of vitamin added to reactor | |
|---|---|---|---|---|---|---|
| 16 | B7 | D-Biotin | 0.2 | 5.00 mcg | 5.00 | mcg/ml |
| 17 | | | 1 | 25.00 mcg | 25.00 | mcg/ml |
| 18 | | | 5 | 125.00 mcg | 125.00 | mcg/ml |
| 19 | B12 | Vitamin B12 | 0.2 | 0.06 mcg | 0.06 | mcg/ml |
| 20 | | Crystalline | 1 | 0.30 mcg | 0.30 | mcg/ml |
| 21 | | | 5 | 1.50 mcg | 1.50 | mcg/ml |

Short Chain Fatty Acids

Short chain fatty acids (SCFA) are an assessment of the microbial carbohydrate metabolism (acetate, propionate and butyrate) or protein metabolism (branched SCFA) and can be compared to typical fermentation patterns for normal GI microbiota. Samples for SCFA analysis were analyzed after 0, 6, 24 and 48 h of incubation for both set of in vitro experiments, above.

SCFA were extracted from the samples with diethyl ether, after the addition of 2-methyl hexanoic acid as an internal standard. Extracts were analysed using a GC-2014 gas chromatograph (Shimadzu's-Hertogenbosch, the Netherlands), equipped with a capillary fatty acid-free EC-1000Econo-Cap column (dimensions: 25 mm×0.53 mm, film thickness 1.2 mM; Alltech, Laarne, Belgium), a flame ionization detector and a split injector. The injection volume was 1 mL and the temperature profile was set from 110 to 160° C., with a temperature increase of 6° C. min-1. The carrier gas was nitrogen and the temperature of the injector and detector were 100 and 220° C., respectively. The production of unbranched and branched SCFA was calculated by summing the molar concentrations of acetate, propionate, butyrate, valerate and caproate, and summing isobutyrate, isovalerate and isocaproate molar concentrations, respectively. The total SCFA production was defined as the sum of unbranched and branched SCFA.

Cell Culture

Co-cultures of Caco-2 and HT29-MTX-E12 cells were used to assess the protective effect of the supernatants before (0 h) and after fermentation (48 h) for both sets of in vitro experiments above.

CaCo-2 ECACC 86010202 and HT29-MTX-E12 ECACC 12040401 cells (both from European Collection of Cell Cultures, Salisbury, UK) were both cultured at 37° C., in atmosphere of 5% CO2 in DMEM medium supplemented with 4.5 g/L D-Glucose, 4 mM L-Glutamine, 1 mM Sodium Pyruvate, 1% MEM Non-Essential Amino Acids, 50 µg/mL Gentamicin (Life Technologies Europe B.V., Zug, Switzerland) and 10% heat-inactivated FBS (Sigma-Aldrich, Buchs, Switzerland). Sub-confluent cells were trypsinized using 0.25% Trypsin/EDTA (Life Technologies Europe B.V., Zug, Switzerland) and passaged at a ratio of 1:5-1:10 twice a week. Cells between passages 55 and 85 were used for this study.

Cells were seeded at a density of 20000 cells/well in a 7:3 ratio (Caco-2:HT29-MTX-E12) in Corning HTS Transwell-24 system PET membranes, 0.4 µM pore size, cell growth area 0.33 cm2/well (Corning BV, Amsterdam, Netherlands) and cultured as described above. Media was changed every second to third day.

Barrier Integrity Measurement in Healthy Gut Model

For both sets of in vitro experiments, after cells being 13 days in culture, initial transepithelial electrical resistance (TEER) readings were obtained using an EVOM2 Voltohm-meter (EVOM, World Precision Instruments, Berlin) equipped with STX100 Electrodes. TEER values correlate with the tightness of the confluent monolayer (Srinivasan et al. 2015).

The background TEER (insert) was subtracted from total TEER (cell monolayer plus insert) to yield the monolayer resistance and then normalized to surface area by multiplying with the area of the insert (Srinivasan et al. 2015). The integrity of the monolayer was determined at basal level by measuring TEER. A TEER of 300 Ωcm2 was regarded as a tight monolayer (see results section). Afterwards, the cells were treated with sterile filtered fermentation supernatants or fermentation medium as a control (diluted 1:20 in growth media). After 24 h incubation the resistance across each cell monolayer was measured again and the percentage change in TEER compared to initial TEER for each insert was calculated to represent a healthy gut model. All TEER measurements were done by placing the plates containing the inserts on a 37° C. warming plate and were performed in the same duration.

Barrier Integrity Measurement in Leaky Gut Model

For both sets of in vitro experiments, the integrity of cell monolayers after the stressor test was evaluated by both TEER values and by measuring the transport of Lucifer yellow from apical to basolateral compartments (Leaky gut model). A prewarmed HBSS transport buffer composed of Hank's Balanced Salt Solution pH 7.4 with Ca2+ and Mg2+, containing 5.5 mM D-(+)-glucose, Sodium Bicarbonate, and supplemented with 4 mM L-glutamine, 20 mM HEPES (Life Technologies Europe B.V., Zug, Switzerland) was used for all permeability experiments. The inserts were rinsed twice with HBSS using a reservoir tray, 100 µl HBSS were then added to the apical site of the inserts and subsequently moved to new wells with fresh HBSS and allowed to equilibrate at 37° C. for 60 min in the incubator followed by TEER measurement to obtain baseline resistance readings.

Lucifer Yellow CH dilithium salt (Sigma-Aldrich, Buchs, Switzerland) was dissolved in HBSS at a final concentration of 100 µg/ml. Basolateral stressor EtOH (Merck, KgaA, Darmstadt, Germany) was diluted to 5% in HBSS. Apical Stressor Rhamnolipids R90 (AGAE Technologies, Corvallis, USA) was dissolved in HBSS containing Lucifer Yellow at a final concentration of 350 µg/ml. All solutions were prepared freshly each time.

The HBSS transport buffer from the basolateral chamber was aspirated first, then the HBSS from the apical chamber and replaced with Lucifer yellow solution. For the apical stressor test, Lucifer yellow solution containing 350 µg/ml Rhamnolipids or Lucifer yellow solution without stressor for the control wells was loaded into the apical compartment, blank HBSS was subsequently added to the basolateral chamber. For the basolateral stressor test, Lucifer yellow solution was added to the apical side of all wells, and either 5% EtOH in HBSS or blank HBSS for the control wells was placed in the basolateral compartment.

After 3 h incubation at 37'C the permeability of the cell monolayer was evaluated by measuring TEER values. TEER data were expressed as the percentage of the initial values.

After TEER measurements, 100 µl aliquot samples were withdrawn from the basolateral sites in duplicates to quantify the amount of Lucifer yellow transported. The fluorescence level (excitation at 420 nm and emission at 530 nm) was measured in a 96-well fluorescent plate reader (Spectramax M5 Series Multi-Mode Microplate Reader, Molecular Devices, Sunnyvale, CA, USA).

Microbiome Composition Analysis by Shotgun Sequencing

For the first set of in vitro experiments, total DNA was extracted from all samples collected throughout the study using the QIAamp DNA stool minikit (Qiagen, Crawley, United Kingdom) according to the manufacturer's instructions, apart from addition of a bead-beating step and increasing the lysis temperature to 95° C. as described previously (McCormack et al., 2018).

After DNA isolation, DNA was quantified using the Qubit High Sensitivity DNA assay (Thermo Fisher). Whole metagenome libraries were then prepared using the Illumina Nextera XT kit (Illumina) in accordance with the manufacturer's instructions, with the following modifications: Firstly, tagmentation time was increased to 7 min and secondly, following incorporation of indices and Ampure purification of the products, the samples were each individually sized by running on an Agilent High Sensitivity Chip (Agilent) and quantified using the Qubit High Sensitivity DNA assay (Thermo Fisher) in accordance with Teagasc Sequencing Platform SOPs. The samples were then pooled equimolarly and sequenced on the Illumina NextSeq 500 with a NextSeq 500/550 v2 high-output reagent kit (300 cycles). All sequencing was done in the Teagasc sequencing facility in accordance with standard Illumina sequencing protocols.

Delivered raw FASTQ sequence files were quality checked as follows: poor quality and duplicate read removal, as well as trimming was implemented using a combination of SAM and Picard tools. Taxonomy was assigned to the reads using the Kraken software and functional analysis was performed with Super focus.

For the second set of in vitro experiments, two techniques were combined according to Vandeputte et al. (2017) to map the community shifts induced by the different treatments in large detail: 1) 16S-targeted Illumina sequencing, a PCR-based method by which microbial sequences are amplified until saturation, thus providing proportional abundances of different taxa at different phylogenetic levels (microbial phylum, family and OTU level). 2) accurate quantification of total bacterial cells in the samples through flow cytometry. Combining the high-resolution phylogenetic information of the 16S-targeted Illumina with accurate quantification of cell counts via flow cytometry resulted in quantitative enumeration of the different taxonomic entities inside the reactors.

HT29 Cell Culture and Quantification of Immunological Biomarkers

For both sets of in vitro experiments, HT29 cells were obtained from American Type Culture Collection (Manassas, VA). Cells were cultured in DMEM supplemented with 10% fetal bovine serum (FBS), 50 units/ml penicillin, 50 µg/ml streptomycin, L-glutamine, and nonessential amino acids (Life Technologies Europe B.V., Zug, Switzerland). Cells were seeded into 12-well plates at 8×105 cells per well and used after 2 days of preculture. They were starved in DMEM containing 0.25% FBS for 18 h before treatment. Cells were treated for 24 hours with TNF-α at 100 ng/mL or fermentation supernatants which were sterile filtered and diluted 1:20 in DMEM containing 0.25% FBS. All treatments were done in triplicate. Consequently, cytokines, chemokines and interleukins were quantified in HT29 supernatants using the Luminex Technology (LiquiChip Workstation IS 200, Qiagen, Hilden, Germany) with Bio-Plex Pro Human Cytokine Panel kits (Bio-Rad, Hercules, CA) or with Luminex Screening Assay kits (R&D Systems, Inc., Minneapolis, MN), following the manufacturer's instructions. The data were acquired with the Luminex IS 2.3 software and evaluated with the LiquiChip Analyser software (Qiagen, Hilden, Germany).

Gas Production

For both sets of in vitro experiments, colon incubations were performed in closed incubation systems as described above. This allowed to evaluate the accumulation of gasses in the headspace, which can be measured with a pressure meter. Gas production is a measure of microbial activity, and thus of the speed of fermentation of the potentially prebiotic substrates Results First Set of Experiments as Illustrated in FIGS. 1-15.

Regarding the acetate production after 48 h fermentation upon administration of vitamins and omega-3 fatty acids, following observations were made:
- Supplementation of Vitamin E at 1× and 5× dose increase acetate production
- Supplementation of Vitamin A at 1× dose increase acetate production
- Supplementation of Vitamin B2+C at 1× dose increase acetate production
- Supplementation of folic acid at 0.2×, 1× and 5× dose increase acetate production
- Supplementation of Vitamin K1 at 0.2×, 1× and 5× dose increase acetate production
- Supplementation of DHA at 0.2×, 1× and 5× dose increase acetate production
- Supplementation of DHA+EPA at 0.2× and 1× dose increase acetate production
- Supplementation of EPA at 0.2× and 1× dose increase acetate production compared to the corresponding control.

Regarding the propionate production after 48 h fermentation upon administration of vitamins and omega-3 fatty acids, following observations were made:
- Supplementation of Vitamin E at 1× dose increase propionate production
- Supplementation of Vitamin D at 1× and 5× dose increase propionate production
- Supplementation of Vitamin A at 0.2×, 1× and 5× dose increase propionate production
- Supplementation of Vitamin B2+C at 0.2× dose increase propionate production
- Supplementation of folic acid at 0.2×, 1× and 5× dose increase propionate production
- Supplementation of Vitamin K1 at 0.2×, 1× and 5× dose increase propionate production
- Supplementation of DHA at 0.2×, 1× and 5× dose increase propionate production
- Supplementation of DHA+EPA at 0.2×, 1× and 5× dose increase propionate production
- Supplementation of EPA at 0.2×, 1× and 5× dose increase propionate production compared to the corresponding control.

Regarding the butyrate production after 48 h fermentation upon administration of vitamins and omega-3 fatty acids, following observations were made:
- Supplementation of Vitamin B2 at 5× dose increase butyrate production
- Supplementation of Vitamin B2-5-phosphate at 5× dose increase butyrate production
- Supplementation of Vitamin D at 0.2× and 1× dose increase butyrate production
- Supplementation of Vitamin A at 0.2×, 1× and 5× dose increase butyrate production Supplementation of folic acid at 0.2×, 1× and 5× dose increase butyrate production Supplementation of Vitamin K1 at 0.2×, 1× and 5× dose increase butyrate production Supplementation of DHA at 0.2×, 1× and 5× dose increase butyrate production Supplementation of DHA+EPA at 0.2× and 1× dose increase butyrate production Supplementation of EPA at 0.2×, 1× and 5× dose increase butyrate production compared to the corresponding control.

Regarding the total SCFAs production after 48 h fermentation upon administration of vitamins and omega-3 fatty acids, following observations were made:

Supplementation of Vitamin E at 1× dose increase total SCFAs production

Supplementation of Vitamin D at 1× and 5× dose increase total SCFAs production

Supplementation of Vitamin A at 0.2× and 5× dose increase total SCFAs production Supplementation of folic acid at 0.2×, 1× and 5× dose increase total SCFAs production Supplementation of Vitamin K1 at 0.2×, 1× and 5× dose increase total SCFAs production Supplementation of DHA at 0.2×, 1× and 5× dose increase total SCFAs production Supplementation of DHA+EPA at 0.2× and 1× dose increase total SCFAs production Supplementation of EPA at 0.2× and 1× dose increase total SCFAs production compared to the corresponding control.

Regarding the TEER measurement of cells treated with 48 h fermentation samples after subtracting TEER of cells treated with 0 h fermentation samples in healthy gut cellular model (FIG. 6), the following observations were made:

Cells treated with samples from fermentation of Vitamin B2-5-Phosphate at 0.2× dose increase TEER Cells treated with samples from fermentation of Vitamin C at 1× dose increase TEER Cells treated with samples from fermentation of Vitamin E at 1× and 5× dose increase TEER Cells treated with samples from fermentation of DHA+EPA at 0.2×, 1× and 5× dose increase TEER Cells treated with samples from fermentation of EPA at 0.2×, 1× and 5× dose increase TEER compared to the corresponding control.

Regarding the TEER measurement of cells treated with 48 h fermentation samples after subtracting TEER of cells treated with 0 h fermentation samples in basolateral induction of leaky gut cellular model (FIG. 7), the following observations were made:

Cells treated with samples from fermentation of Vitamin B2 at 0.2× dose increase TEER Cells treated with samples from fermentation of Vitamin B2+Vitamin C at 0.2× dose increase TEER Cells treated with samples from fermentation of Vitamin E at 0.2× dose increase TEER Cells treated with samples from fermentation of DHA+EPA at 0.2× and 1× dose increase TEER Cells treated with samples from fermentation of EPA at 0.2× and 1× dose increase TEER compared to the corresponding control.

Regarding the Lucifer yellow measurement of cells treated with 48 h fermentation samples after subtracting TEER of cells treated with 48 h fermentation samples in basolateral induction of leaky gut cellular model (FIG. 7), the following observations were made:

Cells treated with samples from fermentation of Vitamin B2 at 0.2× dose decrease Lucifer yellow Cells treated with samples from fermentation of Vitamin B2+Vitamin C at 0.2× dose decrease Lucifer yellow Cells treated with samples from fermentation of Vitamin E at 0.2× dose decrease Lucifer yellow Cells treated with samples from fermentation of DHA+EPA at 0.2× dose decrease Lucifer yellow compared to the corresponding control.

Regarding the TEER measurement of cells treated with 48 h fermentation samples after subtracting TEER of cells treated with 0 h fermentation samples in apical induction of leaky gut cellular model (FIG. 8), the following observations were made:

Cells treated with samples from fermentation of Vitamin B2 at 0.2× dose increase TEER Cells treated with samples from fermentation of Vitamin B2-5-phosphate at 0.2× dose increase TEER Cells treated with samples from fermentation of Vitamin C at 0.2× and 1× dose increase TEER Cells treated with samples from fermentation of Vitamin B2+Vitamin C at 0.2× dose increase TEER Cells treated with samples from fermentation of Vitamin E at 0.2×, 1× and 5× dose increase TEER Cells treated with samples from fermentation of Vitamin D at 5× dose increase TEER Cells treated with samples from fermentation of Vitamin A at 0.2×, 1× and 5× dose increase TEER Cells treated with samples from fermentation of folic acid at 0.2× and 1× dose increase TEER Cells treated with samples from fermentation of DHA+EPA at 0.2× dose increase TEER Cells treated with samples from fermentation of EPA at 0.2×, 1× and 5× dose increase TEER compared to the corresponding control.

Regarding the Lucifer yellow measurement of cells treated with 48 h fermentation samples after subtracting TEER of cells treated with 48 h fermentation samples in apical induction of leaky gut cellular model (FIG. 8), the following observations were made:

Cells treated with samples from fermentation of Vitamin B2 at 0.2× dose decrease Lucifer yellow Cells treated with samples from fermentation of Vitamin B2-5-phosphate at 0.2× dose decrease Lucifer yellow Cells treated with samples from fermentation of Vitamin C at 0.2× and 1× dose decrease Lucifer yellow Cells treated with samples from fermentation of Vitamin B2+Vitamin C at 0.2× dose decrease Lucifer yellow Cells treated with samples from fermentation of Vitamin E at 1× and 5× dose decrease Lucifer yellow Cells treated with samples from fermentation of Vitamin A at 1× and 5× dose decrease Lucifer yellow Cells treated with samples from fermentation of Vitamin K1 at 0.2× dose decrease Lucifer yellow Cells treated with samples from fermentation of DHA+EPA at 0.2× dose decrease Lucifer yellow compared to the corresponding control.

Regarding the microbiome alpha diversity after 24 h fermentation upon administration of vitamins and omega-3 fatty acids, following observations were made:

Supplementation of Vitamin B2 at 1× and 5× dose increase microbiome diversity

Supplementation of Vitamin B2-5-phosphate at 0.2× and 1× dose increase microbiome diversity Supplementation of Vitamin C at 5× dose increase microbiome diversity Supplementation of Vitamin E at 0.2×, 1× and 5× dose increase microbiome diversity Supplementation of Vitamin D at 0.2× and 5× dose increase microbiome diversity Supplementation of Vitamin A at 1× and 5× dose increase microbiome diversity Supplementation of Vitamin B2+Vitamin C at 1× and 5× dose increase microbiome diversity Supplementation of folic acid at 0.2× and 1× dose increase microbiome diversity Supplementation of Vitamin K1 at 0.2×, 1× and 5× dose increase microbiome diversity Supplementation of DHA at 0.2×, 1× and 5× dose increase microbiome diversity Supplementation of DHA+EPA at 1× and 5× dose increase microbiome diversity Supplementation of EPA at 0.2×, 1× and 5× dose increase microbiome diversity compared to the corresponding control.

Regarding the *Bifidobacterium* relative abundance after 24 h fermentation upon administration of vitamins and omega-3 fatty acids, following observations were made:

Supplementation of Vitamin B2 at 1× and 5× dose increase *Bifidobacterium* relative abundance Supplementation of Vitamin B2-5-phosphate at 0.2× and 1× dose increase *Bifidobacterium* relative abundance Supplementation of Vitamin C at 1× dose increase *Bifidobacterium* relative abundance Supplementation of Vitamin E at 0.2×, 1× and 5× dose increase *Bifidobacterium* relative abundance Supplementation of Vitamin D at 0.2× and 5× dose increase *Bifidobacterium* relative abundance Supplementation of Vitamin A at 1× dose increase *Bifidobacterium* relative abundance Supplementation of Vitamin B2+Vitamin C at 1× and 5× dose increase *Bifidobacterium* relative abundance Supplementation of folic acid at 0.2× and 1× dose increase *Bifidobacterium* relative abundance Supplementation of Vitamin K1 at 0.2× dose increase *Bifidobacterium* relative abundance Supplementation of DHA at 0.2× and 5× dose increase *Bifidobacterium* relative abundance Supplementation of DHA+EPA at 5× dose increase *Bifidobacterium* relative abundance Supplementation of EPA at 0.2×, 1× and 5× dose increase *Bifidobacterium* relative abundance compared to the corresponding control.

Similar observations were made for other beneficial bacteria.

Regarding the relative abundance of genes involved in Acetyl-CoA fermentation to Butyrate pathway after 24 h fermentation upon administration of vitamins and omega-3 fatty acids, following observations were made:

Supplementation of Vitamin B2 at 1× and 5× dose increase relative abundance of genes involved in Acetyl-CoA fermentation to Butyrate pathway Supplementation of Vitamin B2-5-phosphate at 0.2× and 1× dose increase relative abundance of genes involved in Acetyl-CoA fermentation to Butyrate pathway Supplementation of Vitamin C at 5× dose increase relative abundance of genes involved in Acetyl-CoA fermentation to Butyrate pathway Supplementation of Vitamin E at 0.2× dose increase relative abundance of genes involved in Acetyl-CoA fermentation to Butyrate pathway Supplementation of Vitamin D at 0.2× dose increase relative abundance of genes involved in Acetyl-CoA fermentation to Butyrate pathway Supplementation of Vitamin A at 1× and 5× dose increase relative abundance of genes involved in Acetyl-CoA fermentation to Butyrate pathway Supplementation of Vitamin B2+Vitamin C at 5× dose increase relative abundance of genes involved in Acetyl-CoA fermentation to Butyrate pathway Supplementation of folic acid at 0.2× dose increase relative abundance of genes involved in Acetyl-CoA fermentation to Butyrate pathway Supplementation of Vitamin K1 at 0.2×, 1× and 5× dose increase relative abundance of genes involved in Acetyl-CoA fermentation to Butyrate pathway Supplementation of DHA at 0.2×, 1× and 5× dose increase relative abundance of genes involved in Acetyl-CoA fermentation to Butyrate pathway Supplementation of DHA+EPA at 0.2×, 1× and 5× dose increase relative abundance of genes involved in Acetyl-CoA fermentation to Butyrate pathway Supplementation of EPA at 0.2×, 1× and 5× dose increase relative abundance of genes involved in Acetyl-CoA fermentation to Butyrate pathway compared to the corresponding control.

Regarding the GROa-CXCL1 production by HT29 cells after treating with effluent from 24 h fermentation upon administration of vitamins and omega-3 fatty acids, following observations were made:

Supplementation of Vitamin B2 at 1× and 5× dose increase GROa-CXCL1 production

Supplementation of Vitamin E at 5× dose increase GROa-CXCL1 production

Supplementation of Vitamin B2+Vitamin C at 1× dose GROa-CXCL1 production

Supplementation of DHA at 0.2×, 1× and 5× dose increase GROa-CXCL1 production

Supplementation of DHA+EPA at 0.2×, 1× and 5× dose increase GROa-CXCL1 production Supplementation of EPA at 1× and 5× dose increase GROa-CXCL1 production compared to the corresponding control.

Regarding the IL-8 production by HT29 cells after treating with effluent from 24 h fermentation upon administration of vitamins and omega-3 fatty acids, following observations were made:

Supplementation of Vitamin B2 at 1× and 5× dose increase IL-8 production

Supplementation of Vitamin B2-5-phosphate at 5× dose increase IL-8 production

Supplementation of Vitamin E at 0.2×, 1× and 5× dose increase IL-8 production

Supplementation of Vitamin A at 0.2× and 5× dose increase IL-8 production

Supplementation of Vitamin B2+Vitamin C at 1× dose IL-8 production

Supplementation of folic acid at 0.2× and 5× dose increase IL-8 production

Supplementation of Vitamin K1 at 0.2× dose increase IL-8 production

Supplementation of DHA at 0.2×, 1× and 5× dose increase IL-8 production

Supplementation of DHA+EPA at 0.2×, 1× and 5× dose increase IL-8 production

Supplementation of EPA at 0.2×, 1× and 5× dose increase IL-8 production compared to the corresponding control.

Regarding the MIP3A-CCL20 production by HT29 cells after treating with effluent from 24 h fermentation upon administration of vitamins and omega-3 fatty acids, following observations were made:
  Supplementation of Vitamin E at 0.2×, 1× and 5× dose increase MIP3A-CCL20 production
  Supplementation of Vitamin D at 0.2×, 1× and 5× dose increase MIP3A-CCL20 production
  Supplementation of Vitamin A at 0.2×, 1× and 5× dose increase MIP3A-CCL20 production
  Supplementation of Vitamin K1 at 0.2×, 1× and 5× dose increase MIP3A-CCL20 production
  Supplementation of DHA at 0.2×, 1× and 5× dose increase MIP3A-CCL20 production
  Supplementation of DHA+EPA at 0.2×, 1× and 5× dose increase MIP3A-CCL20 production
  Supplementation of EPA at 0.2×, 1× and 5× dose increase MIP3A-CCL20 production
compared to the corresponding control.

Regarding gas production after 48 h fermentation upon administration of vitamins and omega-3 fatty acids, following observations were made:
  Supplementation of Vitamin C at 1× and 5× dose reduced gas production
  Supplementation of Vitamin E at 1× and 5× dose reduced gas production
  Supplementation of Vitamin C and B2 at 1× and 5× dose reduced gas production
compared to the corresponding control.

Second Set of In Vitro Experiments as Illustrated in FIGS. 16-19:

Regarding the acetate production after 48 h fermentation upon administration of vitamins and β-carotene, the following observation was made:
  Supplementation of β-carotene at 1× and 5× dose increase acetate production in both donors compared to the corresponding control.

Regarding the propionate production after 48 h fermentation upon administration of vitamins, the following observations were made:
  Supplementation of β-carotene at 1× and 5× dose increase propionate production in one of the two donors (donor C)
  Supplementation of vitamin B5 at 0.2× increase propionate production in one of the two donors (donor C) compared to the corresponding control.

Regarding the butyrate production after 48 h fermentation upon administration of vitamins, the following observations were made:
  Supplementation of β-carotene at 1× dose increase butyrate production in both donors
  Supplementation of β-carotene at 0.2× dose increase butyrate production in one of the two donors (donor C compared to the corresponding control.

Regarding the total SCFAs production after 48 h fermentation upon administration of vitamins and β-carotene, the following observations were made:
  Supplementation of β-carotene at 1× and 5× dose increase total SCFA production for both donors compared to the corresponding control.
  Supplementation of vitamin B5 at 5× dose decrease branched SCFA production for both donors compared to the corresponding control.

Regarding the Bifidobacteriaceae relative abundance after 24 h fermentation upon administration of vitamins, the following observations were made:
  Supplementation of β-carotene at 1× and 5× dose increase Bifidobacteriaceae relative abundance for both donors
  Supplementation of vitamin B5 at 5× dose increase Bifidobacteriaceae relative abundance for both donors
  Supplementation of biotin at 0.2×, 1× and 5× dose increase Bifidobacteriaceae relative abundance for one of the two donors (donor D)
  Supplementation of pyridoxine at 1× and 5× dose increase Bifidobacteriaceae relative abundance for one of the two donors (donor D)
compared to the corresponding control.

Regarding the Eggerthellaceae relative abundance after 24 h fermentation upon administration of vitamins, following observation was made:
  Supplementation of β-carotene at 5× dose increase Eggerthellaceae relative abundance for both donors compared to the corresponding control.

Regarding the Desulfovibrionaceae relative abundance after 24 h fermentation upon administration of vitamins, following observations were made:
  Supplementation of β-carotene at 5× dose decrease Desulfovibrionaceae relative abundance for both donors
  Supplementation of vitamin B5 at 5× dose decrease Desulfovibrionaceae relative abundance for one of the two donors (donor C)
compared to the corresponding control.

Regarding the Akkermansiaceae relative abundance after 24 h fermentation upon administration of vitamins, following observation was made:
  Supplementation of β-carotene at 5× dose increase Akkermansiaceae relative abundance for both donors
  Supplementation of thiamine at 1× dose increase Akkermansiaceae relative abundance for one of the two donors (donor C)
  Supplementation of niacinamide at 0.2× dose increase Akkermansiaceae relative abundance for one of the two donors (donor C)
  Supplementation of vitamin B5 at 0.2× dose increase Akkermansiaceae relative abundance for one of the two donors (donor D)
  Supplementation of pyridoxine at 0.2×, 1×, and 5× dose increase Akkermansiaceae relative abundance for one of the two donors (donor D)
  Supplementation of biotin at 0.2× dose increase Akkermansiaceae relative abundance for one of the two donors (donor D)
  Supplementation of vitamin B12 at 0.2× and 1× dose increase Akkermansiaceae relative abundance for one of the two donors (donor D)
compared to the corresponding control.

Regarding the Prevotellaceae relative abundance after 24 h fermentation upon administration of vitamins, following observations were made:
  Supplementation of β-carotene at 1× dose increase Prevotellaceae relative abundance for one of the two donors (donor C)
  Supplementation of pyridoxine at 5× dose increase Prevotellaceae relative abundance for one of the two donors (donor C)
compared to the corresponding control.

Regarding the Clostridiaceae relative abundance after 24 h fermentation upon administration of vitamins, following observation was made:
  Supplementation of β-carotene at 1× dose increase Clostridiaceae relative abundance for one of the two donors (donor C) compared to the corresponding control.

Regarding the Erysipelotrichaceae relative abundance after 24 h fermentation upon administration of vitamins, following observations were made:
  Supplementation of thiamine at 5× dose increase Erysipelotrichaceae relative abundance for one of the two donors (donor C)
  Supplementation of niacinamide at 1× and 5× dose increase Erysipelotrichaceae relative abundance for one of the two donors (donor C)
  Supplementation of pyridoxine at 1× dose increase Erysipelotrichaceae relative abundance for one of the two donors (donor C)
  Supplementation of biotin at 0.2× and 1× dose increase Erysipelotrichaceae relative abundance for one of the two donors (donor C)
  Supplementation of vitamin B12 at 1× and 5× dose increase Erysipelotrichaceae relative abundance for one of the two donors (donor C)
  Supplementation of vitamin B5 at 1× dose increase Erysipelotrichaceae relative abundance for one of the two donors (donor D)
compared to the corresponding control.

Regarding the Coriobacteriaceae relative abundance after 24 h fermentation upon administration of vitamins, following observation was made:
  Supplementation of β-carotene at 1× and 5× dose increase Coriobacteriaceae relative abundance for one of the two donors (donor D) compared to the corresponding control.

Regarding the Barnesiellaceae relative abundance after 24 h fermentation upon administration of vitamins, following observations were made:
  Supplementation of β-carotene at 5× dose increase Barnesiellaceae relative abundance for one of the two donors (donor D)
  Supplementation of biotin at 1× dose increase Barnesiellaceae relative abundance for one of the two donors (donor D)
compared to the corresponding control.

Regarding the *Faecalibacterium prausnitzii* relative abundance after 24 h fermentation upon administration of vitamins, following observations were made:
  Supplementation of β-carotene at 1× and 5× dose increase *Faecalibacterium prausnitzii* relative abundance for one of the two donors (donor D)
  Supplementation of vitamin B5 at 0.2×, 1× and 5× dose increase *Faecalibacterium prausnitzii* relative abundance for one of the two donors (donor D)
  Supplementation of pyridoxine at 0.2×, 1× and 5× dose increase *Faecalibacterium prausnitzii* relative abundance for one of the two donors (donor D)
  Supplementation of biotin at 0.2×, 1× and 5× dose increase *Faecalibacterium prausnitzii* relative abundance for one of the two donors (donor D)
  Supplementation of vitamin B12 at 0.2×, 1× and 5× dose increase *Faecalibacterium prausnitzii* relative abundance for one of the two donors (donor D)
compared to the corresponding control.

Regarding the Veillonellaceae relative abundance after 24 h fermentation upon administration of vitamins, following observations were made:
  Supplementation of β-carotene at 1× and 5× dose increase Veillonellaceae relative abundance for one of the two donors (donor D)
  Supplementation of vitamin B5 at 0.2× dose increase Veillonellaceae relative abundance for one of the two donors (donor D)
  Supplementation of pyridoxine at 5× dose increase Veillonellaceae relative abundance for one of the two donors (donor D)
compared to the corresponding control.

Regarding microbiome diversity, the following observations were made: Supplementation of β-carotene at 1× and 5× dose increases beta-diversity in both donors.
  Supplementation of β-carotene at 0.2× dose increases beta-diversity in one of the two donors (donor D).
  Supplementation of vitamin B5 at 5× dose 5× dose increases beta-diversity in both donors.
  Supplementation of β-carotene at 0.2× and 1× dose increases beta-diversity in one of the two donors (donor D).
  Supplementation of vitamin B6 at 0.2×, 1× and 5× dose increases beta-diversity in one of the two donors (donor D).
  Supplementation of vitamin B12 at 0.2×, 1× and 5× dose increases beta-diversity in one of the two donors (donor D).
  Supplementation of vitamin B7 at 1× dose increases beta-diversity in both donors.
  Supplementation of vitamin B7 at 5× dose increases beta-diversity in one of the two donors (donor D)
  Supplementation of vitamin B1 at 1× dose increases beta-diversity in one of the donor two donors (Donor C). Supplementation of vitamin B1 at 5× dose increases beta-diversity in one of the two donors (donor D)
  Supplementation of vitamin B3 at 0.2× and 5× dose increases beta-diversity in one of the donor two donors (Donor D).
  Supplementation of vitamin B1 at 1× dose increases beta-diversity in one of the two donors (donor C) compared to the corresponding control.
  Supplementation of vitamin B5 at 0.2× and 5× dose increases alpha-diversity in one of the two donors (donor D)
  Supplementation of vitamin B6 at 5× dose increases alpha-diversity in one of the two donors (donor D)
  Supplementation of vitamin B12 at 0.2× and 1× dose increases alpha-diversity in one of the two donors (donor D)
  Supplementation of vitamin B7 at 0.2× dose increases alpha-diversity in both donors.
  Supplementation of vitamin B7 at 5× dose increases alpha-diversity in one of the two donors (Donor D).
  Supplementation of vitamin B1 at 0.2× and 1× dose increases alpha-diversity in one of the two donors (Donor C).
  Supplementation of vitamin B3 at 1× dose increases alpha-diversity in one of the two donors (Donor C).

Example 2

Formulations for Use in Humans

The following formulations, each containing a single active ingredient, were prepared and filled into enteric-coated hard gelatin capsules (Capsugel) that were coated with Eudragit® S 100 polymer.

TABLE 3

Formulations for human use.

| Micronutrient | Product Form | Powder or oil per capsule | Vitamin per capsule |
| --- | --- | --- | --- |
| Vitamin B2 | Riboflavin TG | 75 mg | 75 mg |
| Vitamin C | Ascorbic Acid Fine Granular | 500 mg | 500 mg |
| Vitamin B2 + C | Riboflavin TG | 75 mg | 75 mg |
| | Ascorbic Acid Fine Granular | 500 mg/d | 500 mg |

TABLE 3-continued

Formulations for human use.

| Micronutrient | Product Form | Powder or oil per capsule | Vitamin per capsule |
|---|---|---|---|
| Vitamin A | Dry Vitamin A Palmitate 250 S/N-B | 3.3 mg | 0.25 mg RE[1] |
| Vitamin D | Dry Vitamin D3 100 SD/S | 24 mg | 0.06 mg |
| Vitamin K | Vitamin K1 (VK1) | 110 µg | 110 µg |
| Folic Acid | Folic acid (FA) | 400 µg | 400 µg |
| DHA | MEG-3 ® 0080 EE Oil (0080 EE) | 133 mg | 100 mg |
| DHA + EPA | MEG-3 ® 4535 EE Oil (4535 EE) | 133 mg | 100 mg |
| EPA | MEG-3 ® 8000 EE Oil (8000 EE) | 133 mg | 100 mg |
| Vitamin E | Dry Vitamin E 50% CWS/S | 298 mg | 100 mg a-TE[2] |

[1]retinol equivalent
[2]tocopherol equivalent

The formulations are suitable to be administered once daily, preferably for at least 28 consecutive days.

Example 3

Poultry Model

Three groups of 120 chickens each (all females), characterized by the same genetic, were housed in three separate rooms characterized by the same environmental conditions and fed with three different diets: (A) control diet (5 mg/kg riboflavin); (B) control diet+50 mg/kg vitamin riboflavin; (C) control diet+100 mg/kg vitamin riboflavin.

Each group was sampled three times (i.e., S1=14 days, S2=28 days, S3=38/42 days) in specific days corresponding to when the feed will be changed along the feeding program.

A 42 days broiler (end of the trial) weights 2.6 kg and eats around 205 g/head day of feed. Therefore the 3 tested dosages correspond to an intake of riboflavin of 0.38; 3.82 and 7.65 mg/kg body weight respectively at 5; 50 and 100 mg/kg feed and the intake per kg body weight is much higher at lower weights. The table 4 below illustrates the theoretical growth of the broiler and the amount of riboflavin to be added.

TABLE 4

Theoretical growth

| Age (days) | Weight (g) | Feed Intake (g/head day) | Cum. Feed Int. (g) | Riboflavin (mg/kg feed) | | |
|---|---|---|---|---|---|---|
| | | | | 5 | 50 | 100 |
| 0 | 42 | | | | | |
| 7 | 180 | 30 | 150 | 0.83 | 8.33 | 16.67 |
| 14 | 450 | 65 | 495 | 0.72 | 7.22 | 14.44 |
| 21 | 875 | 100 | 1090 | 0.57 | 5.71 | 11.43 |
| 28 | 1420 | 140 | 1970 | 0.49 | 4.93 | 9.86 |
| 35 | 2035 | 180 | 3107 | 0.44 | 4.42 | 8.85 |
| 42 | 2680 | 205 | 4460 | 0.38 | 3.82 | 7.65 |
| Age at end of trial | | | | | | |
| 49 | 3310 | 225 | 5976 | 0.34 | 3.40 | 6.80 |

During each sampling (i.e., S1, S2 and S3) a total of 40 birds/group were humanely euthanized and 9 litter samples will be collected (i.e., 3 samples/group).

Cecal Samples Microbiota Analysis

A total of 741 cecal samples have been analyzed by the Unit of Microbial Ecology of Health, including 120 samples from the first time point, 119 from the second time point (1 chicken from group C missing) and 118 from the third time point (1 chicken from group B and 1 from group C missing) and 118 from the third time point (1 chicken from group B and 1 from group C missing).

Materials and Methods

DNA extraction from cecal samples: The commercial kit DNeasy PowerSoil kit (Qiagen, Hilden, Germany) has been chosen and applied to all available cecal samples following the manufacturer instructions. DNA yield was measured using a Nanodrop instrument.

16S rRNA gene PCR amplification and sequencing. The V3-V4 hypervariable region of the 16S rRNA gene was PCR-amplified using 341F and 785R primers with Illumina overhang adaptors sequences. Amplicons purification was performed by using AMPure XP Beads magnetic beads (Beckman Coulter, Brea, CA). For the indexed library preparation, the Nextera XT DNA Library Prep Kit (Illumina, San Diego, CA) was used. A further magnetic beads purification step was performed and libraries quantified using the Qubit 3.0 fluorimeter (Invitrogen), then pooled at 4 nM. The library pool was denatured with NaOH 0.2 N and diluted to 6 µM. Sequencing was performed on Illumina MiSeq platform using a 2×250 bp paired end protocol, according to the manufacturer's instructions (Illumina).

Bioinformatics and statistics. Raw sequences were processed using a pipeline combining PANDAseq (Masella et al, 2012) and QIIME2 (Caporaso et al, 201 O; qiime2.org). After chimera sequences removal, high-quality reads were filtered and binned into high-resolution operational taxonomic units (OTUs) according to the taxonomic threshold of 99% through an open-reference strategy performed with dada2 (Callahan et al, 2016). Taxonomy was assigned using the vsearch classifier (Rognes et al, 2016) and SILVA database as reference (Quast et al, 2013). Alpha diversity was measured using Faith PD index and number of observed OTUs. Statistics was performed using R Studio software version 1.0.136 running on R software 3.1.3 (r-project.org/), implemented with the libraries vegan, made4, PMCMR. Beta diversity was estimated by computing weighted UniFrac distances and visualized by Principal Coordinates Analyses (PCoAs). The significance of separation among groups of samples was tested by permutational multivariate analysis of variance using the function adonis of the vegan package. Bacterial phylogenetic groups (genus, family, phylum) showing a minimum relative abundance of 0.5% in at least the 1% of the samples were kept for further analysis and graphical visualization. Compositional differences among group of samples were tested using Kruskal-Wallis test. P values were corrected for multiple comparisons using the Benjamini-Hochberg method.

Results

The 16S rRNA amplicons obtained from the 741 DNA samples were sequenced, resulting in 4,986,865 high quality sequences, ranging between 1,099 and 15,182, with an average value of 6,490±2715 sequences per sample. Reads were clustered into 20,950 operational taxonomic units (OTUs) based on 99% similarity.

At a first, beta diversity analysis on all available samples (FIG. 20) of group B chicken show a different longitudinal trajectory in terms of microbiota structure in the cecum with respect to groups A and C.

This trend is particularly evident when Weighted UniFrac distances are used to plot the whole sample set (FIG. 20A), whereas the PCoA obtained using Unweighted UniFrac distances shows more overlap among the different groups (FIG. 20B). This indicates that differences in the microbiota of broilers in group B most probably resides in the most abundant bacterial species, instead of subdominant ones.

Figure 21:
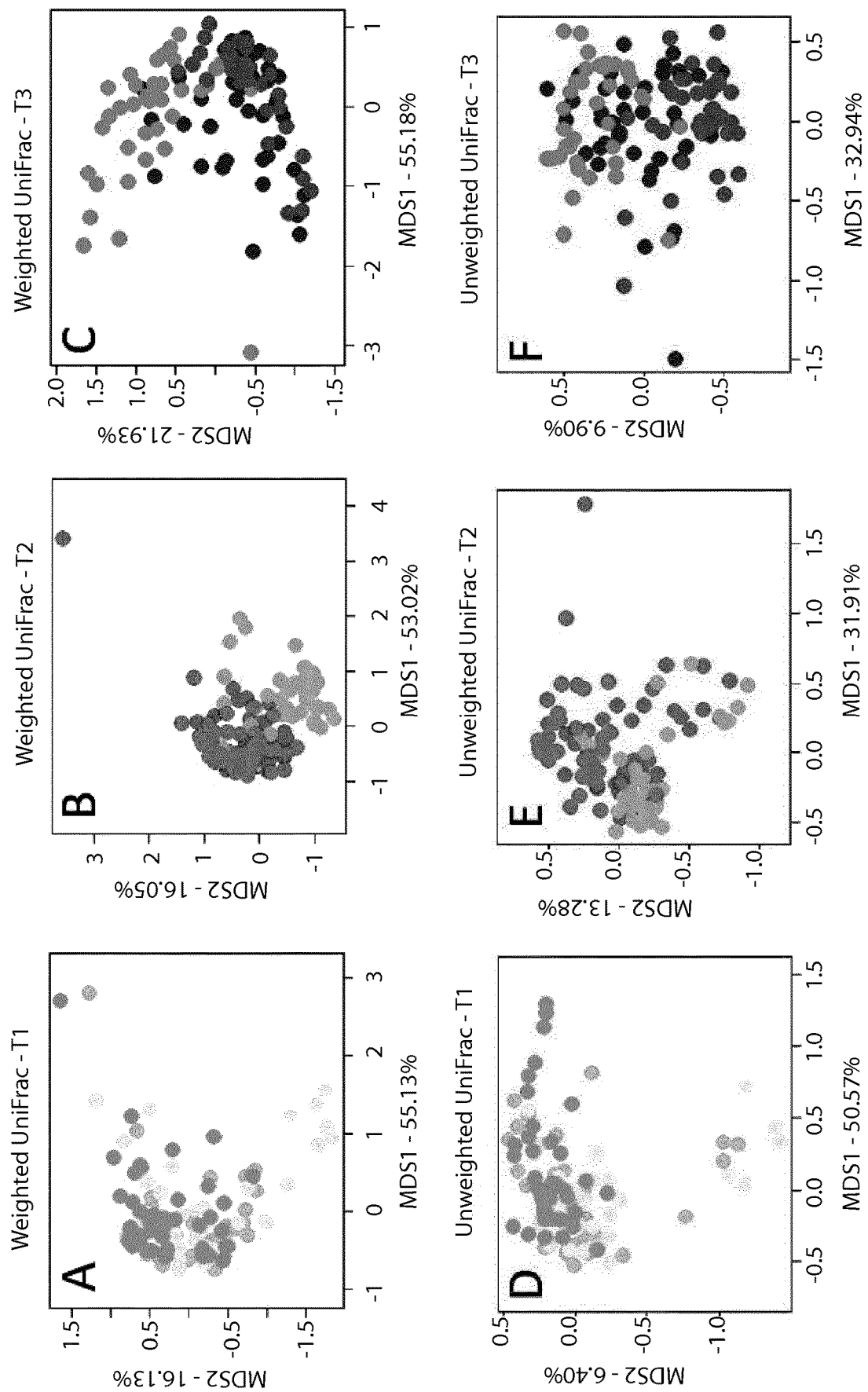

The same analysis was performed using samples from time points T1, T2 and T3 separately (FIG. 21). At T1 samples from groups A, B and C are mostly overlapped (FIGS. 21A and 121D), whereas group B samples starts to cluster separately from the other at T2 and T3, particularly when Weighted UniFrac metric is used (FIGS. 21B and 21C).

Conversely, in terms of biodiversity (alpha diversity, FIG. 18), the nutritional regime administered to chickens in group C induces a significant increase in species richness, calculated by means of "observed OTUs" metric, in time points T2 and T3 ($P<0.0001$) (FIGS. 22E and 22F).

Visualization of average microbiota profiles highlighted that compositional differences among the three experimental groups are appreciable at phylum level (FIG. 23). In group B, the relative abundance of phylum Bacteroidetes (in blue in FIG. 23) is noticeably increases at T2, whereas in group A increase of Bacteroidetes abundance happens only at T3. The diet administered to group C seems to partly inhibit this increase. From the compositional analysis at family level (FIG. 24) emerged that only diet administered to group B promotes the progressive increase of Bacteroidaceae family (in dark blue in FIG. 24), whereas in groups A and C the Bacteroidetes phylum is mostly composed by bacteria belonging to the Rikenellaceae family (in light blue in FIG. 24) in average. This observation was statistically confirmed both at family (FIG. 25) and genus levels (FIG. 25). The family Bacteroidaceae and the genus *Bacteroides* show significantly higher abundances in group B at all available time points. On the contrary, the family Rikenellaceae and its genus Alistipes show higher abundances in groups A and C, but only at T3.

Differently, the average family level profiles obtained for broilers in group C show a progressive increase (from T1 to T3) in the abundance of Bifidobacteriaceae (in yellow in FIG. 24), which is not visible in groups A and B (FIG. 24). The significance of this differences was confirmed at both family (FIG. 25) and genus levels (genus *Bifidobacterium*, FIG. 26), at T2 and T3. At family level, it was also highlighted that the increase in Bifidobacteriaceae goes to the detriment of Coriobacteriaceae, another family belonging to the Actinobacteria phylum (FIG. 25).

Most interestingly, the genus level analysis showed that both dietary regimes administered to groups B and C seems to accelerate the increase in *Faecalibacterium* relative abundance, which is significantly higher in group B and C with respect to the control group A at T1 (FIG. 26). At the following time points the relative abundance of *Faecalibacterium* in the three groups is not significantly different. This longitudinal trend reflects the one observed for the family Ruminococcaceae (FIG. 25), to which the genus *Faecalibacterium* belongs. At time point T2, another genus belonging to the Ruminococcaceae family, the [*Eubacterium*] coprostanoligenes group, shows higher abundance in groups B and C, with respect to the control group A (FIG. 26).

Description of Ileum Microbiota in the Three Groups of Broilers (a, B, C Groups), Along the Productive Cycle (Time Points T1, T2 and T3).

At a first observation, beta diversity analysis on all available ileal samples (FIG. 27) showed that samples taken from the three different groups of chicken (A, B, and C) do not follow distinct longitudinal trajectories in terms of microbiota structure, differently from what observed in the case of cecum microbiota. Indeed, samples from the three groups overlap both in the cases of Weighted and Unweighted Unifrac metric used for sample distances calculation (FIGS. 27A and B).

The 16S rRNA amplicons obtained from the 741 DNA samples were sequenced, resulting in 4,986,865 high quality sequences, ranging between 1,099 and 15,182, with an average value of $6,490\pm2715$ sequences per sample. Reads were clustered into 20,950 operational taxonomic units (OTUs) based on 99% similarity.

This was confirmed by plotting on separate PCoA the samples taken at the different time points (FIG. 28).

In terms of biodiversity (alpha diversity, FIG. 29), the nutritional regime administered to chickens in group B and C induces a significant decrease in diversity of the ileal ecosystem (calculated as Faith's PD index) with respect to group A at the first time point (T1, $P<0.001$, FIG. 29A). Conversely, the same diets (groups B and C) induces an increase in terms of species richness, calculated by means of "observed OTUs" metric, in time point T2 and T3 (significant for time point T2 only, $P<0.0001$) (FIGS. 29E and 29F).

Visualization of average microbiota profiles highlighted that at phylum level the ileum microbiota mirror what was reported for the cecum, with a large majority of bacteria belonging to the Firmicutes phylum (in green in FIG. 30). However, at lower phylogenetic level (family), the peculiarities of the ileum microbiota are evident, with Lactobacillaceae (a family belonging to the Firmicutes phylum) largely dominant in all available time points (in lavender color in FIG. 31).

The longitudinal analysis highlighted a progressive decrease of Enterobacteriaceae (in red in FIG. 31) from T1 to T3, regardless of the nutritional regime (groups A, B and C). Furthermore, it is possible to notice a progressive decrease in Clostridiaceae from T1 to T3 (in dark green in FIG. 31) in favor of Peptostreptococcaceae (light green in FIG. 31). This is particularly evident at T3 in samples taken from group A and C group chickens, as confirmed by Kruskall-Wallis test ($P<0.0001$, FIG. 32). Peptostreptococcaceae is a bacterial taxon with unknown function in the gut of broiler. Studies focused on cecum microbiome of chickens highlighted variations in abundance of this taxa in response to variation in diet, supplements and antibiotic treatments (Munyaka et al, 2016; Costa et al, 2017; Zeits et al, 2019), whereas studies on ileal microbiome are still too sparse, making it difficult to hypothesize a possible functional role for Peptostreptococcaceae variations.

Description of Litter Microbiota in the Three Groups of Broilers (a, B, C Groups), Along the Productive Cycle (Time Points T1, T2 and T3).

At a first observation, beta diversity analysis on all available litter samples (FIG. 33) showed that samples taken from the boxes with chicken in group C cluster separately from the other samples, in terms of microbiota structure, when Unweighted Unifrac metric was used to calculate the distances among samples (*Adonis* test, Visualization of average microbiota profiles highlighted that at phylum level the ileum microbiota mirror what was reported for the cecum, with a large majority of bacteria belonging to the Firmicutes phylum (in green in FIG. 30). However, at lower phylogenetic level (family), the peculiarities of the ileum microbiota are evident, with Lactobacillaceae (a family belonging to the Firmicutes phylum) largely dominant in all available time points (in lavender color in FIG. 31).

The longitudinal analysis highlighted a progressive decrease of Enterobacteriaceae (in red in FIG. 31) from T1 to T3, regardless of the nutritional regime (groups A, B and C). Furthermore, it is possible to notice a progressive decrease in Clostridiaceae from T1 to T3 (in dark green in FIG. 31) in favor of Peptostreptococcaceae (light green in FIG. 31). This is particularly evident at T3 in samples taken from group A and C group chickens, as confirmed by Kruskall-Wallis test (P<0.0001, FIG. 32). Peptostreptococcaceae is a bacterial taxon with unknown function in the gut of broiler. Studies focused on cecum microbiome of chickens highlighted variations in abundance of this taxa in response to variation in diet, supplements and antibiotic treatments (Munyaka et al, 2016; Costa et al, 2017; Zeits et al, 2019), whereas studies on ileal microbiome are still too sparse, making it difficult to hypothesize a possible functional role for Peptostreptococcaceae variations.

Description of Litter Microbiota in the Three Groups of Broilers (a, B, C Groups), Along the Productive Cycle (Time Points T1, T2 and T3).

At a first observation, beta diversity analysis on all available litter samples (FIG. 33) showed that samples taken from the boxes with chicken in group C cluster separately from the other samples, in terms of microbiota structure, when Unweighted Unifrac metric was used to calculate the distances among samples (*Adonis* test, Visualization of average microbiota profiles highlighted that at phylum level the ileum microbiota mirror what was reported for the cecum, with a large majority of bacteria belonging to the Firmicutes phylum (in green in FIG. 30). However, at lower phylogenetic level (family), the peculiarities of the ileum microbiota are evident, with Lactobacillaceae (a family belonging to the Firmicutes phylum) largely dominant in all available time points (in lavender color in FIG. 31; P=0.006, FIG. 33B).

This was not confirmed by the analysis based on Weighted Unifrac distances (FIG. 33A), indicating that the difference between group C litter microbiota and the other litters might reside in subdominant bacterial taxa. Also, the separation between group C litters and the other litters samples in PCoA based on Unweighted Unifrac distances (FIG. 33B) was located along the second ordination axis (MDS2), which contribute to explain only the 9.4% of the total variability in the dataset.

Visualization of average microbiota profiles (FIGS. 34 and 35) highlighted the absence of a single largely dominant taxa, both at phylum and family level. However, no significant differences in bacterial composition (at family or genus level) and species richness/diversity (data not shown) of the litter microbiome were highlighted in the analyzed dataset.

Metabolomic Analysis
Samples Analyzed

A total of 63 samples have been provided to the Bio-NMR Group of Department of Agricultural and Food Science and Interdepartmental Centre for Industrial Agri-Food Research (CIRI) of University of Bologna, Italy, including 21 cecal samples, collected from the first time point, 21 from the second time point and 21 from the third time were available.

Samples Preparation

Preliminary analysis were performed on 63 samples subdivided as follows: control samples (A) fed with 10 mg/kg of Vit. B2, treated samples (B) fed with 50 mg/kg of Vit. B2, treated samples (C) fed with 100 mg/kg of Vit. B2. Samples were prepared for nuclear magnetic resonance (NMR) analysis by vortex mixing for 5 minutes stool with 1 mL of deionized water, followed by centrifugation for 10 minutes at 14,000 rpm and 4° C. About 540 mL of supernatant was added to 100 μL of a $D_2O$ 1.5 M phosphate buffer solution containing 0.1% TSP (3-(trimethylsilyl)propionic acid-d4), $NaN_3$ 2 mM, set at pH 7.40. Before analysis, samples were centrifuged for 10 minutes again and then 590 uL transferred into an NMR tube.

NMR Spectra Acquisition.

Proton NMR ($^1$H-NMR) spectra were recorded at 298 K with an AVANCE III spectrometer (Bruker, Milan, Italy) operating at a frequency of 600.13 MHz. The Hydrogen Deuterium Oxide (HOD) residual signal was suppressed by presaturation, whereas broad signals from slowly tumbling molecules were removed by including a Carr-Purcell-Meiboom-Gill filter27 to a free induction decay sequence. The filter was made up by a train of 400 echoes separated by 800 μs, for a total time of 328 ms. Each spectrum was acquired by summing up 256 transients using 32 K data points over a 7211.54-Hz spectrum (for an acquisition time of 2.27 seconds). The recycle delay was set to 8 seconds, keeping into consideration the longitudinal relaxation time of the protons under investigation. Each spectrum was processed with Top Spin 3.0 (Bruker) by using an automatic command apk0.noe, which performs in one shot the baseline and phase correction and by applying a line-broadening factor of 1 Hz. The peaks were assigned by comparing their chemical shift and multiplicity with the literature and by using Chenomx NMR suit 8.1 software.

$^1$H-NMR Spectra Pre-Processing.

After Fourier Transformation, phase and baseline correction, spectra were calibrated with reference to the chemical shift of 0.00 ppm assigned to the internal standard TSP; spectral peripheral regions together with the water signal was removed. After this, spectra were normalized employing the probabilistic quotient algorithm (PQN) on two different regions separately (Regional Scaling) since this worked best for this type of samples. After normalization and prior to any possible statistical analysis, spectra were binned into intervals of 100 data-points of 0.0183 ppm each. As a result, the new spectral profile consisted of 410 binned data which it has been saved as a matrix in a text file and imported both in R and Python space for Multivariate Statistical Analysis (MvSA).

Statistical Analysis

MvSA has been applied to the binned dataset matrix. Specifically, Principal Component Analysis (PCA) and Partial Least Square Discriminant Analysis (PLS-DA) have been adopted. PCA is used to explore one single type of 'omics data and identify the largest sources of variation, whilst the multilevel approach aims at highlighting the treatment effects (in this case Samples belonging to group B and C treated with 50 and 100 mg/kg of Vit B2 respectively) within-subject separately from the biological variation between biological samples.

Results
The NMR Spectrum

FIG. 36 reports the $^1$H-NMR spectrum of samples named C281 at pH 7.13.

Several metabolites have been assigned by comparing their chemical shift and multiplicity with the literature and by using Chenomx NMR suit 8.1 software (Abbreviations for multiplicities are: s=singlet, dd=doublet of doublets, d=doublet, t=triplet and m=multiplet (denotes complex pattern). 1) Butyrate (t: 0.899 ppm, m: 1.562 ppm, t: 2.165 ppm); 2) Leucine (t: 0.959 ppm, m: 1.702 ppm, m: 3.734 ppm); 3) Valine (d: 0.978 ppm, d: 1.030, m: 2.261 ppm, d: 3.583 ppm); 4) Propionate (t: 1.060 ppm, q: 2.188 ppm); 5)

Ethanol (t: 1.189 ppm, q: 3.664 ppm); 6) Lactate (d: 1.335 ppm, q: 4.124 ppm); 7) Alanine (d: 1.485 ppm, q: 3.792 ppm); 8) Acetate (s: 1.925 ppm); 9) Glutamate (m: 2.047 ppm, m: 2.134 ppm, t: 2.339 ppm, m: 2.371, q: 3.768 ppm); 10) Succinate (s: 2.409 ppm); 11) Aspartate (q: 2.692 ppm, dd: 2.815 ppm, q: 3.893 ppm); 12) Dimethylamine (s: 2.714 ppm); 13) Trimethylamine (s: 2.878 ppm); 14) Creatine (s: 3.011 ppm, s: 3.918 ppm); 15) Formate (s: 8.461 ppm); 16) Uracil (d: 5.810 ppm, d: 7.550 ppm); 17) Phenylalanine (m: 7.434 ppm, m: 7.382 ppm, d: 7.337 ppm); 18) Tyrosine (d: 7.198 ppm, d: 6.907 ppm); 19) Fumarate (s: 6.525 ppm); 20) Taurine (t: 3.429 ppm, t: 3.273 ppm).

The Multivariate Statistical Analysis.

At first, different unsupervised methods of size reduction (PCA, Factor Analysis, Independent Component Analytics, Kernel Driven PCA) and classifiers (Random Forest, ADA-Boosted Decision Tree, Support Vector Machine) were combined in order to look for the best dimensional reduction model which allows a separation between groups and to identify any outlier samples. In FIG. 37 is shown the result from a not scaled PCA, performed on the binned and Regional Scaled dataset. PCA in FIG. 37A shows the presence of two outliers (samples 44 and 46 which are T3-A-C250 and T3-A-C261 respectively). The result of a new PCA after excluding these outliers is shown in FIG. 37B. The first two principal components cover the 84% of the total variance, but no visible trend or separation is represented, as well as no more outliers are shown.

Figure 38:
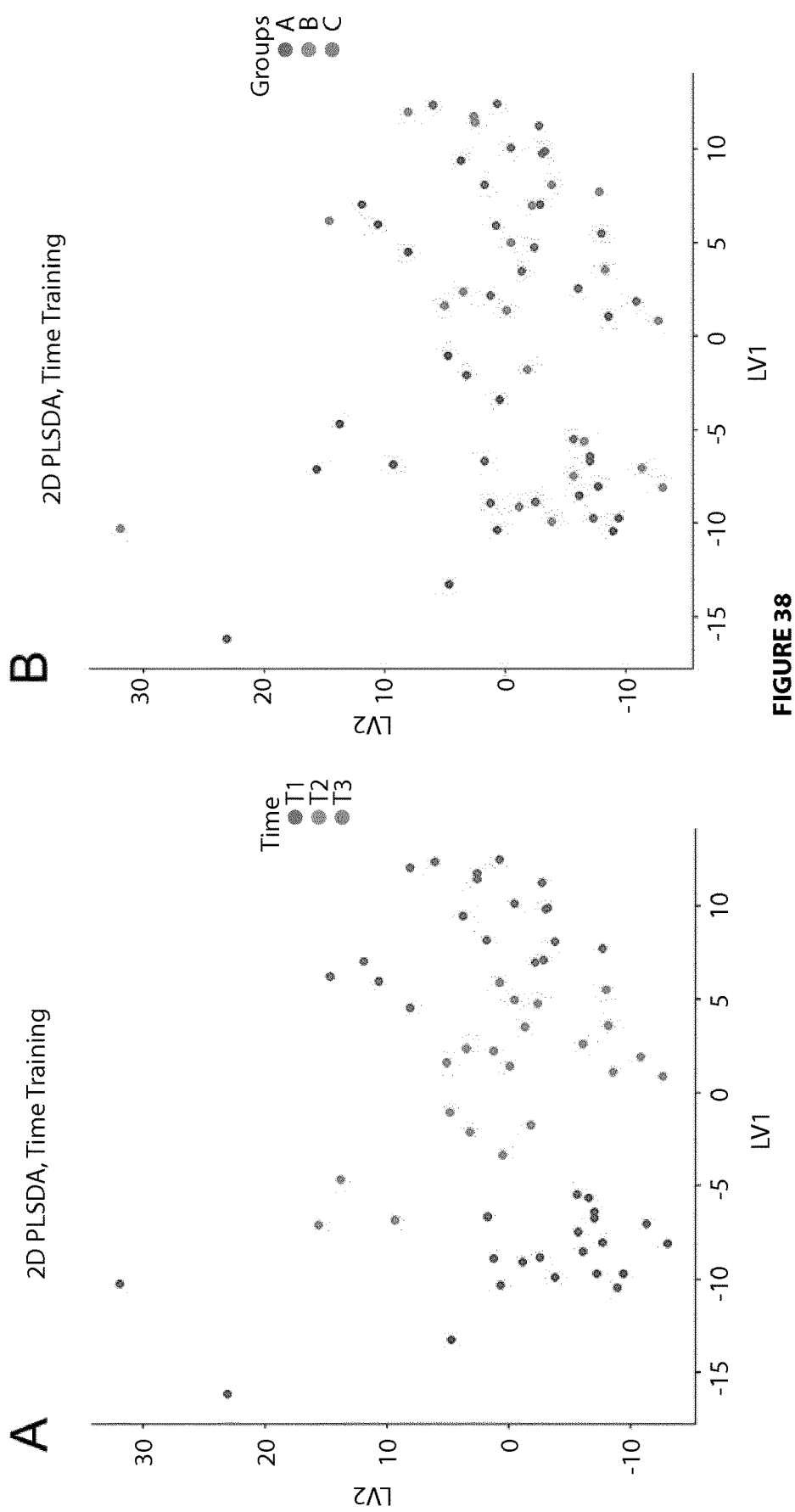

As no separation is highlighted from the unsupervised methods, it has become necessary to apply a supervised approach (FIG. 38). 61 subjects with 437 spectral features each where used for the final PLS-DA, after outliers filtering (Szymanska, E., et al., 2012). A 5-component PLS-DA model was trained on standard scaled data, with the combination of the first 3-PLS directions being the most informative in discriminating the time group separation, especially the first direction (FIG. 38A). The best prediction accuracy has thus been obtained by feeding the first 3-PLS directions to a Linear Kernel Support Vector Classifier, yielding an average prediction accuracy of ~89%. An ADA-Boosting Tree classifier has also been evaluated for comparison, yielding an average slightly worse performance (Valdes, G., et al., 2016). This result is consistent with the 2d-PLS-DA space projection, in which the 3 groups appear to be linearly-separable considering the time as a variable; whilst no significant separation appears considering the control samples vs treatment ones (FIG. 38B). All the steps of the pipeline used are internally cross validated, with particular attention to classification and prediction steps for which a stratified 10-fold cross-validation has been implemented in order to avoid overfitting. The PLS-DA average weights tied to the most informative signals in the spectra where extracted after smoothing and baseline correction, in order enhance Signal-to-Noise Ratio and filter non-informative spectral signals.

The main metabolites involved in the separation are: uracil (FIG. 39), glutamate (FIG. 40), alanine (FIG. 41), creatine (FIG. 42), butyrate (FIG. 43), propionate (FIG. 44) and acetate (FIG. 45). In these figures, the integral area of each metabolite has been compared among samples at different time (T0–T1–T2 which correspond to 14 days, 28 days and 38/42 days).

The integral area of uracil (FIG. 39) seems to increase its concentration to 42 days (T2) in all treatments, especially for samples C whose concentration is always higher than the others. Glutamate (FIG. 40) shows a tendency to increase its concentration after 28 days (T1) especially in samples A and B, remaining constant at T3. Also the integral of alanine (FIG. 41) increases at T1 but above all for samples, C. On the contrary, creatine shows a tendency to increase only for samples A and B at T2 but then at T3 their concentration are reduced (FIG. 42).

FIGS. 43 and 44 are related to the organic acids identified in the spectrum. Like the previous ones, the integrals of the interval peaks are compared among the three groups according to the time points. FIGS. 43 and 44 show the results for butyrate and propionate.

Butyrate (FIG. 43) seems to be not affected by both treatment and time. In fact the average integral area at T0, T1 and T2 in all samples are more or less the same amount. The same trend results for acetate (FIG. 45). A tendency to increase appears for propionate (FIG. 44).

It is important to underline that results are affected by data shortage and for this reason, no significant trend arises from them. For this reason, further analysis has been performed and the trends of 4 main metabolites have been fitted: FIG. 46 shows how the integral area of the assigned organic acids changes along time in each group.

Metagenomic Analysis

Samples Analyzed

A total of 63 samples have been provided to the Food Safety Laboratory of the Department of Agricultural and Food Sciences—University of Bologna (UNIBO), including 21 cecal samples, collected from the first time point, 21 from the second time point and 21 from the third time were available.

Methodology of Metagenomic Analysis

DNA Extraction for Metagenomics Sequencing

The DNA are being extracted from each sample of caecum content using a bead-beating procedure. Briefly, 0.25 g of cecal content are suspended in 1 ml lysis buffer (500 mM NaCl, 50 mM Tris-Cl, pH 8.0, 50 mM EDTA, 4% SDS) with MagNA Lyser Green Beads (Roche, Milan, Italy) and homogenized on the MagNA Lyser (Roche) for 25 sec at 6500 rpm. The samples are then heated at 70° C. for 15 min, followed by centrifugation to separate the DNA from the bacterial cellular debris. This process is repeated with a second 300 µl aliquot of lysis buffer. The samples are then subjected to 10 M v/v ammonium acetate (Sigma, Milan, Italy) precipitation, followed by isopropanol (Sigma) precipitation and a 70% ethanol (Carlo Erba, Milan, Italy) wash and re-suspended in 100 ul 1× Tris-EDTA (Sigma). The samples are then treated with DNase-free RNase (Roche) and incubated overnight at 4° C., before being processed through the QIAmp® DNA Stool Mini Kit (Qiagen, Milan, Italy) according to manufacturer's directions with some modifications. Samples are measured on a BioSpectrometer® (Eppendorf, Milan, Italy) to assess DNA quantity and quality. All samples which complies the DNA quality scores (i.e., A260/280 nm ratio between 1.8 and 2.0) will be submitted to library preparation using the Nextera XT DNA Library Preparation Kit (Illumina, San Diego, CA). Then, all libraries with a mean size between 300 and 500 bp and a minimum concentration of 4 µM will be sequenced using the NextSeq500 (Illumina) at 150 bp in paired-end mode.

Sequencing Strategies and Platforms

All samples were sequenced in paired ends. The average read lengths were 300 bp. The sequencing runs were performed by using the NextSeq500 by Illumina. The submitted metagenomes were characterized by an output between 20 Mbp and 12 Gbp.

Bioinformatics Analysis

Filtering and trimming of raw reads were performed using MGRast (MR) (mgrast.org) (Keegan et al., 2016) bioinformatics pipelines. Additionally, functional annotation were carried out on the MG-RAST v3.6 metagenome analysis server (Meyer et al., 2008) using the default set parameters (e-value cutoff: <1 e−5, min. % identity cutoff: 60%, and min. alignment length cutoff: 15). For the functional classifications, genes were mapped onto the SEED and KEGG classification using SEED and KEGG (Kyoto Encyclopedia of Genes and Genomes) identifiers, respectively.

Statistical Analysis

Comparative functional profiling were performed using the STAMP v2.0.8 software (Parks and Beiko, 2010; Parks et al., 2014) for statistical analyses. The gene counts were normalized by dividing the number of gene hits to individual function by total number of gene hits in each metagenome data set to remove bias due to difference in sequencing efforts. To identify differentially abundant SEED or KEGG functions in the metagenome, statistical tests of the relative gene abundances compared to the other metagenomes were carried out by applying two-sided Welch's exact test with Benjamini-Hochberg False Discovery Rate (FDR) multiple test correction method and a p-value <0.05.

Results

At first, Principal Component Analysis (PCA) based on 'functional features data" were to look for the best dimensional reduction model which allows a separation between groups and to identify any outlier samples. In FIG. 47 the result from a PCA, performed on 63 subjects with 6361 functional features, is reported. The first two principal components cover the 81% of the total variance; a clear visible separation between treated groups (Group B and C) and control group (Group A) is represented. In relation to time points no separation could be identified.

Description of Primary KEGG Metabolic Pathways in the Three Groups of Broilers (a, B, C Groups), Along the Productive Cycle (Time Points T1, T2 and T3).

Visualization of average functional gene profiles at level 1 based on KEGG database of broiler caeca of three different groups A, B and C, for each available time point (T1, T2, T3) highlighted that compositional differences among the three experimental groups are appreciable at level 1 (FIG. 49). In particular in the group A, the relative abundance of Genetic Information Processing (in orange in FIG. 49) were statistically significant increases at each time point in comparison to treated groups (Table 5). On the contrary the relative abundance of Environmental Information Processing (FIG. 50A) were statistically significant increases at each time point in groups B and C (Table 5) in comparison to Group A. Moreover, the relative abundance of Metabolism (FIG. 50B) were statistically increase in groups B and C in comparison to Group A at 28 day of age, while the Organismal Systems were statistically increase in Group A in comparison to Groups B and C (Table 5).

TABLE 5

Relative abundance ≥0.1% of Primary KEGG metabolic pathways in broiler caeca showing statistically significant differences between treated (Groups B and C) and control (Group A) groups at each time point (T1, T2, T3)

| level1 | p-values (corrected)* | Group C | Group B | Group A |
|---|---|---|---|---|
| | | T1 | | |
| Genetic Information Processing | 0.0240 | 22.537 ± 0.872 | 21.896 ± 1.253 | 25.387 ± 1.568 |
| | | T2 | | |
| Genetic Information Processing | 0.0133 | 25.106 ± 1.729 | 23.629 ± 0.479 | 27.613 ± 1.379 |
| Organismal Systems | 0.0072 | 0.382 ± 0.053 | 0.595 ± 0.488 | 1.461 ± 0.509 |
| | | T3 | | |
| Genetic Information Processing | 0.0039 | 24.394 ± 0.850 | 23.156 ± 0.423 | 26.942 ± 11.544 |

*= Bejamini Hocherg corrected P values are reported when statistical significance was reached (P < 0.05).

Description of Secondary KEGG Metabolic Pathways in the Three Groups of Broilers (a, B, C Groups), Along the Productive Cycle (Time Points T1, T2 and T3).

Visualization of Secondary KEGG metabolic pathways, with a relative abundance 0.5% highlight that compositional differences among the three experimental groups for each time point are appreciable (FIG. 51) (i.e. Translation, Transcription at 14 days; Membrane transport, Translation, Replication and repair at 28 days; Membrane transport, Translation, Replication and repair, Nucleotide metabolism at 42 days).

In particular in the groups B and C, the relative abundance of Metabolism of cofactors and vitamins at each time point days were statistically significant increases at in comparison to Group A (in light gray in Tables 6, 7 and 8, below). On the contrary the relative abundance of Translation, Transcription, and Environmental adaptation were statistically significant increases at each time point in group A in comparison to Groups B and C (in white in Table 5.

Looking to the other pathways the relative abundance of Membrane transport, Replication and repair, Biosynthesis of other secondary metabolites, Metabolism of terpenoids and polyketides and Metabolism of other amino acids were statistically increase in groups B and C in comparison to Group A (in orange in Table 7 and 8) at 28 and 42 days of age. On the contrary the relative abundance of Translation, Energy metabolism, Signal transduction, Transcription, Infectious diseases and Environmental adaptation were statistically increase in group A in comparison to Groups B and C (in white in Table 7 and 8) at 28 and 42 days of age. Finally the relative abundance of Lipid metabolism show a significant increase in Groups B and C in comparison to Group A at 28 days of age (in light gray in Table 6 and 7), while Folding, sorting and degradation, Cell communication and Signaling molecules and interaction were statistically increase in Group A in comparison to Groups B and C at 28 days of age (in white in Table 7).

TABLE 6

Secondary KEGG metabolic pathways with a relative abundance ≥0.5% in broiler caeca and showing statistically significant differences between (Groups B and C) and control (Group A) groups at T1 (14 days of age)

| level2 | p-values (corrected)* | Group C | Group B | Group A |
|---|---|---|---|---|
| Translation | 0.0098 | 10.204 ± 0.525 | 9.818 ± 0.757 | 12.623 ± 1.188 |
| Metabolism of cofactors and vitamins | 0.0087 | 4.108 ± 0.161 | 4.465 ± 0.143 | 3.040 ± 0.526 |
| Transcription | 0.0090 | 2.619 ± 0.110 | 2.461 ± 0.112 | 3.641 ± 0.521 |
| Lipid metabolism | 0.0073 | 2.344 ± 0.055 | 2.413 ± 0.070 | 1.938 ± 0.196 |
| Environmental adaptation | 0.0171 | 0.276 ± 0.029 | 0.230 ± 0.022 | 0.558 ± 0.135 |

*= Bejamini Hocherg corrected P values are reported when statistical significance was reached ($P < 0.05$).

TABLE 7

Secondary KEGG metabolic pathways with a relative abundance ≥0.5% in broiler caeca and showing statistically significant differences between treated (Groups B and C) and control (Group A) groups at T2 (28 days of age)

| level2 | p-values (corrected)* | Group C | Group B | Group A |
|---|---|---|---|---|
| Membrane transport | 0.0043 | 11.788 ± 0.410 | 10.367 ± 0.833 | 6.866 ± 0.394 |
| Translation | 0.0060 | 11.706 ± 0.930 | 10.792 ± 0.311 | 14.352 ± 0.948 |
| Replication and repair | 0.0038 | 7.563 ± 0.538 | 7.041 ± 0.347 | 5.692 ± 0.295 |
| Metabolism of cofactors and vitamins | 0.0073 | 4.027 ± 0.279 | 4.496 ± 0.113 | 2.803 ± 0.092 |
| Energy metabolism | 0.0205 | 3.334 ± 0.160 | 3.419 ± 0.141 | 4.153 ± 0.435 |
| Signal transduction | 0.0046 | 3.184 ± 0.101 | 3.577 ± 0.520 | 4.569 ± 0.945 |
| Folding, sorting, and degradation | 0.0313 | 3.130 ± 0.104 | 3.207 ± 0.203 | 3.385 ± 0.158 |
| Transcription | 0.0036 | 2.706 ± 0.182 | 2.589 ± 0.098 | 4.184 ± 0.301 |
| Lipid metabolism | 0.0040 | 2.202 ± 0.067 | 2.248 ± 0.059 | 1.704 ± 0.151 |
| Glycan biosynthesis and metabolism | 0.0060 | 1.788 ± 0.123 | 2.008 ± 0.263 | 1.150 ± 0.337 |
| Biosynthesis of other secondary metabolites | 0.0298 | 1.455 ± 0.170 | 1.541 ± 0.140 | 1.236 ± 0.154 |
| Metabolism of terpenoids and polyketides | 0.0044 | 1.084 ± 0.045 | 1.124 ± 0.064 | 0.661 ± 0.039 |
| Infectious diseases | 0.0249 | 0.543 ± 0.071 | 0.571 ± 0.073 | 0.708 ± 0.116 |
| Metabolism of other amino acids | 0.0039 | 0.514 ± 0.046 | 0.537 ± 0.045 | 0.339 ± 0.042 |
| Transport and catabolism | 0.0038 | 0.485 ± 0.033 | 0.979 ± 0.502 | 1.287 ± 0.487 |
| Environmental adaptation | 0.0048 | 0.310 ± 0.038 | 0.273 ± 0.030 | 0.692 ± 0.085 |
| Cell communication | 0.0155 | 0.023 ± 0.034 | 0.298 ± 0.576 | 1.063 ± 0.806 |
| Signaling molecules and interaction | 0.0156 | 0.013 ± 0.019 | 0.158 ± 0.302 | 0.639 ± 0.482 |

*= Bejamini Hocherg corrected P values are reported when statistical significance was reached ($P < 0.05$).

TABLE 8

Secondary KEGG metabolic pathways with a relative abundance ≥0.5% in broiler caeca and showing statistically significant differences between treated (Groups B and C) and control (Group A) groups at T3 (42 days of age)

| level2 | p-values (corrected)* | Group C | Group B | Group A |
|---|---|---|---|---|
| Membrane transport | 0.0073 | 11.743 ± 0.425 | 10.848 ± 0.881 | 7.385 ± 1.133 |
| Translation | 0.0073 | 11.290 ± 0.425 | 10.486 ± 0.187 | 13.515 ± 1.282 |
| Replication and repair | 0.0249 | 7.356 ± 0.338 | 6.952 ± 0.213 | 6.435 ± 0.476 |
| Nucleotide metabolism | 0.0122 | 5.801 ± 0.075 | 5.658 ± 0.113 | 6.350 ± 0.302 |
| Metabolism of cofactors and vitamins | 0.0093 | 4.123 ± 0.229 | 4.683 ± 0.158 | 3.505 ± 0.627 |
| Energy metabolism | 0.0443 | 3.473 ± 0.141 | 3.491 ± 0.118 | 4.287 ± 0.512 |
| Signal transduction | 0.0209 | 3.204 ± 0.113 | 3.518 ± 0.261 | 3.630 ± 0.429 |
| Transcription | 0.0133 | 2.648 ± 0.096 | 2.562 ± 0.060 | 3.776 ± 0.587 |
| Cell growth and death | 0.0105 | 1.901 ± 0.069 | 1.862 ± 0.042 | 1.526 ± 0.202 |
| Glycan biosynthesis | 0.0346 | 1.836 ± 0.057 | 2.170 ± 0.304 | 1.417 ± 0.501 |

TABLE 8-continued

Secondary KEGG metabolic pathways with a relative abundance ≥0.5% in broiler caeca and showing statistically significant differences between treated (Groups B and C) and control (Group A) groups at T3 (42 days of age)

| level2 | p-values (corrected)* | Group C | Group B | Group A |
|---|---|---|---|---|
| and metabolism | | | | |
| Metabolism of terpenoids and polyketides | 0.0266 | 1.077 ± 0.028 | 1.130 ± 0.055 | 0.865 ± 0.165 |
| Transport and catabolism | 0.0120 | 0.574 ± 0.074 | 1.046 ± 0.320 | 0.923 ± 0.221 |
| Infectious diseases | 0.0123 | 0.561 ± 0.034 | 0.591 ± 0.058 | 0.773 ± 0.169 |
| Metabolism of other amino acids | 0.0367 | 0.547 ± 0.039 | 0.618 ± 0.073 | 0.459 ± 0.089 |
| Environmental adaptation | 0.0113 | 0.325 ± 0.034 | 0.288 ± 0.020 | 0.596 ± 0.200 |

*= Bejamini Hocherg corrected P values are reported when statistical significance was reached (P < 0.05).

Description of Tertiary KEGG Metabolic Pathways in the Three Groups of Broilers (a, B, C Groups), Along the Productive Cycle (Time Points T1, T2 and T3).

Analyzing the Tertiary KEGG metabolic pathways no differences were reported at 14 days of age between experimental groups (data not reported) while a great number of pathways showed significant differences at 28 and 42 days of age (Tables 9 and 10, below).

In particular at 28 and 42 days of age 19 pathways (ABC transporters, DNA replication, Pyrimidine metabolism, Homologous recombination, Pentose phosphate pathway, Phenylalanine, tyrosine and tryptophan biosynthesis, Nicotinate and nicotinamide metabolism, Phenylpropanoid biosynthesis, Sulfur relay system, Glycerophospholipid metabolism, Methane metabolism, Pantothenate and CoA biosynthesis, Selenocompound metabolism, Folate biosynthesis, Inositol phosphate metabolism, Lysosome, Butanoate metabolism, Biotin metabolism, Phosphonate and phosphinate metabolism) with a relative abundance 0.1% were statistically significant increase in Groups B and C in comparison to Group A (in light gray in Table 9 and 10). On the contrary 9 pathways (Alanine, aspartate and glutamate metabolism, Purine metabolism, RNA polymerase, RNA degradation, Two-component system, Pyruvate metabolism, Nucleotide excision repair, Valine, leucine and isoleucine degradation, Lysine degradation) with a relative abundance 0.1% were statistically significant increase in Group A in comparison to Group B and C (in white in Tables 9 and 10).

Moreover 27 pathways (Aminoacyl-tRNA biosynthesis, Glycolysis/Gluconeogenesis, Oxidative phosphorylation, Starch and sucrose metabolism, Arginine and proline metabolism, Galactose metabolism, Amino sugar and nucleotide sugar metabolism, Peptidoglycan biosynthesis, Histidine metabolism, Phosphotransferase system (PTS), Terpenoid backbone biosynthesis, Fructose and mannose metabolism, Fatty acid biosynthesis, Citrate cycle (TCA cycle), Base excision repair, Mismatch repair, Tyrosine metabolism, Glyoxylate and dicarboxylate metabolism, Bacterial chemotaxis, Peroxisome, Other glycan degradation, Glutathione metabolism, Vitamin B6 metabolism, Zeatin biosynthesis, Lipopolysaccharide biosynthesis, Tryptophan metabolism, Calcium signaling pathway) showed a significant increase at 28 days of age in Group B and C in comparison to Group A (in light gray in Table 9).

Particularly interesting are the metabolic pathways such as Fatty acid biosynthesis, Phosphotransferase system (PTS) and Butanoate metabolism, increased in treated groups and linked to production of SCFA. Moreover a statistically significant increase in treated Groups (Group B and C) has been reported for B vitamin pathways such as Nicotinate and nicotinamide metabolism, Pantothenate biosynthesis, Folate biosynthesis, Biotin metabolism and Vitamin B6 metabolism.

TABLE 9

Tertiary KEGG metabolic pathways in broiler caeca and showing statistically significant differences between treated (Groups B and C) and control (Group A) groups at 28 days of age

| level3 | p-values (corrected)* | Group C | Group B | Group A |
|---|---|---|---|---|
| ABC transporters [PATH: ko02010] | 0.0185 | 8.886 ± 0.365 | 7.755 ± 0.655 | 4.421 ± 0.253 |
| Aminoacyl-tRNA biosynthesis [PATH: ko00970] | 0.0074 | 7.376 ± 0.561 | 6.865 ± 0.309 | 10.179 ± 0.901 |
| Alanine, aspartate and glutamate metabolism [PATH: ko00250] | 0.0262 | 4.464 ± 0.239 | 4.458 ± 0.268 | 5.271 ± 0.517 |
| Purine metabolism [PATH: ko00230] | 0.0100 | 3.950 ± 0.160 | 3.954 ± 0.202 | 4.861 ± 0.387 |
| RNA polymerase [PATH: ko03020] | 0.0088 | 2.700 ± 0.180 | 2.524 ± 0.056 | 3.996 ± 0.439 |
| DNA replication [PATH: ko03030] | 0.0092 | 2.478 ± 0.230 | 2.292 ± 0.095 | 1.454 ± 0.062 |
| Glycolysis/Gluconeogenesis [PATH: ko00010] | 0.0218 | 2.335 ± 0.023 | 2.341 ± 0.128 | 2.619 ± 0.194 |
| RNA degradation [PATH: ko03018] | 0.0218 | 2.290 ± 0.094 | 2.285 ± 0.065 | 2.609 ± 0.164 |
| Oxidative phosphorylation [PATH: ko00190] | 0.0127 | 2,2570,139 | 2.380 ± 0.120 | 3.145 ± 0.404 |

TABLE 9-continued

Tertiary KEGG metabolic pathways in broiler caeca and showing statistically significant differences between treated (Groups B and C) and control (Group A) groups at 28 days of age

| level3 | p-values (corrected)* | Group C | Group B | Group A |
|---|---|---|---|---|
| Two-component system [PATH: ko02020] | 0.0237 | 2.202 ± 0.093 | 2.323 ± 0.132 | 2.076 ± 0.099 |
| Starch and sucrose metabolism [PATH: ko00500] | 0.0222 | 2.164 ± 0.077 | 2.033 ± 0.121 | 2.295 ± 0.165 |
| Pyruvate metabolism [PATH: ko00620] | 0.0074 | 2.147 ± 0.182 | 2.030 ± 0.093 | 2.630 ± 0.199 |
| Arginine and proline metabolism [PATH: ko00330] | 0.0102 | 2.084 ± 0.172 | 2.166 ± 0.198 | 1.634 ± 0.109 |
| Nucleotide excision repair [PATH: ko03420] | 0.0132 | 2.011 ± 0.140 | 1.851 ± 0.117 | 2.408 ± 0.266 |
| Galactose metabolism [PATH: ko00052] | 0.0401 | 2.008 ± 0.191 | 2.098 ± 0.207 | 1.734 ± 0.215 |
| Pyrimidine metabolism [PATH: ko00240] | 0.0077 | 1.931 ± 0.037 | 1.874 ± 0.138 | 1.397 ± 0.069 |
| Amino sugar and nucleotide sugar metabolism [PATH: ko00520] | 0.0069 | 1.828 ± 0.069 | 1.891 ± 0.102 | 1.296 ± 0.120 |
| Homologous recombination [PATH: ko03440] | 0.0073 | 1.700 ± 0.099 | 1.563 ± 0.101 | 1.002 ± 0.051 |
| Pentose phosphate pathway [PATH: ko00030] | 0.0078 | 1.593 ± 0.042 | 1.490 ± 0.116 | 1.147 ± 0.092 |
| Peptidoglycan biosynthesis [PATH: ko00550] | 0.0085 | 1.364 ± 0.127 | 1.274 ± 0.068 | 0.404 ± 0.043 |
| Histidine metabolism [PATH: ko00340] | 0.0079 | 1.193 ± 0.118 | 1.278 ± 0.097 | 0.716 ± 0.060 |
| Phenylalanine, tyrosine and tryptophan biosynthesis [PATH: ko00400] | 0.0075 | 1.035 ± 0.114 | 1.066 ± 0.104 | 0.458 ± 0.053 |
| Phosphotransferase system (PTS) [PATH: ko02060] | 0.0214 | 1.008 ± 0.213 | 0.836 ± 0.158 | 0.614 ± 0.155 |
| Terpenoid backbone biosynthesis [PATH: ko00900] | 0.0075 | 0.924 ± 0.051 | 0.910 ± 0.070 | 0.572 ± 0.045 |
| Fructose and mannose metabolism [PATH: ko00051] | 0.0077 | 0.860 ± 0.045 | 0.948 ± 0.068 | 0.723 ± 0.079 |
| Nicotinate and nicotinamide metabolism [PATH: ko00760] | 0.0079 | 0.843 ± 0.046 | 0.819 ± 0.058 | 0.591 ± 0.026 |
| Fatty acid biosynthesis [PATH: ko00061] | 0.0072 | 0.803 ± 0.035 | 0.852 ± 0.065 | 0.432 ± 0.029 |
| Citrate cycle (TCA cycle) [PATH: ko00020] | 0.0262 | 0.789 ± 0.105 | 0.958 ± 0.100 | 0.779 ± 0.110 |
| Phenylpropanoid biosynthesis [PATH: ko00940] | 0.0081 | 0.737 ± 0.128 | 0.782 ± 0.096 | 0.451 ± 0.056 |
| Base excision repair [PATH: ko03410] | 0.0079 | 0.734 ± 0.035 | 0.726 ± 0.039 | 0.559 ± 0.015 |
| Sulfur relay system [PATH: ko04122] | 0.0076 | 0.718 ± 0.043 | 0.680 ± 0.056 | 0.362 ± 0.018 |
| Mismatch repair [PATH: ko03430] | 0.0075 | 0.639 ± 0.054 | 0.606 ± 0.031 | 0.262 ± 0.024 |
| Glycerophospholipid metabolism [PATH: ko00564] | 0.0082 | 0.637 ± 0.022 | 0.612 ± 0.034 | 0.400 ± 0.055 |
| Valine, leucine and isoleucine degradation [PATH: ko00280] | 0.0314 | 0.623 ± 0.056 | 0.707 ± 0.046 | 0.735 ± 0.094 |
| Methane metabolism [PATH: ko00680] | 0.0072 | 0.489 ± 0.057 | 0.490 ± 0.032 | 0.289 ± 0.021 |
| Tyrosine metabolism [PATH: ko00350] | 0.0130 | 0.472 ± 0.044 | 0.391 ± 0.024 | 0.590 ± 0.084 |
| Pantothenate and CoA biosynthesis [PATH: ko00770] | 0.0098 | 0.399 ± 0.024 | 0.443 ± 0.042 | 0.157 ± 0.026 |
| Glyoxylate and dicarboxylate metabolism [PATH: ko00630] | 0.0230 | 0.373 ± 0.034 | 0.345 ± 0.049 | 0.296 ± 0.037 |
| Bacterial chemotaxis [PATH: ko02030] | 0.0084 | 0.323 ± 0.090 | 0.306 ± 0.053 | 0.153 ± 0.038 |
| Peroxisome [PATH: ko04146] | 0.0074 | 0.320 ± 0.026 | 0.411 ± 0.095 | 0.550 ± 0.038 |
| Other glycan degradation [PATH: ko00511] | 0.0083 | 0.318 ± 0.035 | 0.408 ± 0.072 | 0.268 ± 0.023 |
| Selenocompound metabolism [PATH: ko00450] | 0.0094 | 0.243 ± 0.010 | 0.212 ± 0.020 | 0.168 ± 0.012 |
| Folate biosynthesis [PATH: ko00790] | 0.0074 | 0.170 ± 0.015 | 0.186 ± 0.008 | 0.048 ± 0.008 |
| Glutathione metabolism [PATH: ko00480] | 0.0259 | 0.169 ± 0.037 | 0.177 ± 0.028 | 0.114 ± 0.037 |
| Inositol phosphate metabolism [PATH: ko00562] | 0.0263 | 0.153 ± 0.019 | 0.152 ± 0.020 | 0.116 ± 0.021 |

TABLE 9-continued

Tertiary KEGG metabolic pathways in broiler caeca and showing statistically significant differences between treated (Groups B and C) and control (Group A) groups at 28 days of age

| level3 | p-values (corrected)* | Group C | Group B | Group A |
|---|---|---|---|---|
| Lysosome [PATH: ko04142] | 0.0174 | 0.152 ± 0.021 | 0.445 ± 0.199 | 0.298 ± 0.155 |
| Butanoate metabolism [PATH: ko00650] | 0.0109 | 0.150 ± 0.017 | 0.189 ± 0.017 | 0.057 ± 0.008 |
| Biotin metabolism [PATH: ko00780] | 0.0391 | 0.148 ± 0.015 | 0.195 ± 0.026 | 0.058 ± 0.008 |
| Vitamin B6 metabolism [PATH: ko00750] | 0.0089 | 0.118 ± 0.012 | 0.165 ± 0.015 | 0.096 ± 0.096 |
| Zeatin biosynthesis [PATH: ko00908] | 0.0077 | 0.117 ± 0.007 | 0.114 ± 0.007 | 0.038 ± 0.004 |
| Phosphonate and phosphinate metabolism [PATH: ko00440] | 0.0092 | 0.101 ± 0.014 | 0.146 ± 0.031 | 0.053 ± 0.010 |
| Lysine degradation [PATH: ko00310] | 0.0082 | 0.082 ± 0.012 | 0.127 ± 0.043 | 0.191 ± 0.072 |
| Lipopolysaccharide biosynthesis [PATH: ko00540] | 0.0101 | 0.072 ± 0.021 | 0.175 ± 0.055 | 0.069 ± 0.021 |
| Tryptophan metabolism [PATH: ko00380] | 0.0073 | 0.040 ± 0.010 | 0.050 ± 0.013 | 0.103 ± 0.031 |
| Calcium signaling pathway [PATH: ko04020] | 0.0369 | 0.008 ± 0.008 | 0.063 ± 0.111 | 0.259 ± 0.195 |

*= Bejamini Hocherg corrected P values are reported when statistical significance was reached (P < 0.05).

TABLE 10

Tertiary KEGG metabolic pathways with a relative abundance ≥0.1% in broiler caeca and showing statistically significant differences between treated (Groups B and C) and control (Group A) groups at 42 days of age

| level3 | p-values (corrected)* | Group C | Group B | Group A |
|---|---|---|---|---|
| ABC transporters [PATH: ko02010] | 0.0184 | 8.863 ± 0.326 | 8.096 ± 0.786 | 4.777 ± 0.934 |
| Alanine, aspartate and glutamate metabolism [PATH: ko00250] | 0.0173 | 4.487 ± 0.078 | 4.407 ± 0.185 | 5.465 ± 0.478 |
| Purine metabolism [PATH: ko00230] | 0.0228 | 3.896 ± 0.053 | 3.849 ± 0.078 | 4.844 ± 0.432 |
| RNA polymerase [PATH: ko03020] | 0.0174 | 2.638 ± 0.104 | 2.526 ± 0.045 | 3.765 ± 0.584 |
| DNA replication [PATH: ko03030] | 0.0318 | 2.421 ± 0.124 | 2.293 ± 0.093 | 1.753 ± 0.330 |
| RNA degradation [PATH: ko03018] | 0.0165 | 2.273 ± 0.077 | 2.276 ± 0.051 | 2.705 ± 0.176 |
| Two-component system [PATH: ko02020] | 0.0474 | 2.227 ± 0.086 | 2.403 ± 0.064 | 2.495 ± 0.406 |
| Pyruvate metabolism [PATH: ko00620] | 0.0233 | 2.094 ± 0.105 | 2.050 ± 0.059 | 2.762 ± 0.268 |
| Nucleotide excision repair [PATH: ko03420] | 0.0176 | 1.955 ± 0.090 | 1.793 ± 0.073 | 2.405 ± 0.287 |
| Pyrimidine metabolism [PATH: ko00240] | 0.0215 | 1.905 ± 0.030 | 1.809 ± 0.045 | 1.506 ± 0.171 |
| Homologous recombination [PATH: ko03440] | 0.0343 | 1.655 ± 0.080 | 1.537 ± 0.038 | 1.274 ± 0.215 |
| Pentose phosphate pathway [PATH: ko00030] | 0.0172 | 1.613 ± 0.064 | 1.535 ± 0.045 | 1.281 ± 0.146 |
| Valine, leucine and isoleucine biosynthesis [PATH: ko00290] | 0.0232 | 1.58 ± 0.056 | 1.506 ± 0.148 | 2.111 ± 0.357 |
| Phenylalanine, tyrosine and tryptophan biosynthesis [PATH: ko00400] | 0.0156 | 1.011 ± 0.050 | 1.082 ± 0.068 | 0.610 ± 0.191 |
| Nicotinate and nicotinamide metabolism [PATH: ko00760] | 0.0325 | 0.859 ± 0.037 | 0.808 ± 0.019 | 0.705 ± 0.087 |
| Phenylpropanoid biosynthesis [PATH: ko00940] | 0.0396 | 0.773 ± 0.073 | 0.786 ± 0.064 | 0.559 ± 0.129 |
| Sulfur relay system [PATH: ko04122] | 0.0173 | 0.690 ± 0.024 | 0.663 ± 0.039 | 0.408 ± 0.085 |
| Glycerophospholipid metabolism [PATH: ko00564] | 0.0471 | 0.643 ± 0.018 | 0.613 ± 0.018 | 0.445 ± 0.117 |
| Valine, leucine and isoleucine degradation [PATH: ko00280] | 0.0325 | 0.637 ± 0.028 | 0.717 ± 0.045 | 0.851 ± 0.112 |
| Methane metabolism [PATH: ko00680] | 0.0228 | 0.519 ± 0.079 | 0.530 ± 0.061 | 0.343 ± 0.056 |

TABLE 10-continued

Tertiary KEGG metabolic pathways with a relative abundance ≥0.1% in broiler caeca and showing statistically significant differences between treated (Groups B and C) and control (Group A) groups at 42 days of age

| level3 | p-values (corrected)* | Group C | Group B | Group A |
|---|---|---|---|---|
| One carbon pool by folate [PATH: ko00670] | 0.0154 | 0.421 ± 0.019 | 0.429 ± 0.020 | 0.518 ± 0.067 |
| Pantothenate and CoA biosynthesis [PATH: ko00770] | 0.0179 | 0.417 ± 0.026 | 0.446 ± 0.029 | 0.251 ± 0.085 |
| Selenocompound metabolism [PATH: ko00450] | 0.0198 | 0.249 ± 0.011 | 0.217 ± 0.013 | 0.191 ± 0.022 |
| Lysosome [PATH: ko04142] | 0.0277 | 0.188 ± 0.039 | 0.544 ± 0.197 | 0.385 ± 0.214 |
| Folate biosynthesis [PATH: ko00790] | 0.0151 | 0.173 ± 0.012 | 0.208 ± 0.014 | 0.101 ± 0.051 |
| Inositol phosphate metabolism [PATH: ko00562] | 0.0242 | 0.171 ± 0.034 | 0.157 ± 0.040 | 0.105 ± 0.021 |
| Butanoate metabolism [PATH: ko00650] | 0.0245 | 0.151 ± 0.011 | 0.179 ± 0.0120 | 0.086 ± 0.043 |
| Biotin metabolism [PATH: ko00780] | 0.0176 | 0.146 ± 0.020 | 0.236 ± 0.035 | 0.109 ± 0.059 |
| Phosphonate and phosphinate metabolism [PATH: ko00440] | 0.0158 | 0.109 ± 0.007 | 0.176 ± 0.038 | 0.073 ± 0.036 |
| Lysine degradation [PATH: ko00310] | 0.0371 | 0.088 ± 0.013 | 0.124 ± 0.019 | 0.179 ± 0.036 |

*= Bejamini Hocherg corrected P values are reported when statistical significance was reached (P < 0.05).

Evaluation of Gene's Abundance Related to SCFA and Glucosidase

Since short-chain fatty acids (SOFA) play an important role in gut physiology, we specifically analyzed metabolic pathways leading to butyrate and propionate synthesis. As described in the literature there are 4 potential pathways leading to butyrate production. The first and major one was based on acetyl-CoA acetyltransferase (FIG. 39).

Looking to the relative abundance of genes related to butyrate production in our study we identified at least 7 metabolic function at 28 days of age and 5 at 42 days of age statistically significant increase in treated groups (group B and C) in comparison to group A (Table 11, below). This evidence can be correlated with different microbial genera such as *Faecalibacterium* and *Eubacterium* (Polansky et al., 2016, Rowland et., 2018) and by the cross feeding activity of Bifidobacteria as reported by Reviere et al., 2016. All these genera has been identified in our study by microbiota analysis and these results can predict the potential production of butyrate in animal treated with Vit. B2.

TABLE 11

Percentage of relative abundance of functional gene related to Butyrate production (KEGG and SEED databases) in broiler caeca showing statistically significant differences between treated (Groups B and C) and control (Group A) groups at 28 and 42 days of age

| Function | p-values (corrected)* | Group C | Group B | Group A |
|---|---|---|---|---|
| 28 days | | | | |
| buk; butyrate kinase [EC: 2.7.2.7] | 0.0193 | 0.0753 ± 0.0151 | 0.1071 ± 0.010 | 0.0236 ± 0.0055 |
| ptb; phosphate butyryltransferase [EC: 2.3.1.19] | 0.0128 | 0.0457 ± 0.0067 | 0.0532 ± 0.011 | 0.0043 ± 0.0040 |
| 4-hydroxybutyrate dehydrogenase [EC: 1.1.1.61] | 0.0104 | 0.0029 ± 0.008 | 0.0028 ± 0.0007 | 0.0003 ± 0.0002 |
| but; Butyrate-acetoacetate CoA-transferase subunit A (EC 2.8.3.9) | 0.0089 | 0.0023 ± 0.0006 | 0.0022 ± 0.0006 | 0.0005 ± 0.0004 |
| atoD; acetate CoA-transferase alpha subunit [EC: 2.8.3.8] | 0.0379 | 0.004 ± 0.0008 | 0.004 ± 0.001 | 0.001 ± 0.001 |
| D-beta-hydroxybutyrate dehydrogenase (EC 1.1.1.30) | 0.0405 | 0.0038 ± 0.0005 | 0.0036 ± 0.0010 | 0.0011 ± 0.0013 |
| trans-2-enoyl-CoA reductase (NAD+) [EC: 1.3.1.44] | 0.0128 | 0.0013 ± 0.0005 | 0.0014 ± 0.0004 | 0.0003 ± 0.0003 |
| 42 days | | | | |
| buk; butyrate kinase [EC: 2.7.2.7] | 0.0490 | 0.0801 ± 0.0078 | 0.1055 ± 0.0095 | 0.0517 ± 0.0338 |
| ptb; phosphate butyryltransferase [EC: 2.3.1.19] | 0.0302 | 0.0439 ± 0.0053 | 0.0434 ± 0.0152 | 0.0103 ± 0.0089 |
| 4-hydroxybutyrate dehydrogenase [EC: 1.1.1.61] | 0.0314 | 0.0031 ± 0.0003 | 0.0025 ± 0.0006 | 0.0007 ± 0.0005 |
| but; Butyrate-acetoacetate CoA-transferase subunit A (EC 2.8.3.9) | 0.0145 | 0.0028 ± 0.0007 | 0.0022 ± 0.0008 | 0.0005 ± 0.0005 |

TABLE 11-continued

Percentage of relative abundance of functional gene related to Butyrate production (KEGG and SEED databases) in broiler caeca showing statistically significant differences between treated (Groups B and C) and control (Group A) groups at 28 and 42 days of age

| Function | p-values (corrected)* | Group C | Group B | Group A |
| --- | --- | --- | --- | --- |
| trans-2-enoyl-CoA reductase (NAD±) [EC: 1.3.1.44] | 0.0319 | 0.0014 ± 0.0004 | 0.0017 ± 0.0006 | 0.0001 ± 0.0001 |

*= Bejamini Hocherg corrected P values are reported when statistical significance was reached ($P < 0.05$).

Very interesting was the evidence of a statistically significant increase of relative abundance of functional genes related to β-galactosidase in broiler caeca of treated groups (Group b and C) in comparison with Group A (Table 12, below). This result could be explained by the increase of Bifidobacteria in treated groups, as reported in the Microbiota analysis, as well as with *Lactobacillus* species (Shaima et al., 2017). In humans, this enzyme is abundantly found in colon where it facilitates lactose fermentation, and its activity is measured to indicate the capacity of microbiota of the colon to ferment the intestinal lactose.

TABLE 12

Percentage of relative abundance of functional gene related to β-galactosidase (KEGG and SEED databases) in broiler caeca showing statistically significant differences between treated (Groups B and C) and control (Group A) groups at 28 and 42 days of age

| Function | p-values (corrected)* | Group C | Group B | Group A |
| --- | --- | --- | --- | --- |
| 28 days | | | | |
| Beta-galactosidase (EC 3.2.1.23) | 0.0063 | 0.384 ± 0.040 | 0.775 ± 0.211 | 0.252 ± 0.031 |
| Beta-galactosidase (EC 3.2.1.23), LacA family | 0.0062 | 0.183 ± 0.003 | 0.182 ± 0.003 | 0.009 ± 0.001 |
| Beta-galactosidase small subunit (EC 3.2.1.23) | 0.0161 | 0.008 ± 0.002 | 0.008 ± 0.001 | 0.003 ± 0.002 |
| 42 days | | | | |
| Beta-galactosidase (EC 3.2.1.23) | 0.0407 | 0.419 ± 0.023 | 0.923 ± 0.204 | 0.629 ± 0.324 |

*= Bejamini Hocherg corrected P values are reported when statistical significance was reached ($P < 0.05$).

Conclusions

Both dietary regimes administered to group B and C induced modification in cecal microbiota that included an increase of well-known anti-inflammatory and health-promoting bacteria belonging to the genus *Faecalibacterium* during the first period of productive cycle of the broiler (T1), with respect to control diet. During the second and third phase of the productive cycle (T2 and T3) the relative abundance of *Faecalibacterium* showed no significant differences between the three groups. Taken together, our results seems to highlight that *Faecalibacterium* naturally increase during the productive cycle of broilers (control diet, group A), and dietary regimes administered to broilers in groups B and C seems to hasten this increase.

Diet administered to group C also induced a progressive increase in the abundance of another health-promoting group, *Bifidobacterium*, as well as an increase in species richness with respect to control diet (administered to group A). Conversely, diet administered to group B favored the increase of *Bacteroides* abundance along the whole productive cycle. *Bacteroides* increase goes to the detriment of Rikenellaceae (Alistipes), another member of the phylum Bacteroidetes.

Both diets administered to broilers in group B and C had marginal impact on ileum microbiota composition and diversity, and no significant impact on the microbiota was detected in litter samples.

As mentioned before, the shortage of samples selected for metabolic studies affected the quality of the data and results. Thus, it is important to have a more robust data set, including in the analysis of all samples. However, it seems to be clear that metabolites as acetate, glutamate, propionate, and butyrate are affected by the treatments.

PCA performed on 63 subjects with 6361 functional features showed a clear effect of Vitamin B2 which caused a separation between treated groups (Group B and C) and control group (Group A). This result was not highlighted as a function of the analysis time Considering the Primary KEGG metabolic pathways, the relative abundance of Genetic Information Processing and Organismal Systems increase in Group A (5 ppm of vitamin B2) while Environmental Information Processing and Metabolism increase in treated groups (50 and 100 ppm of vitamin B2)

Looking to Secondary KEGG metabolic pathways, with a relative abundance ≥0.5% the results highlight appreciable compositional differences among the three experimental groups for each time point. In particular, the relative abundance of Metabolism of cofactors and vitamins, Membrane transport, Replication and repair, Biosynthesis of other secondary metabolites, Metabolism of terpenoids and polyketides and Metabolism of other amino acids increase in the treated groups with 50 and 100 ppm of vitamin B2. On the contrary, Translation, Energy metabolism, Signal transduction, Transcription, Infectious diseases and Environmental adaptation were statistically increase in the control group with 5 ppm of vitamin B2

Looking to Tertiary KEGG metabolic pathways no differences were reported at 14 days of age between experimental groups while a great number of Pathways showed significant differences at 28 and 42 days of age. Particularly interesting are the metabolic pathways such as Fatty acid biosynthesis, Phosphotransferase system (PTS) and Butanoate metabolism, increased in treated groups (50 and 100 ppm of Vitamin B2) and linked to production of SCFA. Moreover, a statistically significant increase in treated groups has been reported for B vitamin pathways such as Nicotinate and nicotinamide metabolism, Pantothenate biosynthesis, Folate biosynthesis, Biotin metabolism and Vitamin B6 metabolism.

At least 7 metabolic function at 28 days of age and 5 at 42 days, related to butyrate production, were statistically increased in treated groups (50 and 100 ppm of Vitamin B2) in comparison to control group (5 ppm vitamin B2). This evidence can be correlated with different microbial genera such as *Faecalibacterium* and *Eubacterium* (Zam et al., 2016, Rowland et., 2018) and by the cross feeding activity of Bifidobacteria as reported by Reviere et al., 2016. All these genera has been identified in our study by microbiota analysis and these results can predict the potential production of butyrate in animal treated with Vit. B2.

Example 4

Swine Model

Materials and Methods

Three pigs were given a commercial feed for 4 weeks. Feed included: barley, wheat, and soybean meal as principal ingredients, and its major chemical composition was (g/kg): 151 crude protein, 34 crude fat, 40 crude fiber, 55 and ash. Animals were weighed individually at the start of the experimental period (on average; 23.9±1.01 Kg) and at the end (on average; 43.3±3.56 Kg). After 30 days of adaptation, animals were slaughtered. The pH of gastric, small intestine and hindgut contents was measured directly with a glass electrode pH-meter (CRISON 507, CRISON, Barcelona, Spain). Gastric and small intestine contents were immediately filtered, sampled and stored at $-20°$ C. for being used as digesta inocula for estimation of ex vivo digestibility. Regarding the caecal contents, one part was immediately sampled, dispensed in 20 ml tubes, frozen in liquid nitrogen and stored at $-80°$ C. to use as frozen inoculum for in vitro gas production studies. The other part was directly used as fresh fermentation inoculum.

In Vitro Enzymatic Digestion

To determine the enzymatic digestibility in the stomach and in the small intestine of pigs, two experiments were carried out:

A—with Exogenous Enzymes:

Erlenmeyer flasks (100 mL total volume) contained 0.5 g of substrate alone or supplemented with the three eubiotics were incubated in duplicates for each treatment, to determine the in vitro enzymatic digestibility following the three-step method of Boisen and Fernandez (1997). The digestibility was determined with:

[1] Pepsin
[2] Pepsin+pancreatin
[3] Pepsin+pancreatin+viscozyme

B. With Gastric Contents and Small Intestine Contents

A similar procedure of enzymatic digestibility was followed, but in this case, the pepsin and pancreatin solutions were substituted by gastric contents and small intestine contents for each animal, eliminating the third step of Boisen and Fernandez (1997). The digestibility was determined with:

gastric contents (9 mL)
gastric contents+small intestine contents (9 mL)

In Vitro Gas Production

The microbial fermentation pattern of caecal contents was studied in vitro by the gas production technique (Theodorou et al., 1994. *Anim Feed Sci Technol* 48:185-1-97). A 0.8 g amount of pre-digested feeds (incubated successively in pepsin-HCl and pancreatin incubation, according to the procedure of Boisen and Fernandez, 1997*Anim Feed Sci Technol* 51: 29-43), to simulate the digestive processes occurring before the caecum, was used as substrate alone or supplemented vitamin B2. Firstly, triplicate glass bottles (110 mL total volume) for each treatment were filled with 56 mL incubation solution. Caecal contents of each of the 3 pigs for each treatment were mixed 2:1 with the incubation solution under CO2 atmosphere and homogenized for few minutes with waring blender (ceacal contents implies a 0.20 of total incubation solution). Then, 24 mL of the mixture were added to each bottle to complete the 80 mL total liquid volume. In addition, triplicate bottles without substrate were also included as blanks. Bottles were sealed under a CO2 stream and incubated at $39°$ C. for 12 h. Pressure was recorded every two hours throughout the incubation period, by means of an HD 2124.02 manometer fitted with a TP804 pressure gauge (Delta Ohm, Caselle di Selvazzano, Italy). Readings were converted into volume by a pre-established linear regression equation between the pressure recorded in the same bottles under the same conditions and known air volumes (n=103; R2=0.996). The gas volume recorded for each incubation time was expressed per unit of incubated organic matter (OM). Methane (CH4) concentration was measured on every 6 h interval. At 6 and 12 h incubation samples were collected and either acidified 1:1 with 0.1N HCl or added to 0.5 ml of a deproteinizing mixture of 0.5 M PO4H3 with 2 mg/ml 4-methyl valeric acid, that were stored at $-20°$ C. for determination of ammonia and volatile fatty acid (VFA) concentration, respectively. Note that the procedure of the in vitro gas production was the same for both fresh inocula and frozen inocula, with the only difference that the frozen samples of caecal contents were previously maintained at $38°$ C. for 5 min for thawing.

For gas production, results were analyzed for each incubation time as a split-plot design, considering the donor pig as a block, the contents (fresh vs. frozen) as the main plot and the treatment as the subplot. The same design was used to analyze the results obtained from digestive contents (gastric vs. small intestine) as the main plot. In vitro enzymatic results were not statistically analyzed as there were no sources of experimental variability. Differences were considered significant when P<0.05, and a trend for significance was considered when 0.05 £ P<0.10 and, when significant, differences were compared by the Tukey t test at P<0.05.

Results

Ex Vivo and Enzymatic Digestion

It was observed that with gastric contents, the substrate digestibility was highest (P<0.05) with Vit B2, compared to the control. Such differences were minimized after digestion with small intestine contents, and no differences were recorded among treatments (P>0.05). The results of substrate digestibility observed with exogenous enzymes were in agreement with those recorded with digesta contents, although the extent of pepsin-HCl digestion was slightly lower than that with gastric contents. Thus, the digestibility recorded with substrate supplemented with Vit B2 when incubated in pepsin-HCl was higher than that of other treatments. However, when treatments were incubated in (P+Pancreatin) and/or in (P+P+Viscozyme) no differences among treatments were observed. Results indicate that the two methods are valid to evaluate the enzymatic digestion in pigs.

In Vitro Gas Production

On average, the gas production pattern from the treatments incubated with fresh caecal contents did not differ with that recorded with frozen caecal contents (P>0.05); however, at 4 h incubation the volume of gas with fresh contents tended to be higher (P=0.081 On average, the volume of gas recorded with Vit B2 was higher (P<0.05) than the control at 4.10, and 12 h incubation.

The interaction between the preservation type and the treatments throughout the incubation period did not reach significance (P<0.05), indicating that treatments behaved similarly despite the congelation of ceacal contents.

Methane Production

Regarding CH4 production, no differences (P>0.05) were recorded along the 12 h incubation between fresh and frozen inocula. Up to 12 h incubation, no differences (P>0.05) were recorded among treatments on CH4 proportion of total gas, although numerically the CH4 recorded with Vit B2 was the lowest. Similarly, when CH4 production was expressed as volume per unit of incubation substrate, no significant differences were recorded among treatments, neither at 6 h nor at 12 h incubation, although the ranking between treatments showed that Vit B2 recorded the lowest accumulate CH4 at 6 as well as at 12 h incubation.

The results observed with Vit B2 mean that this vitamin may have a positive effect on the activity of hindgut bacterial species, as it is known that the vitamin B2 plays a significant role in the production of energy, helping carbohydrate degradation. In addition, the reduction of methane production may be explained by the fact that vitamin B2 can reduce the activity of methanogenic bacteria or archaea population.

Total Volatile Fatty Acids Concentration (TVFA), Molar Proportions of VFA, and Ammonia Production No differences were recorded either for preservation of ceacal inocula, nor among treatments, on concentration of total VFA, molar proportions of VFA, or on ammonia concentration This indicates that no major effect was promoted on the caecal fermentation profile by the tested experimental treatments.

In conclusion, the vitamin B2 has showed a clear positive response both at a gastric level, may be stimulating pepsin activity, and at a hindgut level, enhancing microbial activity.

What is claimed is:

1. A method of improving intestinal health in an animal wherein said improvement comprises one or more of:
   (i) increasing the concentration of at least one short-chain fatty acid or a salt thereof in the intestine;
   (ii) increasing microbiome diversity in the intestine;
   (iii) increasing the abundance of a beneficial bacteria in the intestine;
   (iv) promoting or increasing the butyrate synthesis pathway in the intestine;
   (v) improving the barrier function of the intestine;
   (vi) reducing the amount of gas produced in the intestine; and,
   (vii) stimulating intestinal immune responses,
   wherein said method comprises administering to the animal active agents comprising a daily dose of riboflavin and vitamin C, wherein the active agents are present in a formulation comprising an effective dose of the active agents and the active agents are delivered to the large intestine.

2. The method according to claim 1, wherein the improvement is increasing at least one short-chain fatty acid or increasing the butyrate synthesis pathway activity in an animal.

3. The method according to claim 2, wherein the animal is experiencing a condition selected from the group consisting of metabolic disorders, Type 2 diabetes, obesity, chronic inflammation and arteriogenesis.

4. The method according to claim 1, wherein the improvement is increasing microbiome diversity in the intestine or increasing the abundance of a beneficial bacteria in the intestine.

5. The method according to claim 1, wherein the improvement is stimulating intestinal immune responses.

6. The method according to claim 5, wherein the animal is experiencing acute or chronic inflammation.

7. The method according to claim 1, wherein the improvement is of treating or lessening the amount of gas produced in the gut.

8. The method according to claim 1, wherein the improvement is improving gut barrier function.

9. The method according to claim 8, wherein the improving the barrier function is a method of treating or lessening the symptoms of a condition selected from the group consisting of irritable bowel disease, Crohn's disease, ulcerative colitis, leaky gut and malnutrition.

10. The method of claim 1, wherein the mammal is a human.

11. The method of claim 1, wherein said method comprises administering to the animal active agents consisting of a daily dose of riboflavin and vitamin C.

12. A method of improving intestinal health in an animal, wherein said improvement of intestinal health comprises one or more of:
   (i) increasing the concentration of at least one short-chain fatty acid or a salt thereof in the intestine;
   (ii) increasing microbiome diversity in the intestine;
   (iii) increasing the abundance of a beneficial bacteria in the intestine;
   (iv) promoting or increasing the butyrate synthesis pathway in the intestine;
   (v) improving the barrier function of the intestine;
   (vi) reducing the amount of gas produced in the intestine; and,
   (vii) stimulating intestinal immune responses,
   wherein said method comprises administering to the animal a delayed release formulation for delivery of active agents to the intestine, comprising the active agents and an enteric layer or an enteric shell, wherein said active agents comprise up to 200 milligrams (mg) riboflavin and up to 2000 mg vitamin C.

13. The method of claim 12, wherein the delayed release formulation comprises the active agents and an enteric layer or an enteric shell, wherein said active agents comprise 1-85 mg riboflavin and 400-600 mg vitamin C.

14. The method of claim 12, wherein the active agents comprise 70-80 mg riboflavin and 450-550 mg vitamin C.

15. The method of claim 12, wherein the mammal is a human.

16. The method of claim 13, wherein the mammal is a human.

17. The method of claim 14, wherein the mammal is a human.

18. The method of claim 12, wherein said method comprises administering to the animal active agents consisting of a daily dose of up to 200 milligrams (mg) riboflavin and up to 2000 mg vitamin C.

19. The method of claim 13, wherein said active agents consist of 1-85 mg riboflavin and 400-600 mg vitamin C.

20. A method of improving intestinal health in an animal wherein said method comprises administering to the animal active agents comprising a daily dose of up to 2.9 milligrams (mg) riboflavin and up to 28.6 mg vitamin C, wherein the active agents are present in a formulation comprising an effective dose of the active agents and the active agents are delivered to the large intestine.

21. The method of claim 20, wherein said method comprises administering to the animal active agents consisting of a daily dose of up to 2.9 milligrams (mg) riboflavin and up to 28.6 mg vitamin C.

\* \* \* \* \*